(12) United States Patent
Nguyen et al.

(10) Patent No.: US 12,138,881 B2
(45) Date of Patent: *Nov. 12, 2024

(54) GAS-BASED MATERIAL COMPRESSION AND PORTIONING

(71) Applicant: Altria Client Services LLC, Richmond, VA (US)

(72) Inventors: Thien Nguyen, Glen Allen, VA (US); Sean Sundberg, Richmond, VA (US); Jeremy Straight, Midlothian, VA (US); Berina Yerkic-Husejnovic, Richmond, VA (US); Jarrod W. Chalkley, Mechanicsville, VA (US); James D. Evans, Chesterfield, VA (US); Christopher R. Newcomb, Powhatan, VA (US); Robert V. Powell, Jr., Midlothian, VA (US); Gregory L. Nelson, Chester, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,563

(22) Filed: Sep. 28, 2023

(65) Prior Publication Data

US 2024/0025139 A1 Jan. 25, 2024

Related U.S. Application Data

(63) Continuation of application No. 16/911,838, filed on Jun. 25, 2020, now Pat. No. 11,794,436.

(51) Int. Cl.
*B65B 1/04* (2006.01)
*B29C 31/04* (2006.01)
(Continued)

(52) U.S. Cl.
CPC .............. *B30B 12/00* (2013.01); *B29C 31/04* (2013.01); *B29C 33/0022* (2013.01);
(Continued)

(58) Field of Classification Search
CPC ... B30B 12/00; B30B 15/0052; B30B 15/028; B30B 15/30; B29C 31/04;
(Continued)

(56) References Cited

U.S. PATENT DOCUMENTS

| 3,750,675 A | 8/1973 | Klemme |
| 4,457,125 A * | 7/1984 | Fishburne ............. B65B 63/028 53/527 |

(Continued)

FOREIGN PATENT DOCUMENTS

| DE | 2655036 A1 | 6/1978 |
| EP | 0903290 A1 | 3/1999 |

OTHER PUBLICATIONS

International Search Report and Written Opinion dated Jun. 24, 2021 for corresponding International Application No. PCT/US2021/022478.

(Continued)

*Primary Examiner* — Thomas M Wittenschlaeger
*Assistant Examiner* — Katie L Gerth
(74) *Attorney, Agent, or Firm* — Harness, Dickey & Pierce, P.L.C.

(57) ABSTRACT

An apparatus includes a fixed assembly and a reciprocating assembly. The fixed assembly includes a hopper, a first gas manifold, and a dispensing chamber, and the reciprocating assembly includes a channel assembly defining a channel conduit, a shield plate vertically aligned therewith, and a second gas manifold. The reciprocating assembly may move, in relation to the fixed assembly, to a first position to enable the channel conduit to be filled with bulk compress-
(Continued)

ible material from the hopper, a second position to enable compressible material to be pushed from the channel conduit to the dispensing conduit and to be compressed in the dispensing chamber according to a first gas directed through the channel conduit by the first gas manifold, and a third position to enable the compressed material to be pushed out of the dispensing conduit according to a second gas directed through the dispensing conduit by the second gas manifold.

17 Claims, 30 Drawing Sheets

(51) Int. Cl.
| | |
|---|---|
| *B29C 33/00* | (2006.01) |
| *B29C 33/46* | (2006.01) |
| *B29C 43/02* | (2006.01) |
| *B29C 43/40* | (2006.01) |
| *B30B 12/00* | (2006.01) |
| *B30B 15/00* | (2006.01) |
| *B30B 15/02* | (2006.01) |
| *B30B 15/30* | (2006.01) |
| *B65B 1/16* | (2006.01) |
| *B65B 1/24* | (2006.01) |
| *B65B 1/26* | (2006.01) |
| *B65B 1/36* | (2006.01) |
| *B65B 9/02* | (2006.01) |
| *B65B 37/20* | (2006.01) |
| *B65B 57/08* | (2006.01) |
| *B65B 61/28* | (2006.01) |
| *B29C 43/32* | (2006.01) |

(52) U.S. Cl.
CPC .............. *B29C 33/46* (2013.01); *B29C 43/02* (2013.01); *B29C 43/40* (2013.01); *B30B 15/0052* (2013.01); *B30B 15/028* (2013.01); *B30B 15/30* (2013.01); *B65B 1/04* (2013.01); *B65B 1/16* (2013.01); *B65B 1/24* (2013.01); *B65B 1/26* (2013.01); *B65B 1/36* (2013.01); *B65B 9/023* (2013.01); *B65B 37/20* (2013.01); *B65B 57/08* (2013.01); *B65B 61/28* (2013.01); *B29C 2043/3222* (2013.01)

(58) Field of Classification Search
CPC ..... B29C 33/0022; B29C 33/46; B29C 43/02; B29C 43/40; B29C 2043/3222; B65B 1/04; B65B 1/16; B65B 1/24; B65B 1/26; B65B 1/36; B65B 9/023; B65B 37/20; B65B 57/08; B65B 61/28; B65B 29/00; B65B 51/02; B65B 51/14
See application file for complete search history.

(56) References Cited

U.S. PATENT DOCUMENTS

| | | | |
|---|---|---|---|
| 4,567,752 A | | 2/1986 | Labbe |
| 4,889,139 A | | 12/1989 | Heitmann |
| 5,041,297 A | * | 8/1991 | Dowaliby ................ B65B 1/36 53/529 |
| 5,244,019 A | * | 9/1993 | Derby ...................... B65B 1/26 222/452 |
| 5,651,401 A | | 7/1997 | Cados |
| 6,105,637 A | | 8/2000 | VerMehren |
| 6,269,850 B1 | | 8/2001 | Price et al. |
| 6,834,755 B2 | | 12/2004 | Jay et al. |
| 9,185,932 B2 | | 11/2015 | Dekkers et al. |
| 11,192,668 B2 | * | 12/2021 | Williams ................. B65B 1/38 |
| 2008/0202532 A1 | * | 8/2008 | Wygal .................... B65B 63/02 131/111 |
| 2008/0236701 A1 | * | 10/2008 | Monti ...................... B65B 1/36 222/630 |
| 2014/0150808 A1 | * | 6/2014 | Dekkers ................ A24C 5/397 131/108 |
| 2015/0183532 A1 | * | 7/2015 | Longest, Jr. ............. B65B 1/16 53/452 |
| 2017/0029142 A1 | * | 2/2017 | Evans ...................... B65B 1/36 |
| 2019/0344911 A1 | * | 11/2019 | Williams ................. B65B 1/24 |
| 2021/0112846 A1 | * | 4/2021 | Longest ................. B65B 57/10 |
| 2021/0402724 A1 | * | 12/2021 | Nguyen ................. B65B 9/023 |
| 2022/0081134 A1 | * | 3/2022 | Williams ............... B65B 37/14 |
| 2023/0002087 A1 | * | 1/2023 | Longest, Jr. ........... B65B 29/00 |

OTHER PUBLICATIONS

International Preliminary Report on Patentability dated Dec. 13, 2022 for corresponding International Application No. PCT/US2021/022478.

* cited by examiner

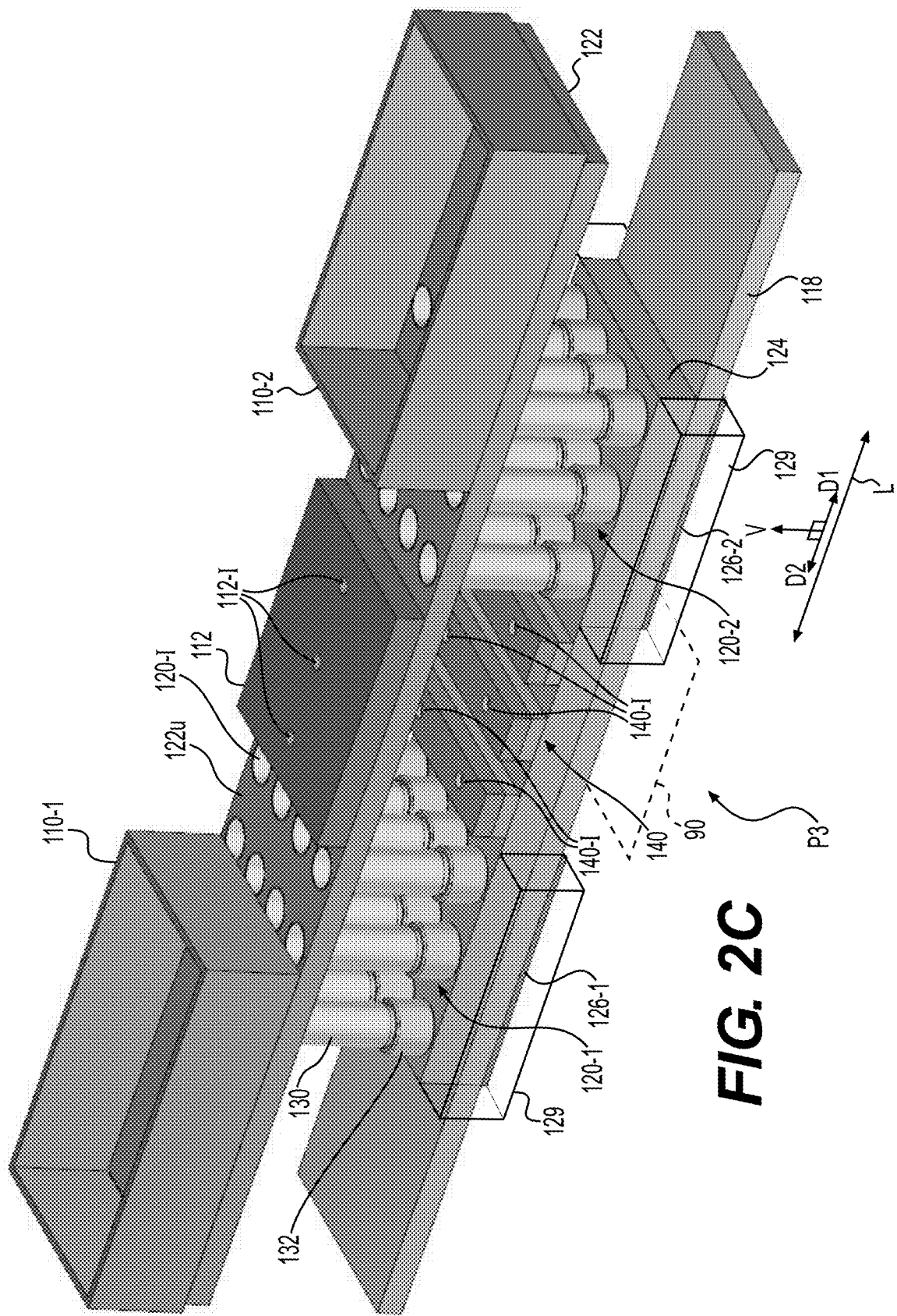

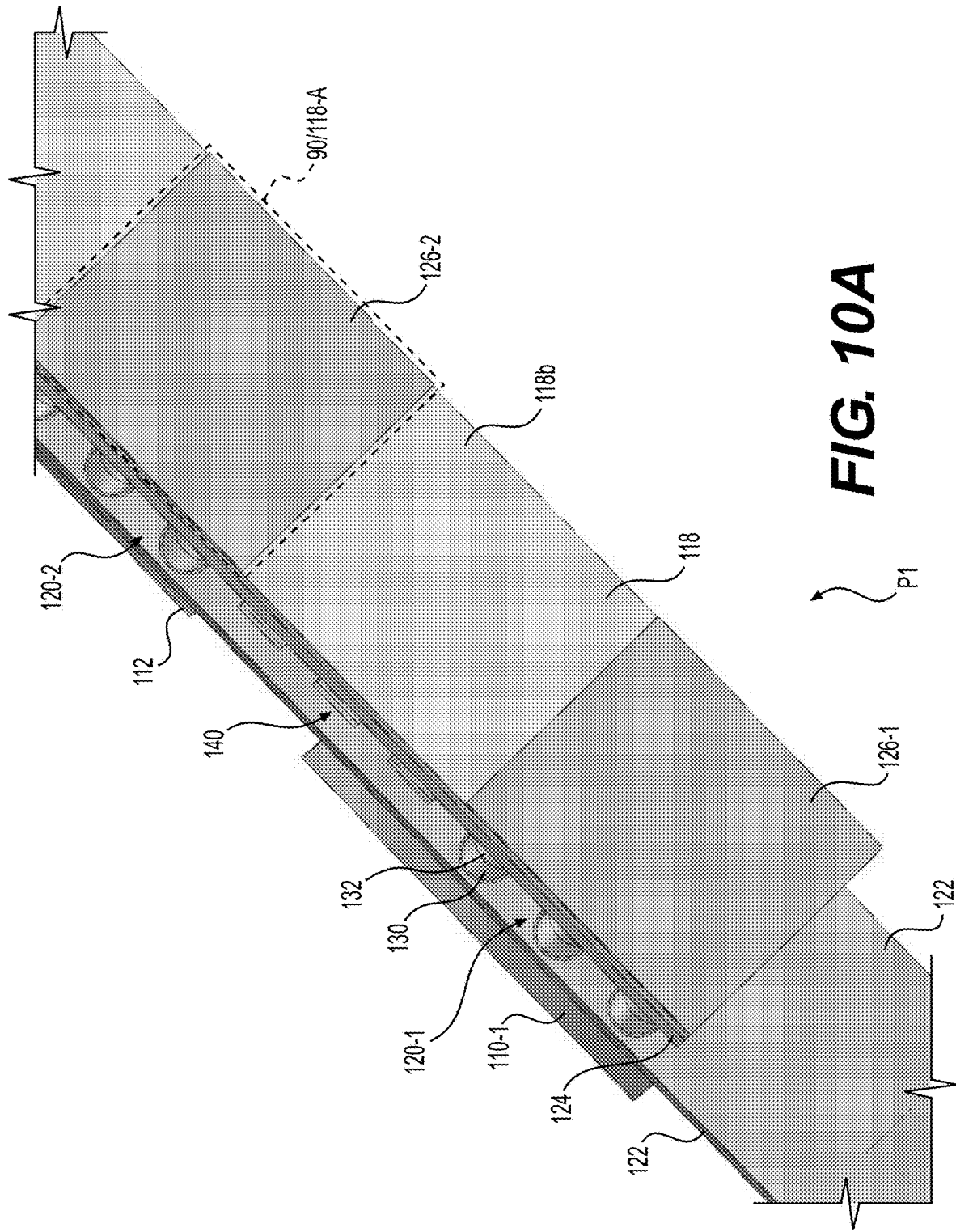

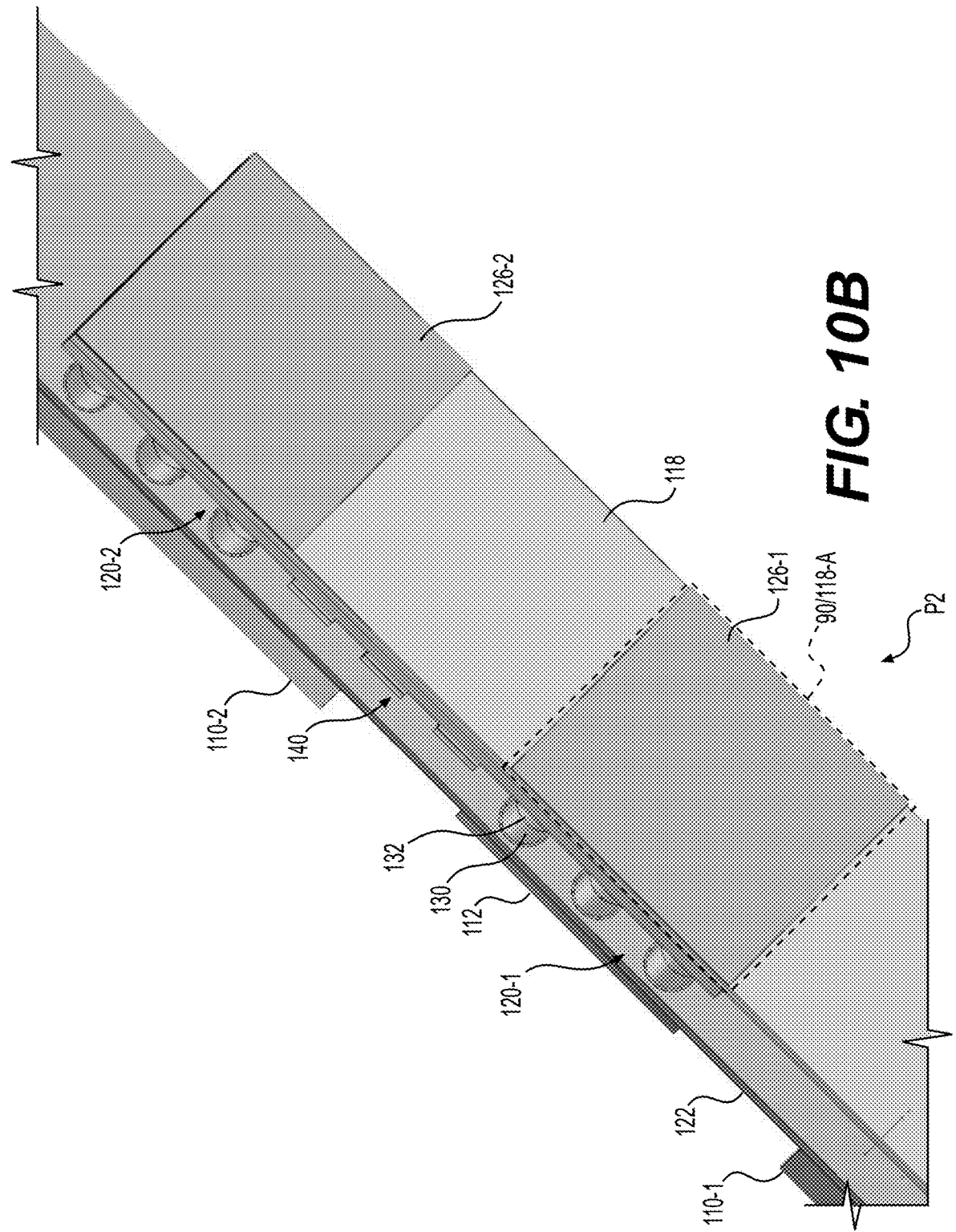

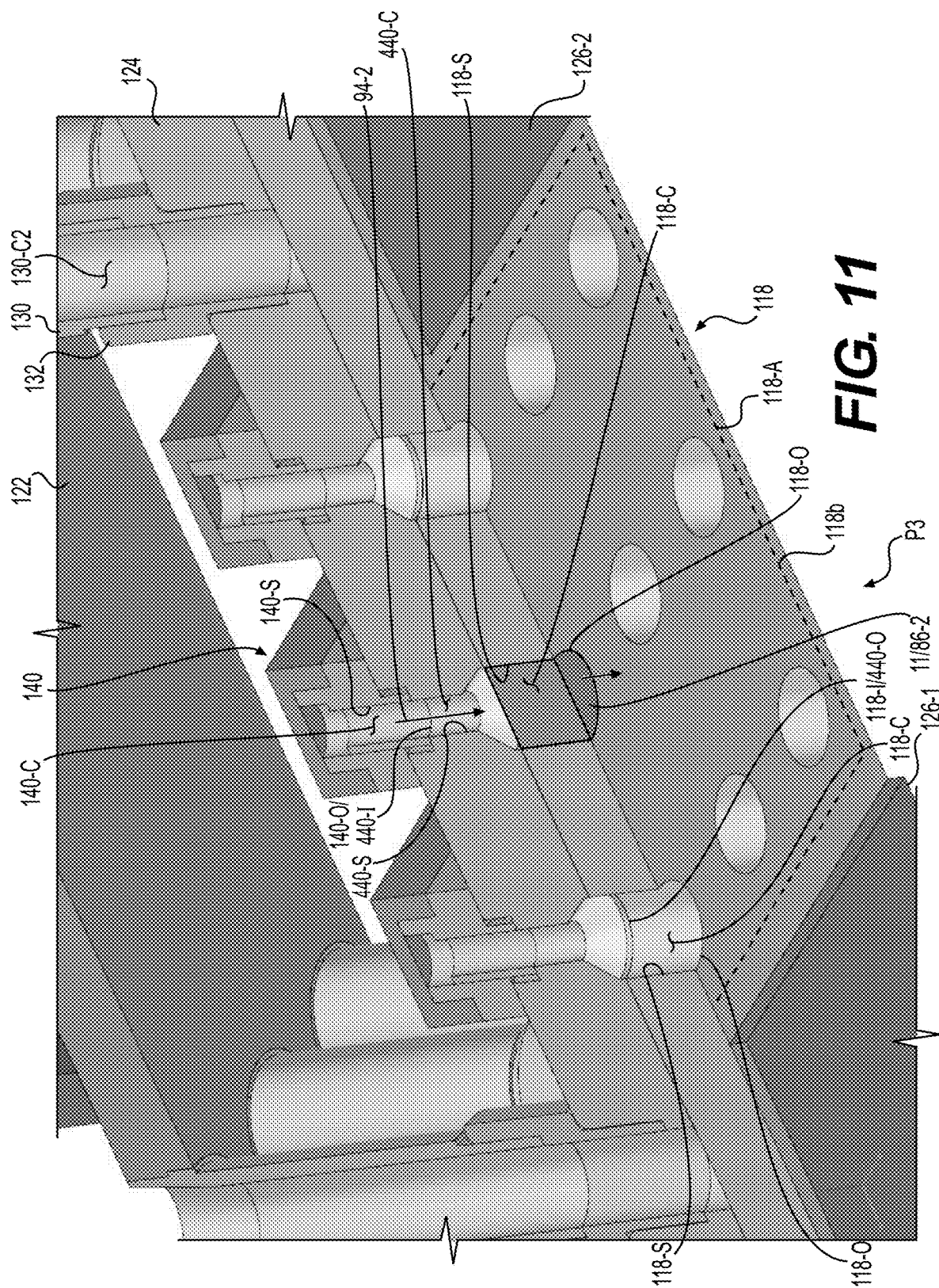

GAS-BASED MATERIAL COMPRESSION AND PORTIONING

CROSS REFERENCE TO RELATED APPLICATION

This application is a continuation application of U.S. application Ser. No. 16/911,838, filed Jun. 25, 2020, the entire contents of which are incorporated herein by reference.

BACKGROUND

Field

The present disclosure relates to portioning of compressible materials, and more particularly to compressing and portioning materials to provide rapid, economical, and efficient portioning of the materials to provide ("manufacture") portions ("instances") of material having a controllable density, weight, and volume.

Description of Related Art

Some products, including some consumer goods, include packaged portions ("portioned instances") of a compressible material (also referred to herein as simply a "material"). In some cases, such portioned instances may be produced ("provided," "manufactured," etc.) based on portioning ("segmenting," "cutting," "severing," etc.) a relatively large ("bulk") instance of the material into multiple smaller portioned instances and packaging the portioned instances.

SUMMARY

According to some example embodiments, an apparatus configured to provide a piece of a compressed material may include a fixed assembly and a reciprocating assembly. The fixed assembly may include a first hopper, a first gas manifold, and a dispensing container. The first hopper may be configured to hold bulk compressible material. The first gas manifold may be configured to direct a first gas from a first gas source to a first manifold outlet. The dispensing container may define a dispensing conduit extending between a dispensing conduit inlet and a dispensing conduit outlet. The dispensing conduit may at least partially vertically overlap with the first manifold outlet. The reciprocating assembly may include a first channel assembly and a second gas manifold. The first channel assembly may define a first channel conduit extending between a first channel conduit inlet and a first channel conduit outlet. The second gas manifold may be configured to direct a second gas from a second gas source to a second manifold outlet. The reciprocating may be configured to be moved along a longitudinal axis, in relation to the fixed assembly, between each position of a first position to expose the first channel conduit inlet to the first hopper and to cover the first channel conduit outlet with at least a first portion of the fixed assembly, to enable at least partial filling of the first channel conduit with bulk compressible material from the first hopper, a second position to expose the first channel conduit inlet to the first manifold outlet, expose the first channel conduit outlet to the dispensing conduit inlet, and cover the dispensing conduit outlet, to enable the first gas manifold to direct the first gas through the first channel conduit inlet to push bulk compressible material from the first channel conduit into the dispensing conduit and to compress the bulk compressible material in the dispensing conduit to form a first piece of compressed material within the dispensing conduit, and a third position to expose the second manifold outlet to the dispensing conduit inlet and expose the dispensing conduit outlet to an exterior of the apparatus, to sever the first piece of compressed material in the dispensing conduit from remainder compressible material in the first channel conduit and to enable the second gas manifold to direct the second gas through the dispensing conduit inlet to push the first piece of compressed material out of the dispensing conduit.

The third position may be between the first position and the second position along the longitudinal axis, such that the reciprocating assembly is configured to enable the pushing and compression of the bulk compressible material based on the reciprocating assembly moving in a first direction along the longitudinal axis from the first position to the second position, sever the first piece of compressed material and enable the pushing of the first piece of compressed material out of the dispensing conduit based on the reciprocating assembly moving in an opposite, second direction along the longitudinal axis from the second position to the third position, and enable at least partial re-filling of the first channel conduit with bulk compressible material from the first hopper subsequently to the pushing of the first piece of compressed material out of the dispensing conduit based on the reciprocating assembly moving in the second direction from the third position to the first position.

The dispensing container may be a bottom plate, such that the dispensing conduit extends through a thickness of the bottom plate between the dispensing conduit inlet at an upper surface of the bottom plate and the dispensing conduit outlet at a bottom surface of the bottom plate. The reciprocating assembly may include an upper plate, a lower plate, and a cylindrical structure coupled between the upper plate and the lower plate. An upper surface of the upper plate may be in sliding contact with the first hopper and the first gas manifold. A bottom surface of the lower plate may be in sliding contact with the upper surface of the bottom plate. The lower plate may define a lower conduit extending through a thickness of the lower plate between a top opening of the lower conduit and a bottom opening of the lower conduit. The bottom opening of the lower conduit may define the first channel conduit outlet at the bottom surface of the lower plate. The cylindrical structure may define an upper conduit extending through the cylindrical structure. A top opening of the upper conduit may define the first channel conduit inlet at the upper surface of the upper plate. A bottom opening of the upper conduit may be exposed to the top opening of the lower conduit such that the upper conduit and the lower conduit collectively define the first channel conduit.

The second gas manifold may be coupled to an upper surface of the lower plate. The lower plate may define a manifold conduit extending through the thickness of the lower plate between a manifold conduit inlet at the upper surface of the lower plate and a manifold conduit outlet at the bottom surface of the lower plate, the manifold conduit inlet exposed to the second manifold outlet. The reciprocating assembly may be configured to expose the manifold conduit outlet to the dispensing conduit inlet, such that the second manifold outlet is exposed to the dispensing conduit inlet through the manifold conduit, based on the reciprocating assembly being at the third position.

The cylindrical structure may include a cylinder coupled, at a top end of the cylinder, to the upper plate such that a top opening of the cylinder defines the top opening of the upper conduit. The cylindrical structure may include a cylindrical sheath in sliding engagement with a bottom end of the cylinder at the top end of the cylindrical sheath and in sliding engagement with the lower plate at a bottom end of the cylindrical sheath, such that a bottom opening of the cylindrical sheath defines the bottom opening of the upper conduit. The cylindrical structure may include a spring configured to apply a spring force to push the cylindrical sheath against the lower plate. The cylindrical sheath may be configured to be pushed away from the lower plate by the first gas, to open a conduit extending between the cylindrical sheath and the lower plate and to enable the first gas to escape the first channel conduit via the opened conduit in response to the first gas manifold directing the first gas to the first manifold outlet.

The dispensing container may be a bottom plate, such that the dispensing conduit extends through a thickness of the bottom plate between the dispensing conduit inlet at an upper surface of the bottom plate and the dispensing conduit outlet at a bottom surface of the bottom plate. The reciprocating assembly may include a first shield plate at least partially vertically overlapping the first channel assembly. The bottom plate may be between the first channel assembly and the first shield plate. The first portion of the fixed assembly may include a portion of the bottom plate. The first shield plate may be configured to cover the dispensing conduit outlet based on the reciprocating assembly being at the second position.

The apparatus may further include a servomechanism configured to move the reciprocating assembly along the longitudinal axis between the first, second, and third positions. The apparatus may further include processing circuitry configured to control the servomechanism to move the reciprocating assembly between the first, second, and third positions, control the first gas source to cause the first gas to be selectively supplied to the first gas manifold in response to the reciprocating assembly being at the second position, and control the second gas source to cause the second gas to be selectively supplied to the second gas manifold in response to the reciprocating assembly being at the third position.

The fixed assembly may include a second hopper. The second hopper may be configured to hold additional bulk compressible material. The second hopper may be adjacent to the first gas manifold along the longitudinal axis such that the first gas manifold is between the first and second hoppers along the longitudinal axis. The reciprocating assembly may include a second channel assembly that defines a second channel conduit extending between a second channel conduit inlet and a second channel conduit outlet. The second channel assembly may be adjacent to the second gas manifold along the longitudinal axis such that the second gas manifold is between the first and second channel assemblies along the longitudinal axis. The reciprocating assembly may be configured to expose the second channel conduit inlet to the second hopper and to cover the second channel conduit outlet with at least a second portion of the fixed assembly, to enable at least partial filling of the second channel conduit with additional bulk compressible material from the second hopper, based on the reciprocating assembly being at the second position, The reciprocating assembly may be configured to expose the second channel conduit inlet to the first manifold outlet, expose the second channel conduit outlet to the dispensing conduit inlet, and cover the dispensing conduit outlet, to enable the first gas manifold to direct the first gas through the second channel conduit inlet to push bulk compressible material from the second channel conduit and into the dispensing conduit and to compress the bulk compressible material in the dispensing conduit to form a second piece of compressed material within the dispensing conduit, based on the reciprocating assembly moving in the second direction from the second position to the first position. The reciprocating assembly may be configured to expose the second manifold outlet to the dispensing conduit inlet and expose the dispensing conduit outlet to the exterior of the apparatus, to sever the second piece of compressed material in the dispensing conduit from remainder compressible material in the second channel conduit and to enable the second gas manifold to direct the second gas through the dispensing conduit inlet to push the second piece of compressed material out of the dispensing conduit, based on the reciprocating assembly moving in the first direction from the first position to the third position. The reciprocating assembly may be configured to enable at least partial re-filling of the second channel conduit with bulk compressible material from the second hopper, subsequently to the pushing of the second piece of compressed material out of the dispensing conduit, based on the reciprocating assembly moving in the first direction from the third position to the second position.

The reciprocating assembly may include an array of first channel assemblies that each define a separate first channel conduit of an array of first channel conduits. Each separate first channel conduit may extend between a separate first channel conduit inlet of an array of first channel conduit inlets and a separate first channel conduit outlet of an array of first channel conduit outlets. The array of first channel assemblies may include the first channel assembly. The reciprocating assembly may include an array of second channel assemblies that each define a separate second channel conduit of an array of second channel conduits. Each separate second channel conduit may extend between a separate second channel conduit inlet of an array of second channel conduit inlets and a separate second channel conduit outlet of an array of second channel conduit outlets. The array of second channel assemblies may include the second channel assembly. The dispensing container may define an array of dispensing conduits extending between separate, respective dispensing conduit inlets of an array of dispensing conduit inlets and separate, respective dispensing conduit outlets of an array of dispensing conduit outlets, the array of dispensing conduits including the dispensing conduit. The reciprocating assembly may be configured to move to the first position to expose the array of first channel conduit inlets to the first hopper and to cover the array of first channel conduit outlets with at least the first portion of the fixed assembly, and expose the array of second channel conduit outlets to the array of dispensing conduit inlets and to expose the array of second channel conduit inlets to one or more first manifold outlets of the first gas manifold. The reciprocating assembly may be configured to move to the second position to expose the array of first channel conduit outlets to the array of dispensing conduit inlets and to expose the array of first channel conduit inlets to the one or more first manifold outlets of the first gas manifold, and expose the array of second channel conduit inlets to the second hopper and to cover the second channel conduit outlet with at least the second portion of the fixed assembly. The reciprocating assembly may be configured to move to the third position to expose the array of dispensing conduit inlets to one or more second manifold outlets of the second gas manifold and to expose the array of dispensing conduit outlets to the exterior of the apparatus.

The first gas manifold may include a plurality of first manifold conduits that extend to separate, respective first manifold outlets of a plurality of first manifold outlets. The plurality of first manifold outlets may include the one or more first manifold outlets. The second gas manifold may include a plurality of second manifold conduits that extend to separate, respective second manifold outlets of a plurality of second manifold outlets. The plurality of second manifold outlets may include the one or more second manifold outlets.

The apparatus may further include a servomechanism configured to move the reciprocating assembly reversibly along the longitudinal axis between the first, second, and third positions. The apparatus may further include processing circuitry configured to control the servomechanism to move the reciprocating assembly between the first, second, and third positions, control the first gas source to cause the first gas to be selectively supplied to the first gas manifold in response to the reciprocating assembly being at the first position, control the first gas source to cause the first gas to be selectively supplied to the first gas manifold in response to the reciprocating assembly being at the second position, and control the second gas source to cause the second gas to be selectively supplied to the second gas manifold in response to the reciprocating assembly being at the third position.

The first gas source and the second gas source may be a same gas source, such that the first gas and the second gas are a same type of gas.

According to some example embodiments, a manufacturing system may include a conveyer belt, the conveyer belt including a loop of plates, each plate including a cavity, and the apparatus. The apparatus may be on a section of the conveyer belt such that the conveyer belt is configured to move to cause the cavity of each plate of the conveyer belt to be moved to be vertically aligned with the dispensing conduit outlet concurrently with the reciprocating assembly being at the third position, to enable the second gas manifold to direct the second gas through the dispensing conduit inlet to push the compressed compressible material out of the dispensing conduit and into the cavity. The manufacturing system may include a packaging assembly configured to seal the compressed compressible material in the cavity in a package. The conveyer belt may be configured to discharge the package from the cavity based on movement of the conveyer belt.

According to some example embodiments, a method of operating an apparatus to provide a portioned instance of a compressible material, the apparatus including a fixed assembly and a reciprocating assembly, the fixed assembly including a first hopper, a first gas manifold, and a dispensing container defining a dispensing conduit, the reciprocating assembly including a first channel assembly and a second gas manifold, the first channel assembly defining a first channel conduit, may include causing the reciprocating assembly to move along a longitudinal axis, in relation to the fixed assembly, to a first position to expose a first channel conduit inlet of the first channel conduit to the first hopper and to cover a first channel conduit outlet of the first channel conduit with at least a first portion of the fixed assembly, to enable at least partial filling of the first channel conduit with bulk compressible material from the first hopper. The method may include causing the reciprocating assembly to move along the longitudinal axis, in relation to the fixed assembly, from the first position to a second position to expose the first channel conduit inlet to a first manifold outlet of the first gas manifold, expose the first channel conduit outlet to a dispensing conduit inlet of the dispensing conduit, and cover a dispensing conduit outlet of the dispensing conduit. The method may include controlling a first gas source to supply a first gas to the first gas manifold in response to the reciprocating assembly being moved to the second position, to cause the first gas manifold to direct the first gas through the first channel conduit inlet to push compressible material from the first channel conduit into the dispensing conduit and to compress the compressible material in the dispensing conduit to form a first piece of compressed material within the dispensing conduit. The method may include causing the reciprocating assembly to move along the longitudinal axis, in relation to the fixed assembly, from the second position to a third position to expose the second gas manifold to the dispensing conduit inlet and expose the dispensing conduit outlet to an exterior of the apparatus. The method may include controlling a second gas source to supply a second gas in response to the reciprocating assembly being moved to the third position, to cause the second gas manifold to direct the second gas through the dispensing conduit inlet to push the first piece of compressed material out of the dispensing conduit.

The third position may be between the first position and the second position along the longitudinal axis, such that causing the reciprocating assembly to move to the first position includes causing the reciprocating assembly to move in a first direction along the longitudinal axis from the first position to the second position via the third position, causing the reciprocating assembly to move to the second position includes causing the reciprocating assembly to move in an opposite, second direction along the longitudinal axis from the third position to the first position, and causing the reciprocating assembly to move to the third position includes causing the reciprocating assembly to move in the second direction from the second position to the third position.

Causing the reciprocating assembly to move to the first position may include controlling a servomechanism coupled to the reciprocating assembly to cause the servomechanism to move the reciprocating assembly along the longitudinal axis to the first position. Causing the reciprocating assembly to move to the second position may include controlling the servomechanism to cause the servomechanism to move the reciprocating assembly in the first direction along the longitudinal axis to the second position. Causing the reciprocating assembly to move to the third position may include controlling the servomechanism coupled to the reciprocating assembly to cause the servomechanism to move the reciprocating assembly in the second direction along the longitudinal axis to the third position.

The fixed assembly may include a second hopper, the second hopper adjacent to the first gas manifold along the longitudinal axis such that the first gas manifold is between the first and second hoppers along the longitudinal axis. The reciprocating assembly may include a second channel assembly that defines a second channel conduit. The second channel assembly may be adjacent to the second gas manifold along the longitudinal axis such that the second gas manifold is between the first and second channel assemblies along the longitudinal axis. Moving the reciprocating assembly to the second position may cause a second channel conduit inlet of the second channel conduit to be exposed to the second hopper, to enable at least partial filling of the second channel conduit with bulk compressible material from the second hopper. The method may further include causing the reciprocating assembly to move from the second position to the first position to cause the second channel conduit inlet to be exposed to the dispensing conduit inlet and further causes a second channel conduit outlet of the second channel conduit to be exposed to the first manifold outlet. The method may further include controlling the first gas source to supply the first gas in response to the reciprocating assembly being moved from the second position to the first position, to cause the first gas manifold to direct the first gas through the second channel conduit inlet to push compressible material from the second channel conduit and into the dispensing conduit and to compress the compressible material in the dispensing conduit to establish a second piece of compressed material within the dispensing conduit. The method may further include moving the reciprocating assembly from the first position to the third position, and controlling the second gas source to supply the second gas, subsequently to the second piece of compressed material being established within the dispensing conduit, to cause the second gas manifold to direct the second gas through the dispensing conduit inlet to push the second piece of compressed material out of the dispensing conduit.

The first gas source and the second gas source may be a same gas source, such that the first gas and the second gas are a same type of gas and the controlling the first and second gas sources controls the same gas source.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 2C is a perspective view of the apparatus including a fixed assembly and a reciprocating assembly at a third position in relation to the fixed assembly, according to some example embodiments.

FIGS. 10A, 10B, and 10C are perspective views of the apparatus, according to some example embodiments.

FIG. 11 is an expanded view of region B of FIG. 3B, according to some example embodiments.

DETAILED DESCRIPTION OF EXAMPLE EMBODIMENTS

Figure 1:
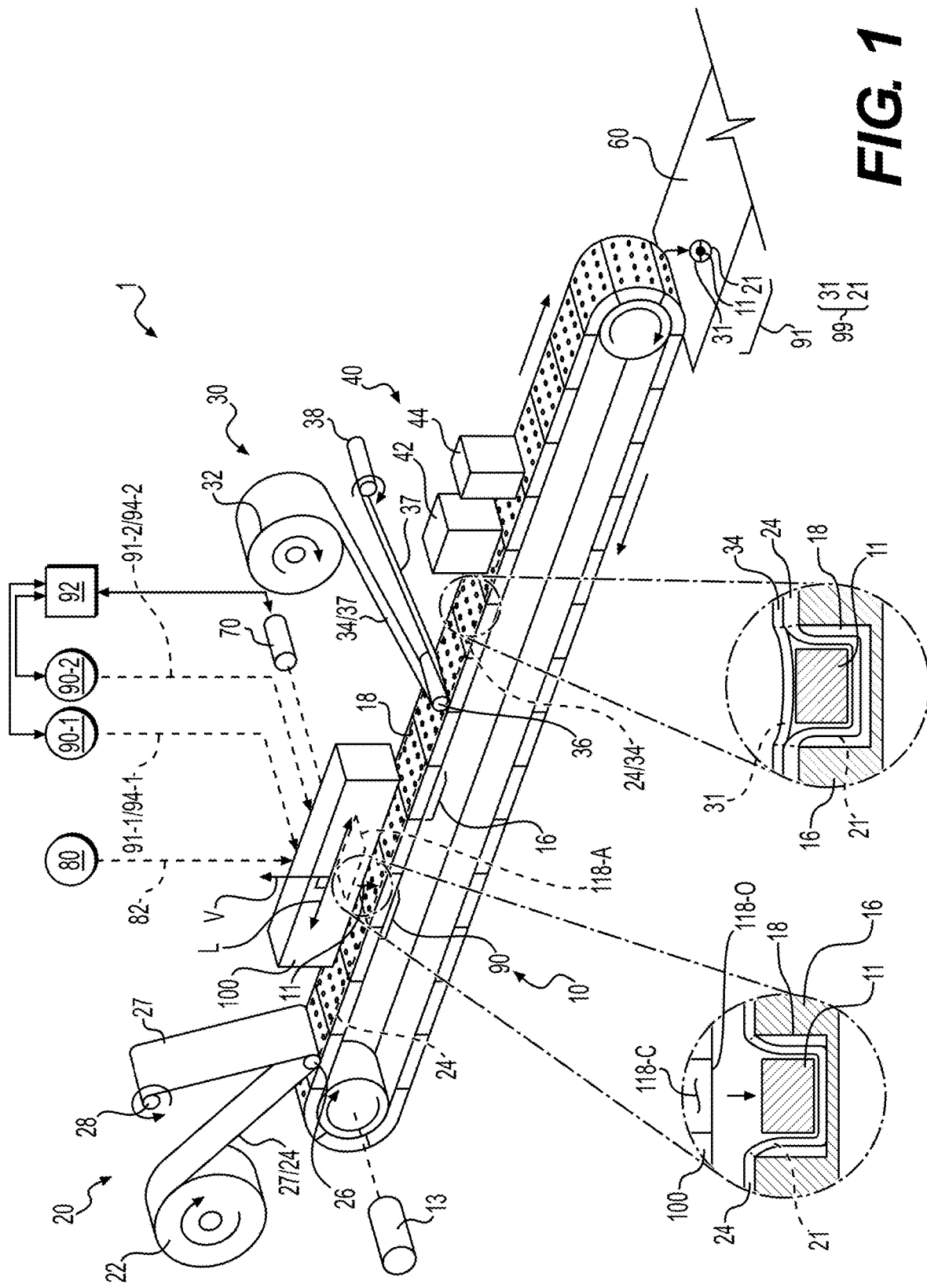
FIG. 1 is a schematic diagram view of a manufacturing system that includes an apparatus, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although channels and/or conduits described herein may be illustrated and/or described as being cylindrical, other channel and/or conduit cross-sectional forms are contemplated, such as square, rectangular, oval, triangular and others.

FIG. 1 is a schematic diagram view of a manufacturing system that includes an apparatus, according to some example embodiments.

As shown in FIG. 1, a manufacturing system 1 includes a conveyer assembly 10 that includes an endless loop of plates 16. The conveyer assembly 10 is configured to be driven by one or more conveyer pulleys 12. Each separate plate 16 includes an array of one or more cavities 18, for example a 4×3 array of twelve cavities 18 as shown in FIG. 1. The manufacturing system 1 further includes a bulk material source 80 of a bulk compressible material 82 and an apparatus 100 configured to form one or more pieces 11 of compressed material out of the bulk compressible material 82 and provide (e.g., discharge, push, supply, etc.) the pieces 11 from an array 118-A of dispensing conduits 118-C into separate, respective cavities 18 that are each vertically aligned with a separate dispensing conduit 118-C of the array 118-A. As described herein, a piece 11 of compressed material may be interchangeably be referred to as a "dose" of compressed material.

Figure 12:
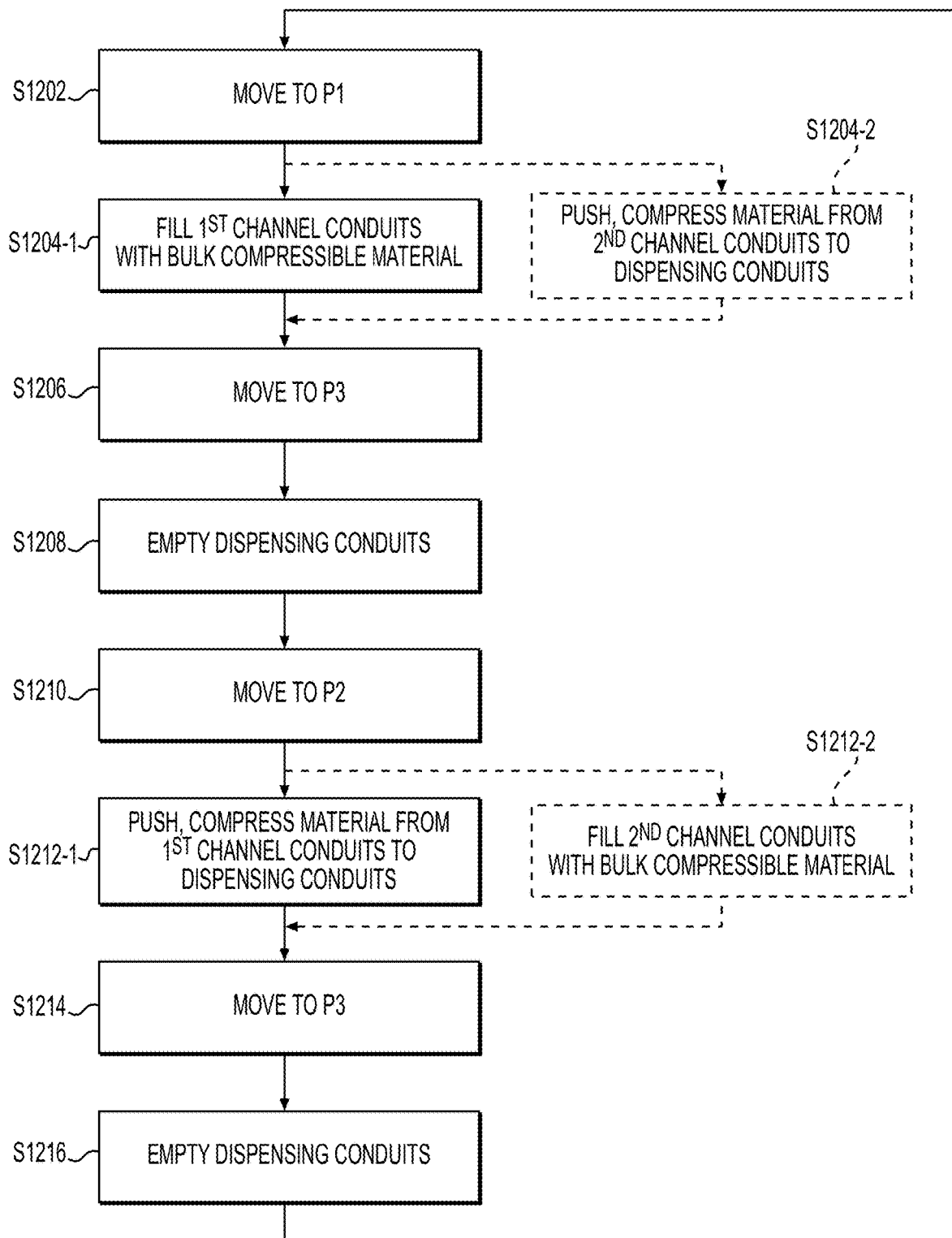
FIG. 12 is a flowchart showing a method according to some example embodiments.

The manufacturing system 1 further includes bottom and top packaging assemblies 20 and 30 configured to provide respective bottom and top packaging material portions 21 and 31 that are joined together to form pouches 91 that provide respective enclosures to seal (e.g., "package," "enclose," etc.) separate, respective pieces 11 of compressed material provided by apparatus 100 to thus form separate, respective packaged pieces 99 of compressed material. The manufacturing system 1 further includes a sealing and inspection assembly 40 that includes a sealing assembly 42 configured to complete sealing of the provided pieces 11 of compressed material in the provided portions 21 and 31 of packaging material (e.g., to complete forming the pouches 91) and an inspection assembly 44 configured to monitor the packaged pieces 99 to generate sensor data that may be processed to determine whether the packaged pieces 99 are being formed properly. The packaged pieces 99 may be discharged from the cavities 18 at a discharge station 60, for example based on the plate 16 moving around the endless loop so that the plate 16 inverts to enable the packaged pieces 99 to fall out of the cavities 18 of the plate 16 according to gravity. As shown in FIG. 12, the discharge station 60 may include a chute configured to catch and direct packaged pieces 99 that fall out of inverted plates 16, but example embodiments are not limited thereto.

In operation, the manufacturing system 1 may operate based on the endless loop of plates 16 of the conveyer assembly 10 moving due to one or more pulleys 12 being driven by one or more driver motors 13 (which may be any well-known driver motor used to drive a conveyer belt assembly, any well-known servomechanism, or the like) to cause the endless loop of plates 16 to move around the pulleys 12. As shown, a given plate 16 may, based on the endless loop being driven to move by the driver motor 13, move sequentially between the bottom packaging assembly 20, the apparatus 100, the top packaging assembly 30, the sealing assembly 42, the inspection assembly 44, and the discharge station 60 before looping back to the bottom packaging assembly 20.

The bottom packaging assembly 20 may include a supply roll 22 of a sheet 24 of bottom packaging material (e.g., any well-known packaging material), which is attached to a supply sheet 27. The sheets 24/27 may be fed from supply roll 22 to return roll 28 via tension roller 26, where the sheets 24/27 as feed from the supply roll 22 are attached to each other and the supply sheet 27 is between the sheet 24 of bottom packaging material and the tension roller 26 when the sheets 24/27 move around the tension roller 26. As a result, the feeding of the sheets 24/27 around the tension roller 26 brings the sheet 24 of bottom packaging material proximate to and/or in contact with one or more plates 16 that are moving around the endless loop of the conveyer assembly 10. The tension roller 26 may cause the sheet 24 of bottom packaging material to detach from (e.g., strip off of) the supply sheet 27 and lay on one or more plates 16, for example based on the tension roller 26 applying tension to the combined, attached sheets 24/27 moving around the tension roller 26, where the supply sheet 27 is in contact with the tension roller 26 while the sheet 24 of bottom packaging material is isolated from the tension roller 26 by the supply sheet 27, such that the applied tension causes the sheet 24 of bottom packaging material to detach from (e.g., strip off of) supply sheet 27, as the sheets 24/27 move around the tension roller 26, and thus lay on one or more plates 16 moving under the tension roller 26 while the supply sheet 27 returns to the return roll 28.

In some example embodiments, the tension roller 26 is configured (e.g., based on the particular positioning of the tension roller 26 in relation to the conveyer 10 and thus plates 16 thereon) to cause the sheet 24 of bottom packaging material to contact an upper surface of one or more plates 16 when the combined, attached sheets 24/27 move around the tension roller 26, such that the tension roller 26 pushes the sheet 24 into contact with the one or more plates 16. The sheet 24 of bottom packaging material may detach from the supply sheet 27 based on being pushed into contact with one or more plates 16 by the tension roller 26. For example, in some example embodiments, the sheet 24 may include an at least partially adhesive (e.g., at least mildly adhesive) material that may at least mildly adhere to a portion (e.g., top surface) of one or more plates 16 that the tension roller 26 pushes the sheet 24 into contact with, such that the sheet 24 detaches from the supply sheet 27 based on being pushed into contact with the portion of the one or more plates 16 by the tension roller 26.

As a result of detaching from the supply sheet 27 and laying on one or more plates 16, the sheet 24 of bottom packaging material is caused (e.g., by the tension roller 26) to lay over the cavities 18 of the plates 16 as the plates 16 move under the tension roller 26, such that the sheet 24 of bottom packaging material does not return to return roll 28 with the supply sheet 27. The conveyer assembly 10 may operate to move a plate 16 to the bottom packaging assembly 20, to at least partially vertically overlap at least tension roller 26 (e.g., be vertically aligned therewith, or vertically overlap therewith, in vertical direction V), to cause the sheet 24 to be detached from the supply sheet 27 by the tension roller 26 to lay over the cavities 18 of the plate 16, where the cavities 18 are otherwise empty when the plate 16 is at (e.g., vertically aligned with) the bottom packaging assembly 20. In some example embodiments, the return roll 28 may be connected to a driver that turns the return roll 28 to cause the supply sheet 27, with sheet 24 attached thereto, to be supplied from the supply roll 22 to the tension roller 26 to detach the sheet 24 of bottom packaging material from the supply sheet 27, and where such a rate of supply of sheets 24/27 may be coordinated with the rate of movement of the endless loop of plates 16.

The apparatus 100, which is described further below with reference to FIGS. 2A-11, may operate to compress and portion the bulk compressible material 82 into one or more pieces 11 of compressed material and provide (e.g., discharge) said pieces 11 from the apparatus 100. The conveyer assembly 10 may operate to move a plate 16 from the bottom packaging assembly 20 to the apparatus 100, to a particular fixed position 90 in relation to the manufacturing system 1, where the cavities 18 of the plate 16 are vertically aligned (e.g., vertically overlap in the vertical direction V) with separate, respective dispensing conduit outlets 118-O of an array 118-A of dispensing conduits 118-C of the apparatus 100, as shown in FIGS. 2A-11, based on the plate 16 being moved to, and thus at, position 90. The array 118-A of dispensing conduits 118-C may remain fixed in position, vertically aligned with position 90, throughout operation of the apparatus 100.

The apparatus 100 may operate to provide (e.g., discharge, supply, etc.) one or more pieces 11 of compressed material, via respective dispensing conduit outlets 118-O of the array 118-A of dispensing conduits 118-C, into separate, respective cavities 18 of a plate 16 that are vertically aligned with the dispensing conduit outlets 118-O based on the plate 16 being at position 90. Because the sheet 24 of bottom packaging material is overlaying the cavities 18 of the plate 16 that is moved from the bottom packaging assembly 20 to position 90 to vertically overlap (e.g., be vertically aligned with in the vertical direction V) the array 118-A of the apparatus 100, each piece 11 of compressed material discharged from a given dispensing conduit 118-C of the array 118-A to a separate cavity 18 of the plate 16 may push a separate portion 21 of the sheet 24 of bottom packaging material down into the separate cavity 18 underneath the discharged piece 11 of compressed material, for example based on the weight of the piece 11 pushing the portion 21 of the sheet 24 of bottom packaging material deeper into the cavity 18.

The top packaging assembly 30 may include a supply roll 32 of a sheet 34 of top packaging material (e.g., any well-known packaging material which may be the same or different than the bottom packaging material), which is attached to a supply sheet 37. The sheets 34/37 may be fed from supply roll 32 to return roll 38 via tension roller 36, where the sheets 34/37 as feed from the supply roll 32 are attached to each other and the supply sheet 37 is between the sheet 34 of top packaging material and the tension roller 36 when the sheets 34/37 move around the tension roller 36. As a result, the feeding of the sheets 34/37 around the tension roller 36 brings the sheet 34 of top packaging material proximate to and/or in contact with one or more plates 16, and/or sheets 24 of bottom packaging material laying on said one or more plates 16, that are moving around the endless loop of the conveyer assembly 10. The tension roller 36 may cause the sheet 34 of top packaging material to detach from (e.g., strip off of) the supply sheet 37 and lay on the plates 16 for example based on the tension roller 36 applying tension to the combined sheets 34/37 moving around the tension roller 36, where the supply sheet 37 is in contact with the tension roller 36 while the sheet 34 of top packaging material is isolated from the tension roller 36 by the supply sheet 37, such that the applied tension causes the sheet 34 of top packaging material to detach from (e.g., strip off of) supply sheet 37 and thus lay on one or more plates 16 moving under the tension roller 36 (e.g., lay on the sheet 24 of bottom packaging material that is laying on the one or more plates 16) while the supply sheet 37 returns to the return roll 38.

In some example embodiments, the tension roller 36 is configured (e.g., based on the particular positioning of the tension roller 36 in relation to the conveyer 10 and thus plates 16 thereon) to cause the sheet 34 of top packaging material to contact the sheet 24 of bottom packaging material that is laying on an upper surface of one or more plates 16 when the combined, attached sheets 34/37 move around the tension roller 36, such that the tension roller 36 pushes the sheet 34 into contact with the sheet 24. The sheet 34 of top packaging material may detach from the supply sheet 37 based on being pushed into contact with the sheet 24 by the tension roller 36. For example, in some example embodiments, the sheet 34 may include an at least partially adhesive (e.g., at least mildly adhesive) material that may at least mildly adhere to a portion (e.g., top surface) of the sheet 24 of bottom packaging material, on the one or more plates 16, that the tension roller 36 pushes the sheet 34 into contact with, such that the sheet 34 detaches from the supply sheet 37 based on being pushed into contact with the portion of the sheet 24 of bottom packaging material by the tension roller 36.

As a result of detaching from the supply sheet 37 and laying on the sheet 24 of bottom packaging material that is laying on the one or more plates 16, the sheet 34 of top packaging material is caused (e.g., by the tension roller 36) to lay over the cavities 18 of the plates 16 as the plates 16 move under the tension roller 36, such that the sheet 34 of top packaging material does not return to return roll 38 with the supply sheet 37. The conveyer assembly 10 may operate to move a plate 16 from the apparatus 100 to the top packaging assembly 30, to at least partially vertically overlap at least tension roller 36 (e.g., be vertically aligned therewith, or vertically overlap therewith, in vertical direction V), to cause the sheet 34 to be detached from the supply sheet 37 by the tension roller 36 to lay over the cavities 18 of the plate 16. As the plate 16 that is at the top packaging assembly 30 may include, in one or more cavities 18 thereof, a piece 11 of compressible material that is laying on a portion 21 of the sheet 24 of bottom packaging material that is pushed into the cavity 18 under the piece 11, the overlaying sheet 34 of top packaging material may cover the pieces 11 in the separate, respective cavities 18 and may overlay the sheet 24 of bottom packaging material, such that each separate piece 11 in a separate cavity 18 is overlaid with a separate portion 31 of the sheet 34 of top packaging material. In some example embodiments, the return roll 38 may be connected to a driver that turns the return roll 38 to cause the supply sheet 37, with sheet 34 attached thereto, to be supplied from the supply roll 32 to the tension roller 36 to detach the sheet 34 of top packaging material from the supply sheet 37, and where such a rate of supply of sheets 34/37 may be coordinated with the rate of movement of the endless loop of plates 16.

The conveyer assembly 10 may operate to move the plate 16 from the top packaging assembly 30 to the sealing and inspection assembly 40, where sealing assembly 42 may join portions 31 of the sheet 34 of top packaging material that overlay separate, respective cavities 18 of the plate 16 with the respective portions 21 of the sheet 24 of bottom packaging material that underlay the pieces 11 in the respective cavities 18. Such joining of separate sets of portions 21, 31 of packaging material for each cavity 18 may also include separating said portions 21, 31 from the remainder of the respective sheets 24, 34 of packaging material, to form pouches 91 that comprise portions 21, 31 of packaging material that are joined together via any well-known means for joining packaging portions (e.g., fused together, stamped together, etc.) to encompass and/or enclose separate, respective pieces 11 of compressible material in the separate, respective cavities 18. The sealing assembly 42 may be configured to remove the remainder of the respective sheets 24, 34 of packaging material from laying on the plate 16 that is at the sealing assembly 42, for example based on mechanically removing the remainder of the respective sheets 24, 34 via a mechanical manipulator device that actively grabs the remainder of the respective sheets 24, 34 and moves same from the plate 16, a shoulder that passively induces the remainder of the respective sheets 24, 34 to slide off of the plate 16 as the plate moves in relation to the sealing assembly 42, a device that induces an air flow to push or pull the remainder of respective sheets 24, 34 off of the plate 16, any combination thereof, or the like. The inspection assembly 44 may scan and/or monitor some or all of the plates 16 to generate sensor data that may be processed (e.g., by a computing device) to determine whether pouches 91 in the cavities 18 of the plate 16 are being properly formed.

The conveyer assembly 10 may operate to move a plate 16 from the sealing and inspection assembly 40 around the endless loop to the discharge station 60, such that packaged pieces 99 in the cavities 18 of the plate 16 are discharged from the cavities 18 as the plate 16 moves from assembly 40 to assembly 20 around the conveyer assembly 10 via discharge station for example the packaged pieces 99 may fall out of the cavities 18 of the plate 16 as the plate inverts at discharge station 60 due to moving around the endless loop. As a result, pieces 11 of compressed material may be packaged into individual packaged pieces 99 and discharged from the manufacturing system 1 at discharge station 60.

Still referring to FIG. 1, the apparatus 100 may be a reciprocating manufacturing apparatus that is configured to form and provide (e.g., discharge) pieces 11 of compressed material based on one or more portions of the apparatus 100 moving in a reciprocating motion along a longitudinal axis L between various fixed positions in relation to manufacturing system 1. The apparatus 100 may be configured to compress and portion (e.g., sever, segment, etc.) the bulk compressible material 82 supplied from bulk material source 80 into separate pieces 11, such that each piece 11 has a particular (or, alternatively, predetermined) density, volume, and mass based on such motion. As a result, the manufacturing system 1 may be configured to provide pieces 11 of compressible material having a reliable and consistent volume, density, and mass and thus provide a more consistent packaged material product.

While the plates 16 are shown to include an array of multiple cavities 18, it will be understood that a given plate 16 may be limited to including a single cavity 18, and the apparatus 100 may include an array 118-A that is limited to a single dispensing conduit 118-C that may vertically overlap the single cavity 18 based on the plate being moved to position 90.

Still referring to FIG. 1, the manufacturing system 1 may include first and second gas sources 90-1, 90-2 of one or more gases, one or more servomechanisms 70, and one or more controller devices 92. The controller device 92 may be communicatively linked to servomechanism 70 and/or gas sources 90-1, 90-2 (e.g., gas source valves included in the gas sources 90-1, 90-2) and may be configured to control the servomechanism 70 and/or gas sources 90-2 to control operation of the apparatus 100 to form and provide pieces 11 of compressed material based on compressing and portioning bulk compressible material 82. The servomechanism 70 may be fixed to one or more portions of the apparatus 100 and thus may be configured to operate to move the one or more (e.g., reciprocating) portions of the apparatus 100 between separate positions in relation to one or more other (e.g., fixed) portions of the apparatus 100 along a longitudinal axis L. The first and second gas sources 90-1, 90-2 may be configured to supply first and second gases 94-1, 94-2 to the apparatus 100, via separate, respective gas conduits 91-1, 91-2 (e.g., pipes, tubing, etc.) to enable compression and/or discharge of instances (e.g., pieces, discrete volumes, etc.) of compressible material from the apparatus 100.

The controller device 92 (also referred to herein as a computing device) may be included in, may include, and/or may be implemented by one or more instances of processing circuitry such as hardware including logic circuits, a hardware/software combination such as a processor executing software; or a combination thereof. For example, the controller device 92 may include, but is not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc. In some example embodiments, the controller device 92 may include a memory that may include a non-transitory computer readable storage device, for example a solid state drive (SSD), storing a program of instructions, and the controller device 92 may include processing circuitry that may be configured to execute the program of instructions to implement the functionality of the controller device 92 to control operation of at least the apparatus 100.

In some example embodiments, the controller device 92 may be configured to control some or all assemblies and/or devices of manufacturing system 1 to control operation of the manufacturing system 1. For example, the controller device 92 may be configured to control driver motor 13, drivers connected to return rolls 28 and 38, the sealing and inspection assembly 40, some combination thereof, or the like. The controller device 92 may be configured to control and/or adjust operation of the manufacturing system 1 (e.g., adjust first gas 94-1 flow rate and/or second gas 94-2 flow rate, adjust driver motor 13 speed, adjust servomechanism 70 motion, etc.) based on processing sensor data generated by the inspection assembly 44.

The first gas source 90-1 may include a container holding a first gas 94-1 and a gas flow control valve that is configured to adjustably control a release (e.g., supply) of the first gas 94-1 from the container. The first gas source 90-1 may be configured to supply the first gas 94-1 (e.g., via a first gas conduit 91-1 which may be coupled to the gas flow control valve of the first gas source 90-1) to the apparatus 100 to cause compression of a bulk instance 84 of compressible material in at least a portion of the apparatus 100. The first gas 94-1 may be supplied at a pressure ("positive pressure") that exceeds the ambient pressure of the ambient environment surrounding the apparatus 100. For example, the first gas source 90-1 may be configured to supply the first gas 94-1 to the apparatus 100 at a pressure of about 10 psig. The first gas 94-1 may be supplied to compress a bulk instance 84 of compressible material in the apparatus 100 to cause the bulk instance to have a new, particular density. The first gas 94-1 may be supplied to push at least a portion of the bulk instance 84 of compressible material into a particular, fixed volume, either before, during, or after the compression of said compressible material. The controller device 92 may control the first gas source 90-1 (e.g., based on controlling a gas flow control valve of the first gas source 90-1) to control the flow ("flow rate," "flow velocity," some combination thereof, or the like) of the first gas 94-1, to adjust, inhibit, initiate, etc. the flow of the first gas 94 supplied by the first gas source 90-1.

The amount of compression and/or particular density of the compressed material of the pieces 11 that results from said compression may be determined based on a supply and/or pressure of the first gas 94-1, which may be determined at controller device 92 based on accessing a look-up-table (LUT) that associates density values of compressed material in pieces 11 with a control signal and/or control position of a gas flow control valve of the first gas source 90-1 to cause compression of compressible material to said density values. Such a look-up-table may be created according to well-known empirical techniques for creating look-up-tables based on experimental data (e.g., compressing compressible material pieces with the first gas 94-1 at various pressures and/or gas flow valve control positions and associating the resulting density valves with the gas flow valve control positions and/or control signals transmitted to the first gas source 90-1 to cause said gas flow valve control positions).

Each dispensing conduit 118-C of the array 118-A may have a fixed volume, defined by the dimensions of the inner surfaces 118-S defining the dispensing conduit 118-C. The apparatus 100 may segment ("portion") the compressed instance 86 of compressible material so that a portion 86-2 of the compressed instance 86 that is in the fixed-volume space of a dispensing conduit 118-C is a discrete piece 11 of compressed material having a particular volume defined by the fixed-volume dimensions of the dispensing conduit 118-C. The apparatus 100 may cause the piece 11 to be severed from a remainder portion 86-1 of the compressed instance 86 and subsequently discharged from the apparatus 100 via a dispensing conduit outlet 118-O. The size and shape (e.g., volume) of the piece 11 may be defined by the dimensions of the fixed-volume space of the dispensing conduit 118-C in which the portion 86-2 of the compressed instance 86 is held, such that each formed piece 11 may have the same or substantially the same volume (e.g., the same volume within manufacturing tolerances and/or material tolerances). Additionally, the density of each piece 11 may be based on the amount of compression of the bulk instance 84 of compressible material to form the compressed instance 86 that is at least partially within the dispensing conduit 118-C. The amount of compression may be controlled via control of the flow of the first gas 94-1, such that the density of the pieces 11 may be caused to be the same or substantially the same based on controlling the supply of first gas 94-1 to control the pushing and/or compression of the bulk instance 84 of compressible material in the dispensing conduit 118-C.

The second gas source 90-2 may include a container holding a second gas 94-2 and a gas flow control valve that is configured to adjustably control a release (e.g., supply) of the second gas 94-2 from the container. The second gas source 90-2 may be configured to supply the second gas 94-2 (e.g., via a second gas conduit 91-2 which may be coupled to the gas flow control valve of the second gas source 90-2) to the apparatus 100 to cause the one or more portioned instances (e.g., pieces 11) of compressed material to be discharged ("provided," "supplied," "pushed," etc.) from the fixed-volume spaces (e.g., dispensing conduits 118-C) of the apparatus 100 in which the pieces 11 are formed and to an exterior of the apparatus 100. Thus, the second gas source 90-2 may be understood to be configured to supply the second gas 94-2 to the apparatus 100 to cause the one or more pieces 11 to be discharged from the apparatus 100. The controller device 92 may control the second gas source 90-2 (e.g., based on controlling a gas flow control valve of the second gas source 90-2) to control the flow ("flow rate," "flow velocity," some combination thereof, or the like) of the second gas 94-2, to adjust, inhibit, initiate, etc. the flow of the second gas 94-2 supplied by the second gas source 90-2.

The timing of the flow of the first gas 94-1 and second gas 94-2 may be determined at controller device 92. In some example embodiments, the controller device 92 may cause the flow of first gas 94-1 and second gas 94-2 to the apparatus 100 to be continuous throughout operation of the apparatus.

In some example embodiments, the first and second gas sources 90-1 and 90-2 are the same gas source (a common, or same gas source) configured to supply a common, or same gas, via separate gas conduits 91-1 and 91-2 and/or separate gas flow control valves, to compress a bulk instance 84 of compressible material in the apparatus 100 and to discharge the one or more pieces 11 of compressed material from the apparatus 100, respectively. The first and second gases 94-1 and 94-2 may be supplied, by a common gas source and/or different gas sources, to the apparatus 100 at a common pressure or at different pressures. The first and second gases 94-1 and 94-2, as described herein, may be any gas, including air. In some example embodiments, including example embodiments where the first gas source 90-1 and the second gas source 90-2 are different gas sources, the first and second gases 94-1 and 94-2 may be different gases.

In some example embodiments, the controller device 92, the servomechanism 70, the first gas source 90-1 and/or the second gas source 90-2 may be considered to be a part of the apparatus 100. In some example embodiments, one or more characteristics of the pieces 11 formed by the apparatus 100 may be controlled (e.g., based on controller device 92 accessing a look-up-table that associates control signals to one or more elements of the manufacturing system 1 to one or more characteristics of the pieces 11) in order to provide a packaged product having one or more relatively consistent characteristics. For example, at least a portion of the apparatus 100 (e.g., the controller device 92) may be configured to control the density, mass, and/or volume of the pieces 11 of compressed material that are provided by the apparatus 100 in order to ensure that each packaged piece 99 includes the same or substantially the same (e.g., the same within manufacturing tolerances and/or material tolerances) mass, volume, density, and/or shape of compressed material, thereby providing a relatively consistent end product to consumers. It will be understood that when elements and/or characteristics are described herein to be "the same", said elements and/or characteristics may be substantially the same.

In some example embodiments, based on the material to be portioned for packaging of the individual portioned instances thereof being a compressible material, at least the density and/or weight of the individual pieces 11 of compressed material may be at least partially controlled (e.g., by at least a portion of apparatus 100, including controller device 92) based on compressing a bulk instance 84 of the compressible material within the apparatus 100 to achieve a particular density of the compressed material and then segmenting (e.g., severing, portioning, isolating, etc.) the compressed bulk instance into multiple portions (e.g., a piece 11 and a remainder portion 86-1), such that each portioned piece 11 may have a relatively common density that is at least approximately the particular density.

In some example embodiments, the compressible material as described herein may have fluidic characteristics (e.g., may be "moist" and/or "wet"), such that the material may have a relatively high viscosity, and may be at least mildly adhesive to various surfaces (e.g., may be "sticky"). Such a material may at least partially adhere to portions of the apparatus 100, for example inner surfaces of a channel in which the material is compressed. In some example embodiments, the apparatus 100 according to some example embodiments, including the example embodiments shown in at least FIGS. 2A-11, is configured to enable compression and portioning of bulk instances 84 of the compressible material, and thus provides an improved apparatus for portioning compressible material in pieces having a particular volume, density, and/or mass based on utilizing one or more supplies of gas to compress a bulk instance 84 of compressible material at least partially into a fixed-volume dispensing conduit 118-C and to discharge portioned pieces 11 of compressed material from the dispensing conduit 118-C. Such a use of gas may enable relatively simple and rapidly and easily adjustable control of material compression and discharge with reduced apparatus complexity, reduced maintenance requirements, and/or reduced risk of disrupting a target density and/or volume of the portioned instances of material during the discharge of said instances from the apparatus 100. In some example embodiments, the bulk compressible material 82 that may be compressed and portions into pieces 11 of compressed material may include tobacco.

FIGS. 2A-11 are views of one or more portions of an apparatus 100 including a fixed assembly 102 and a reciprocating assembly 104 that is configured to move along a longitudinal axis L in relation to the fixed assembly, according to some example embodiments.

Figure 2A:
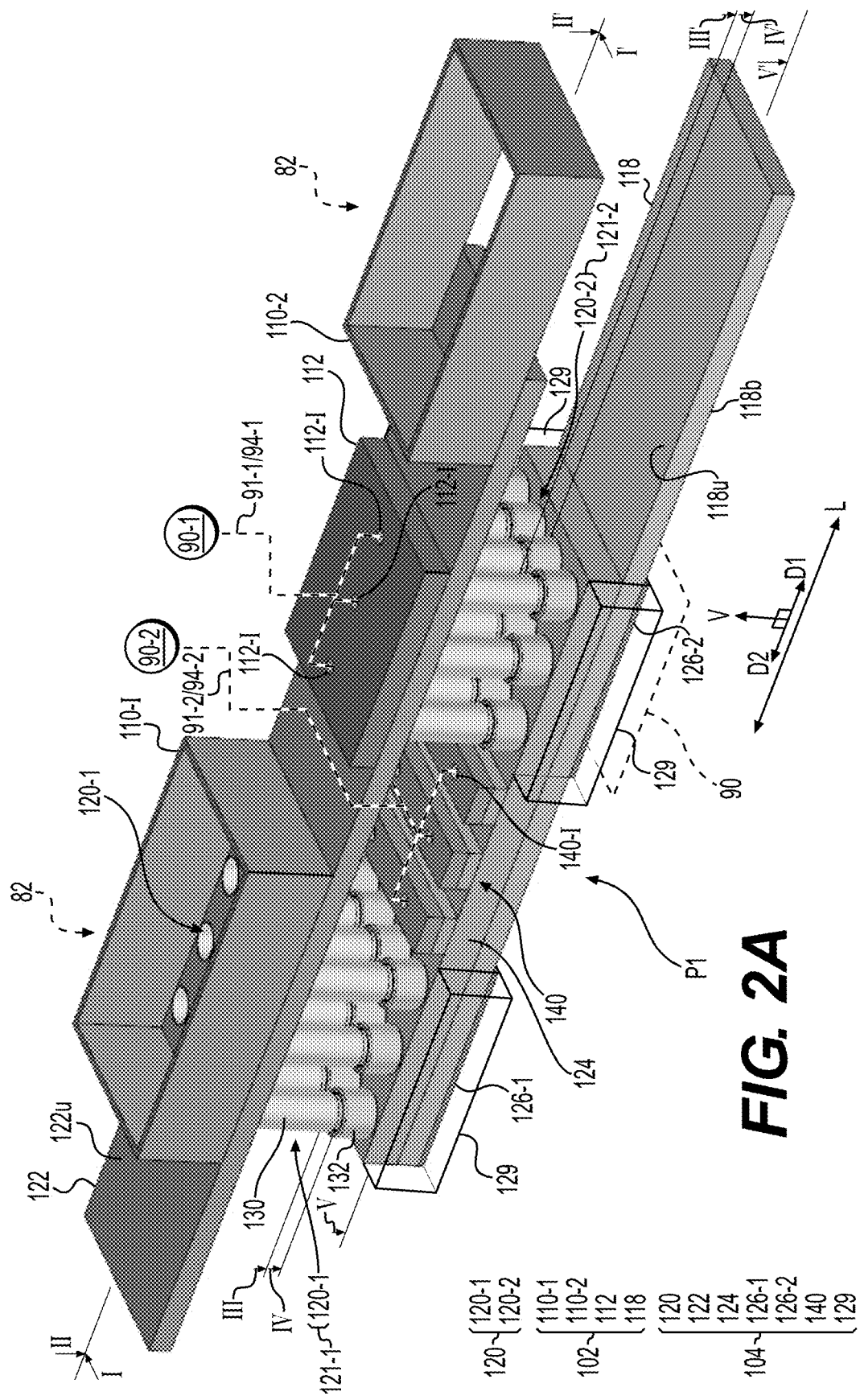
FIG. 2A is a perspective view of the apparatus including a fixed assembly and a reciprocating assembly at a first position in relation to the fixed assembly, according to some example embodiments.
Figure 2B:
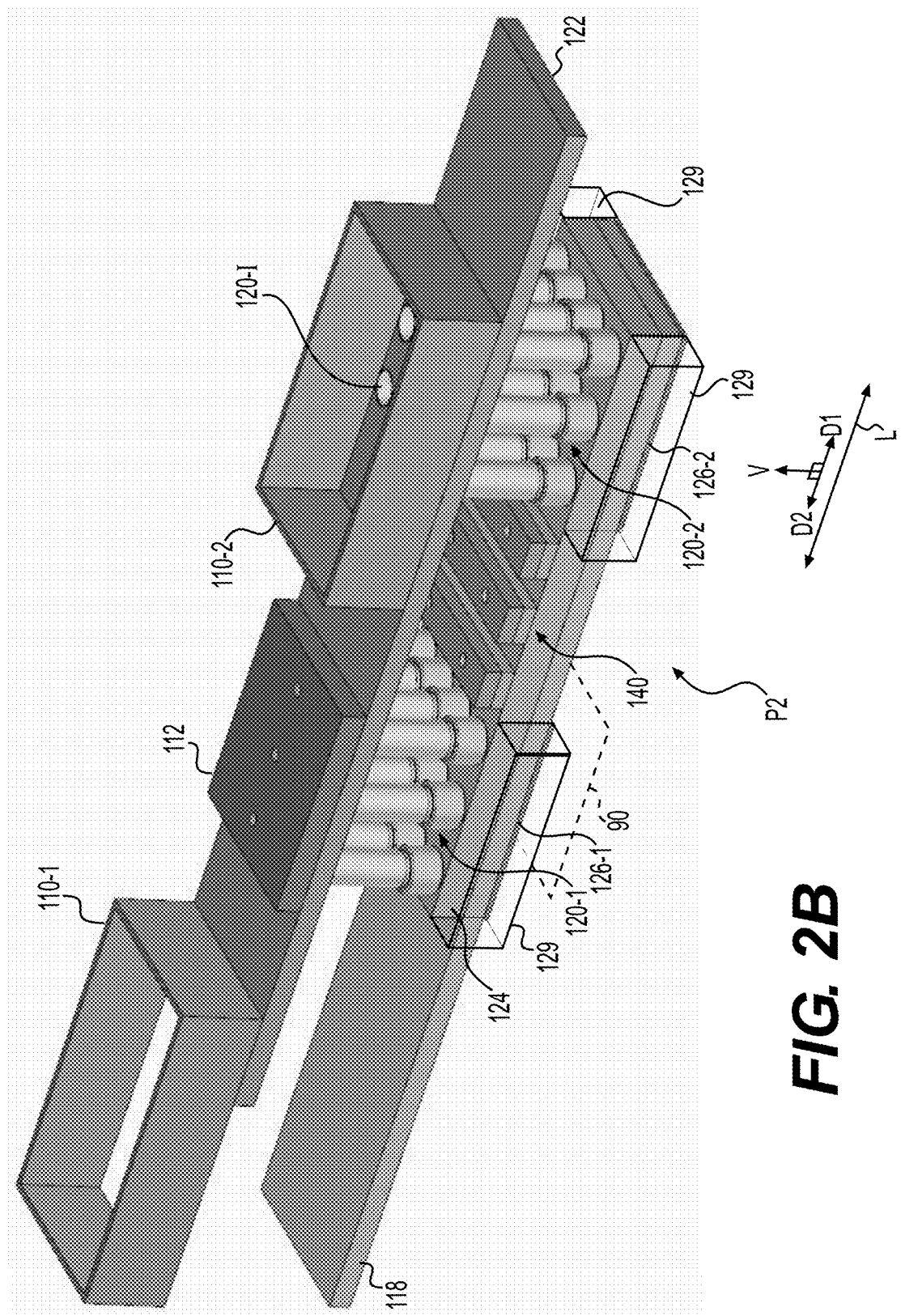
FIG. 2B is a perspective view of the apparatus including a fixed assembly and a reciprocating assembly at a second position in relation to the fixed assembly, according to some example embodiments.
Figure 3A:
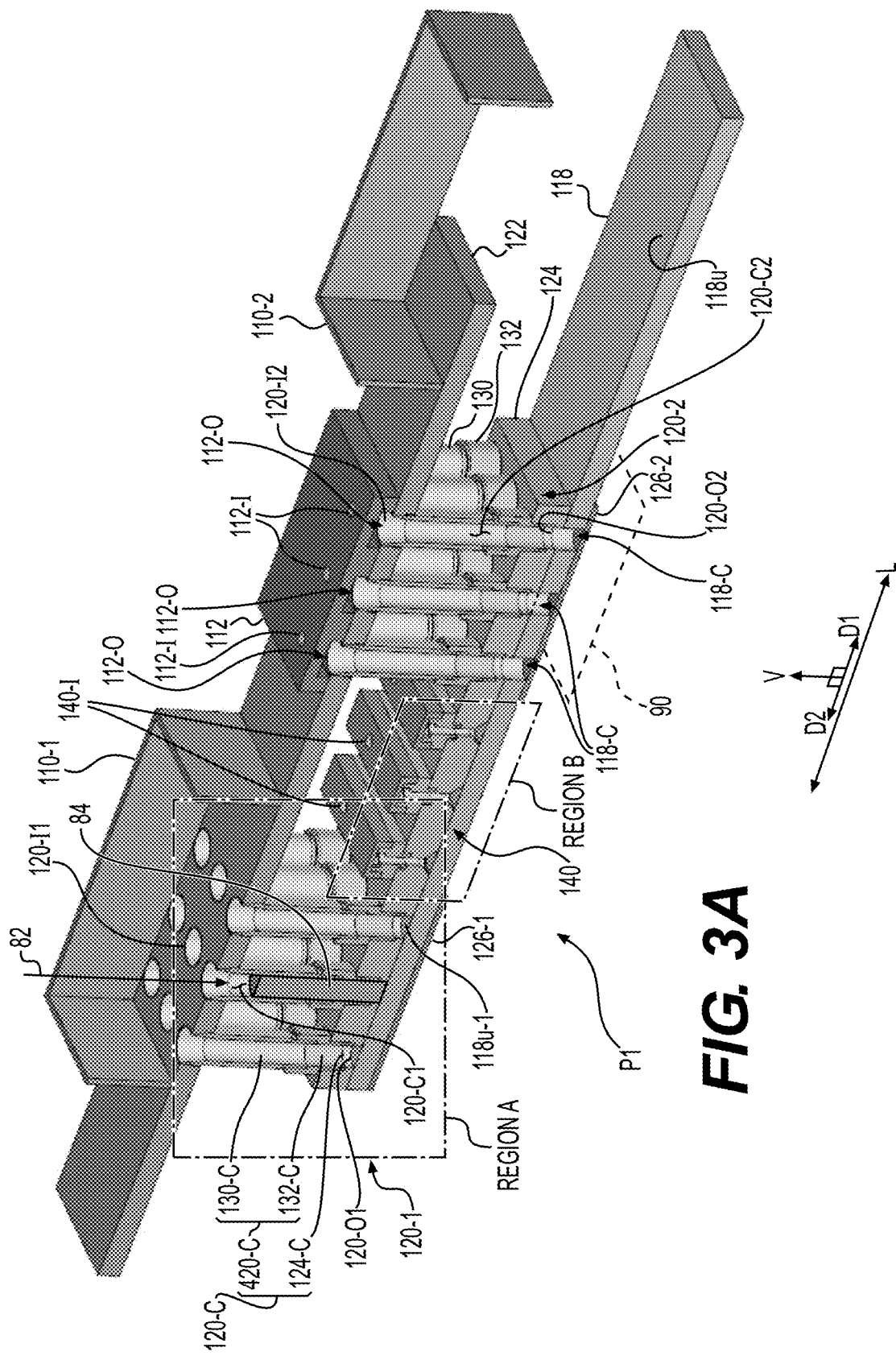
FIGS. 3A, 3B, and 3C are cross-sectional views along line I-I' of the apparatus of FIGS. 2A, 2B, and 2C, respectively, according to some example embodiments.
Figure 3B:
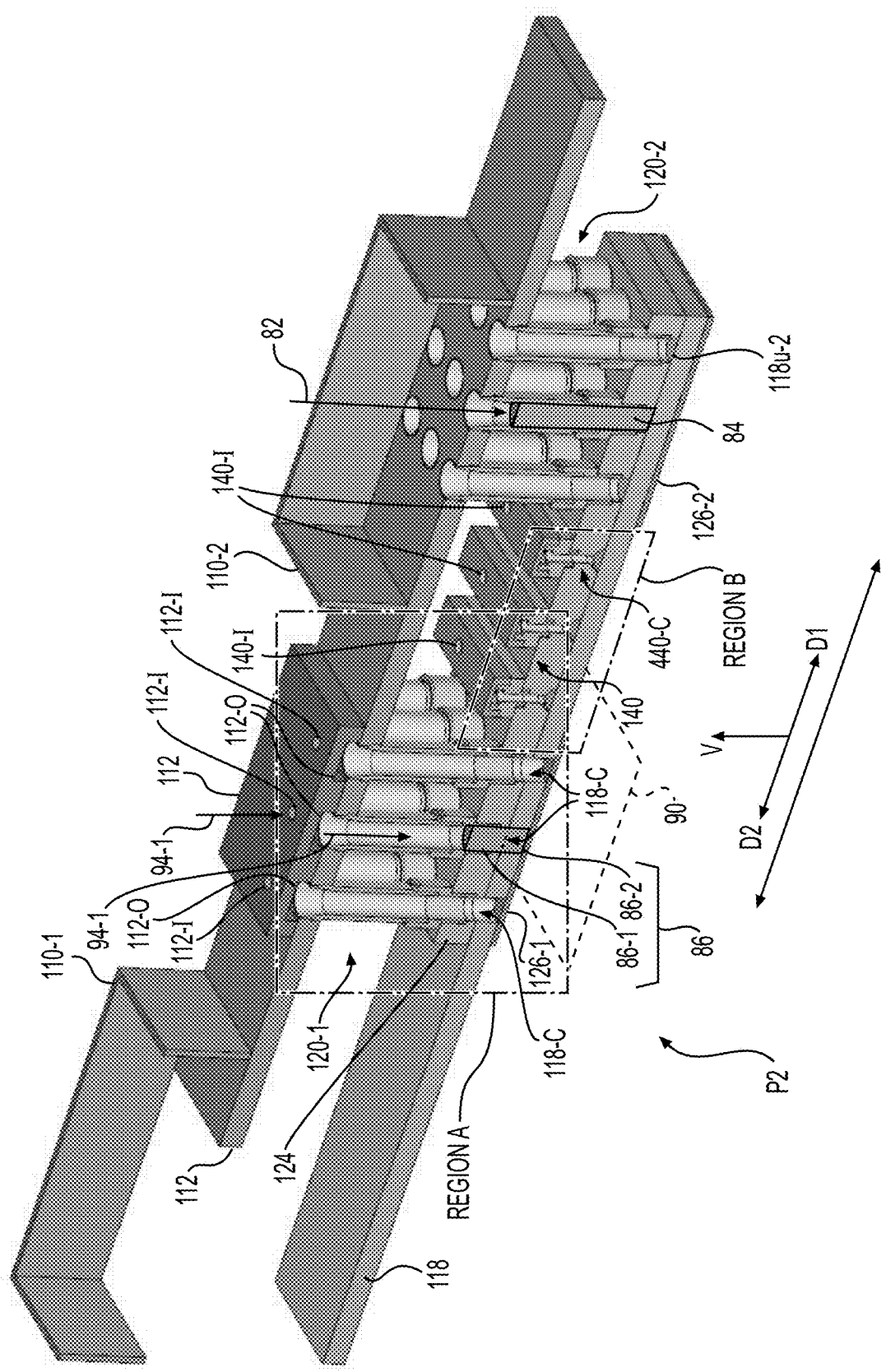
Figure 3C:
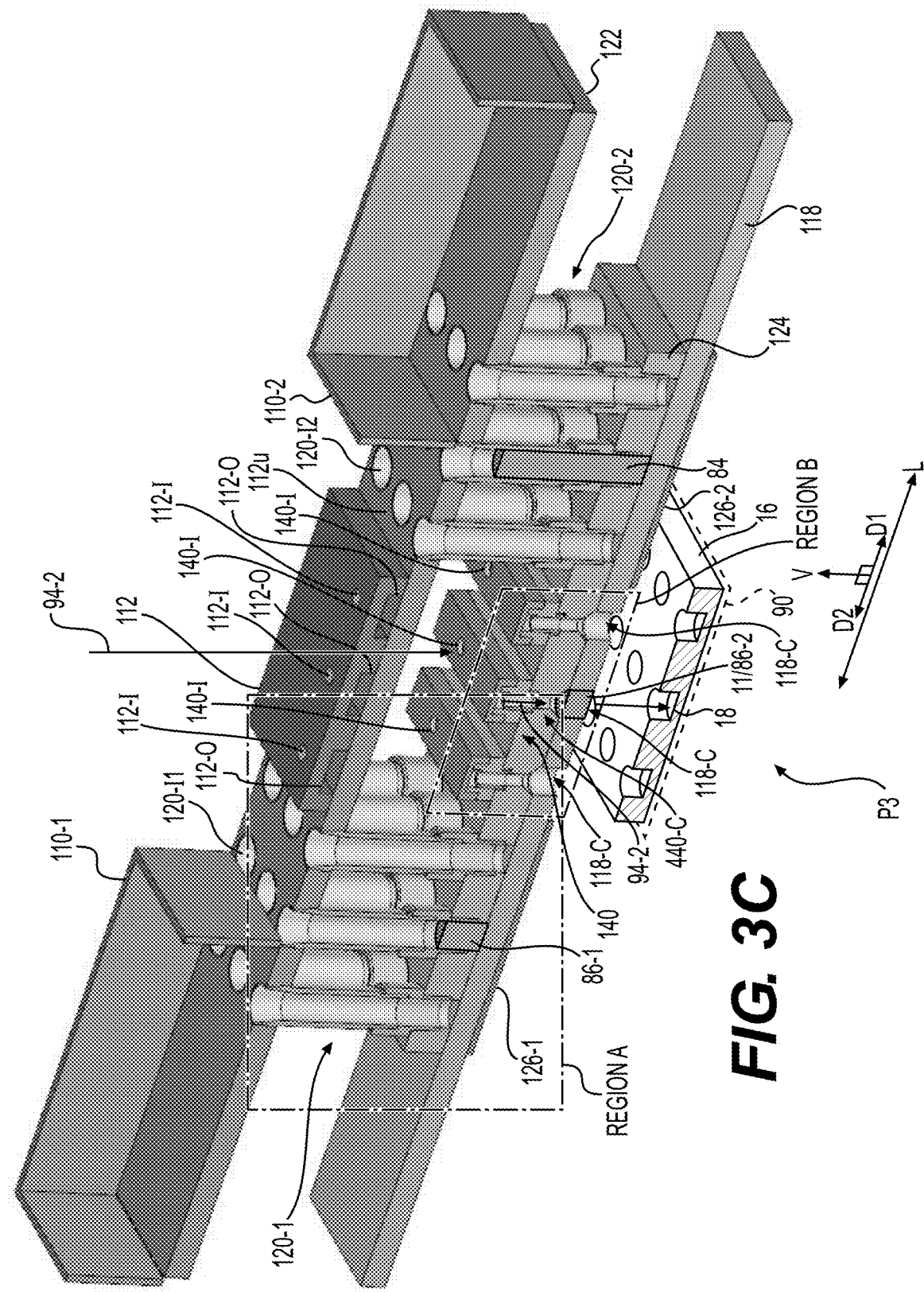
Figure 4A:
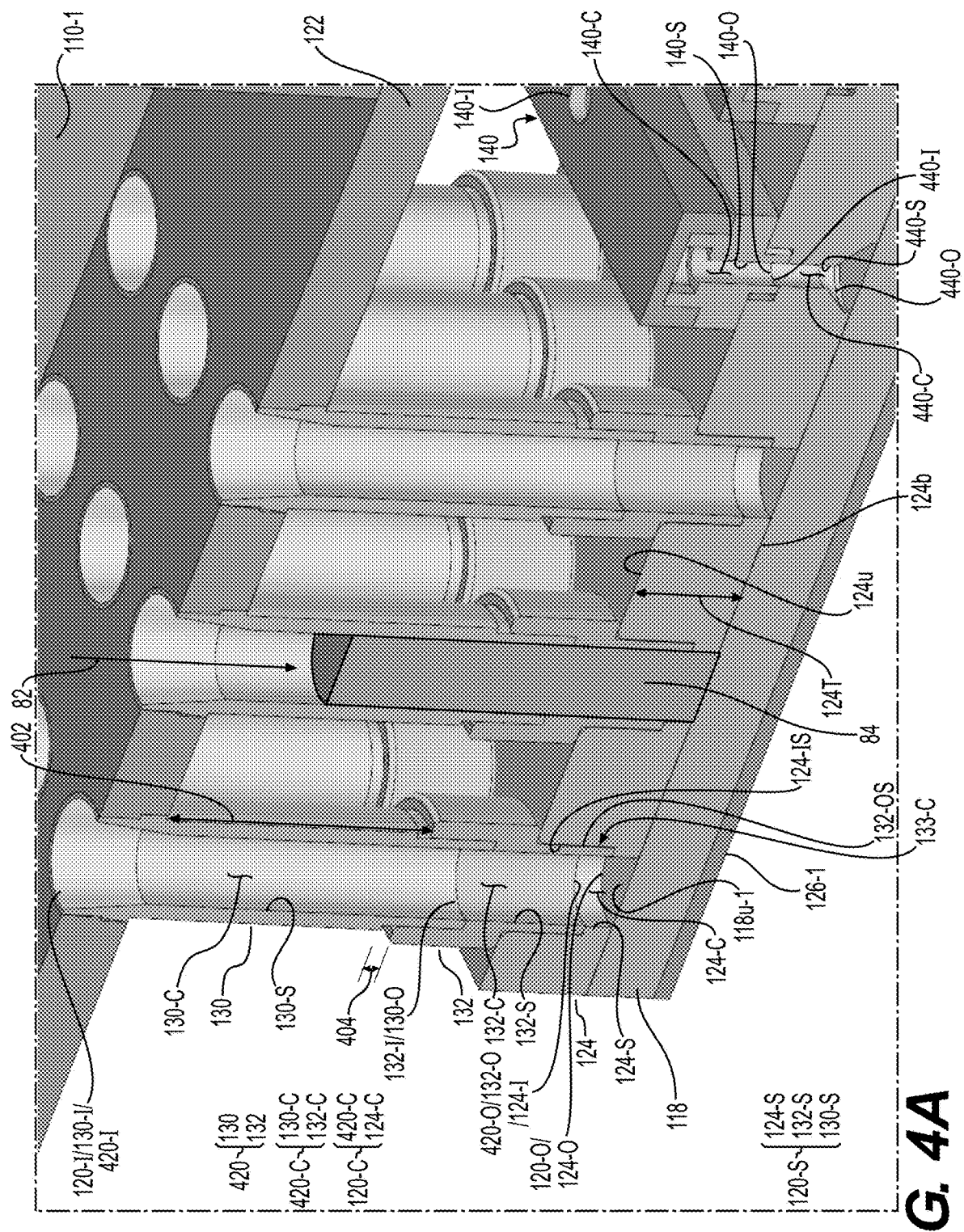
FIGS. 4A, 4B, and 4C are expanded views of region A of FIGS. 3A, 3B, and 3C, respectively, according to some example embodiments.
Figure 4B:
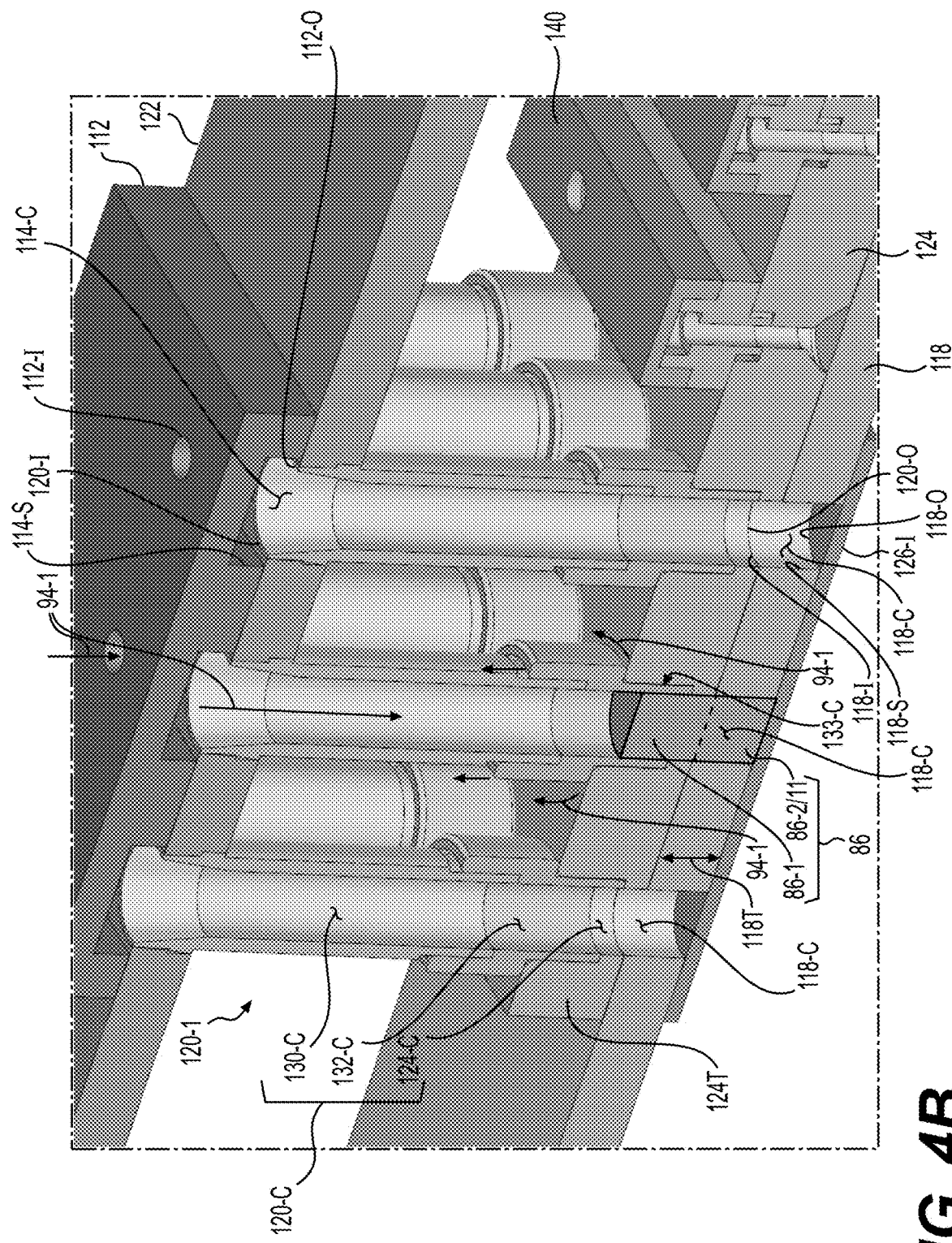
Figure 4C:
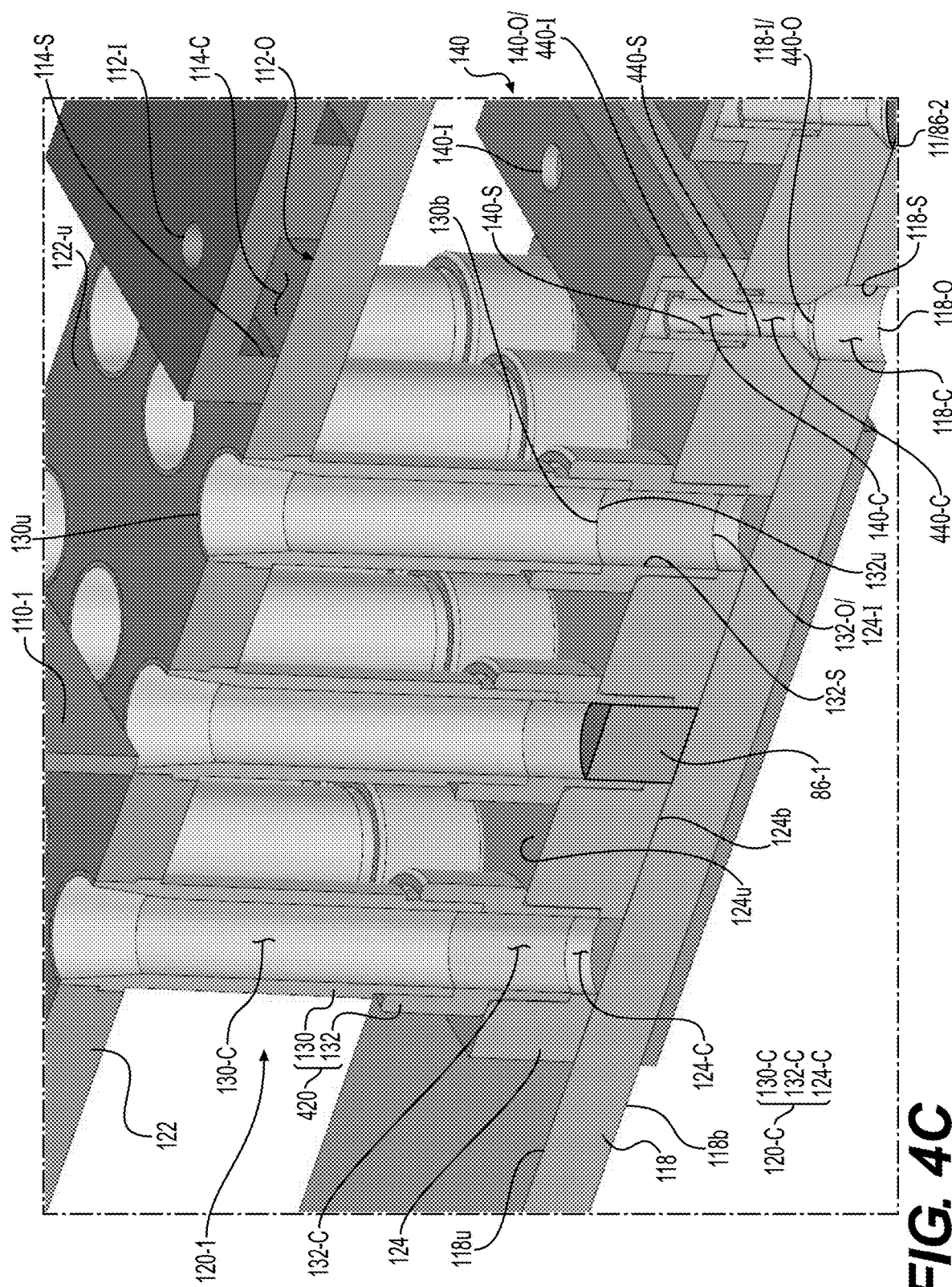
Figure 5A:
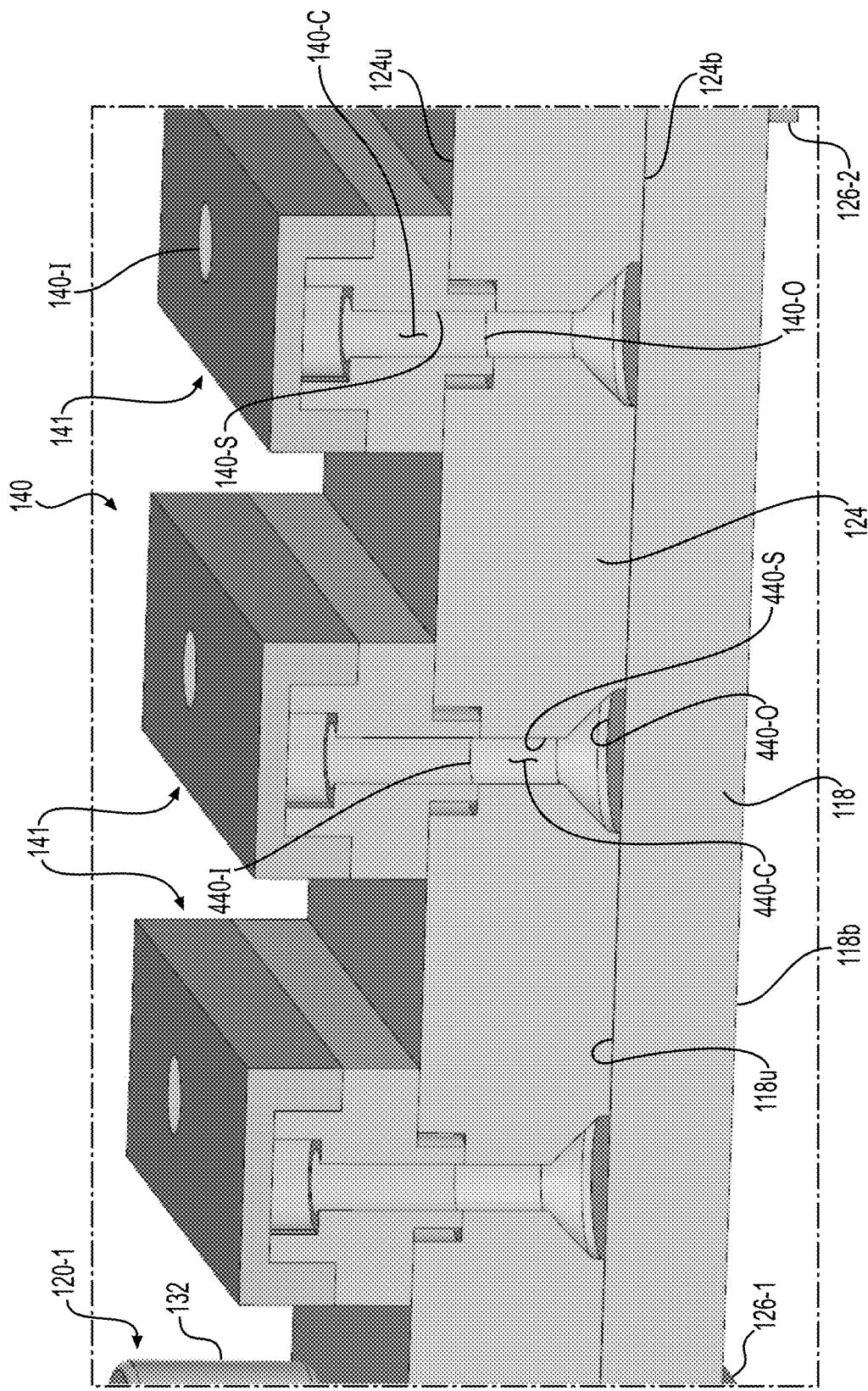
FIGS. 5A, 5B, and 5C are expanded views of region B of FIGS. 3A, 3B, and 3C, respectively, according to some example embodiments.
Figure 5B:
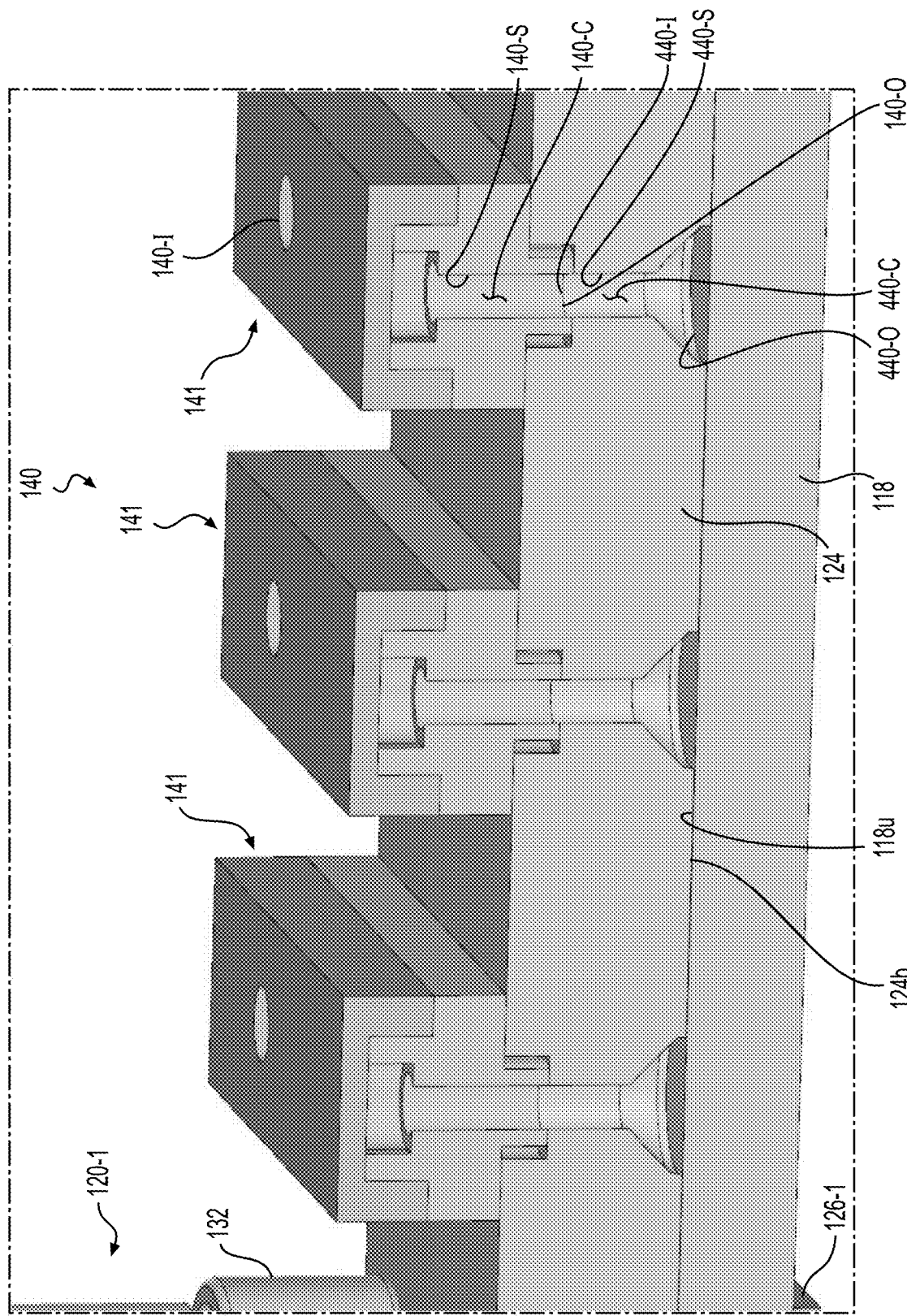
Figure 5C:
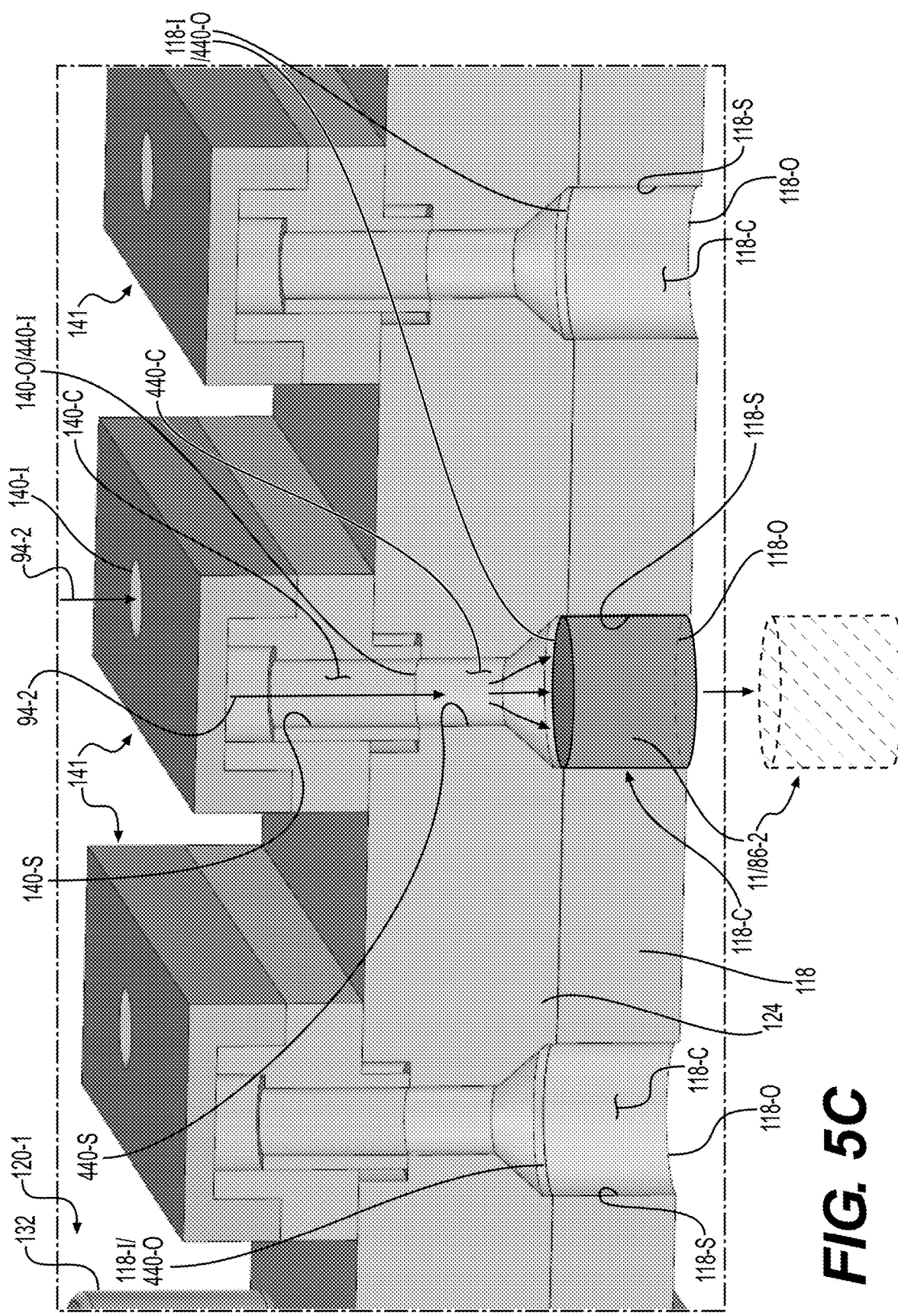
Figure 6A:
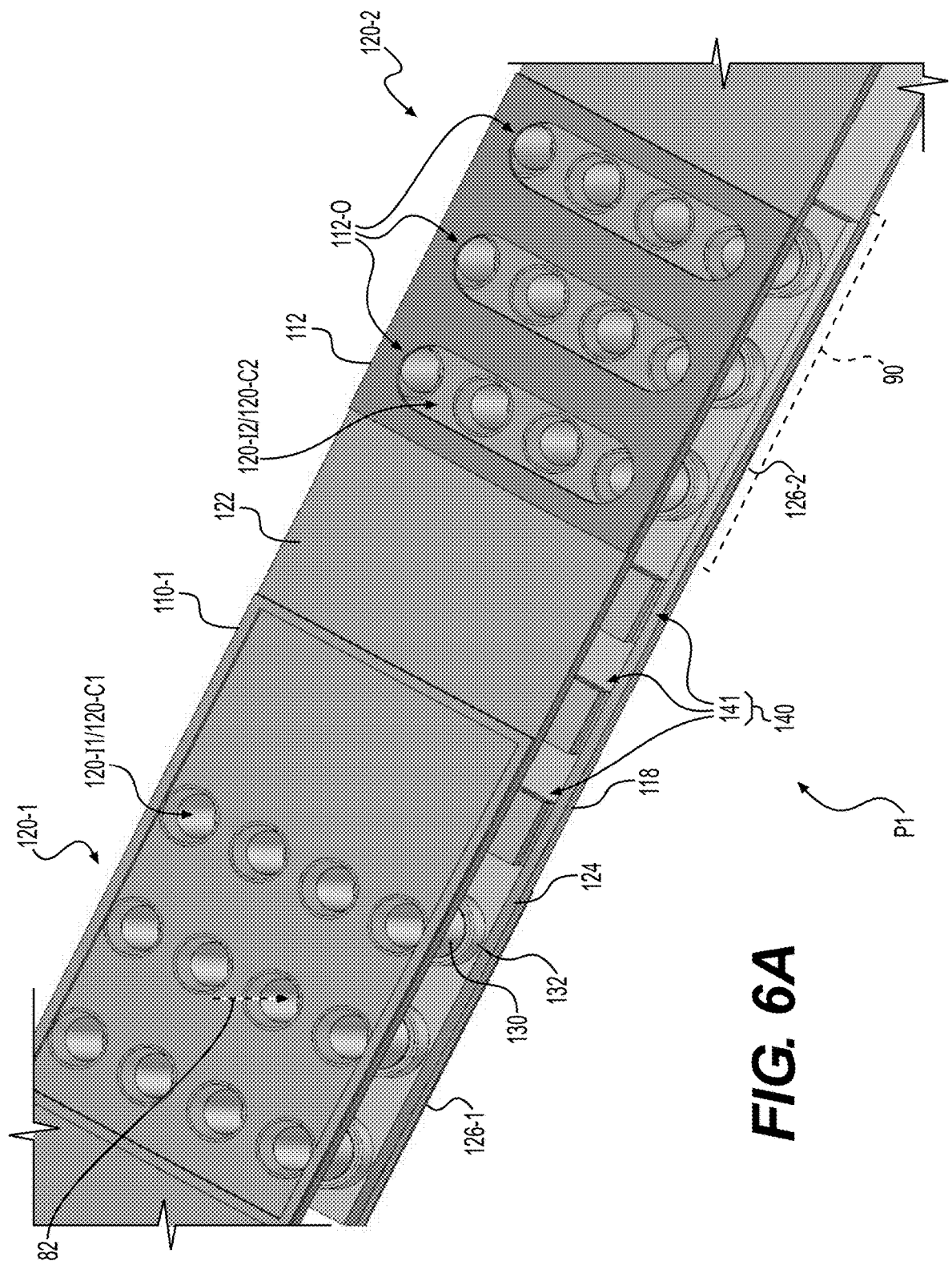
FIGS. 6A, 6B, and 6C are cross-sectional views along line II-II' of the apparatus of FIGS. 2A, 2B, and 2C, respectively, according to some example embodiments.
Figure 6B:
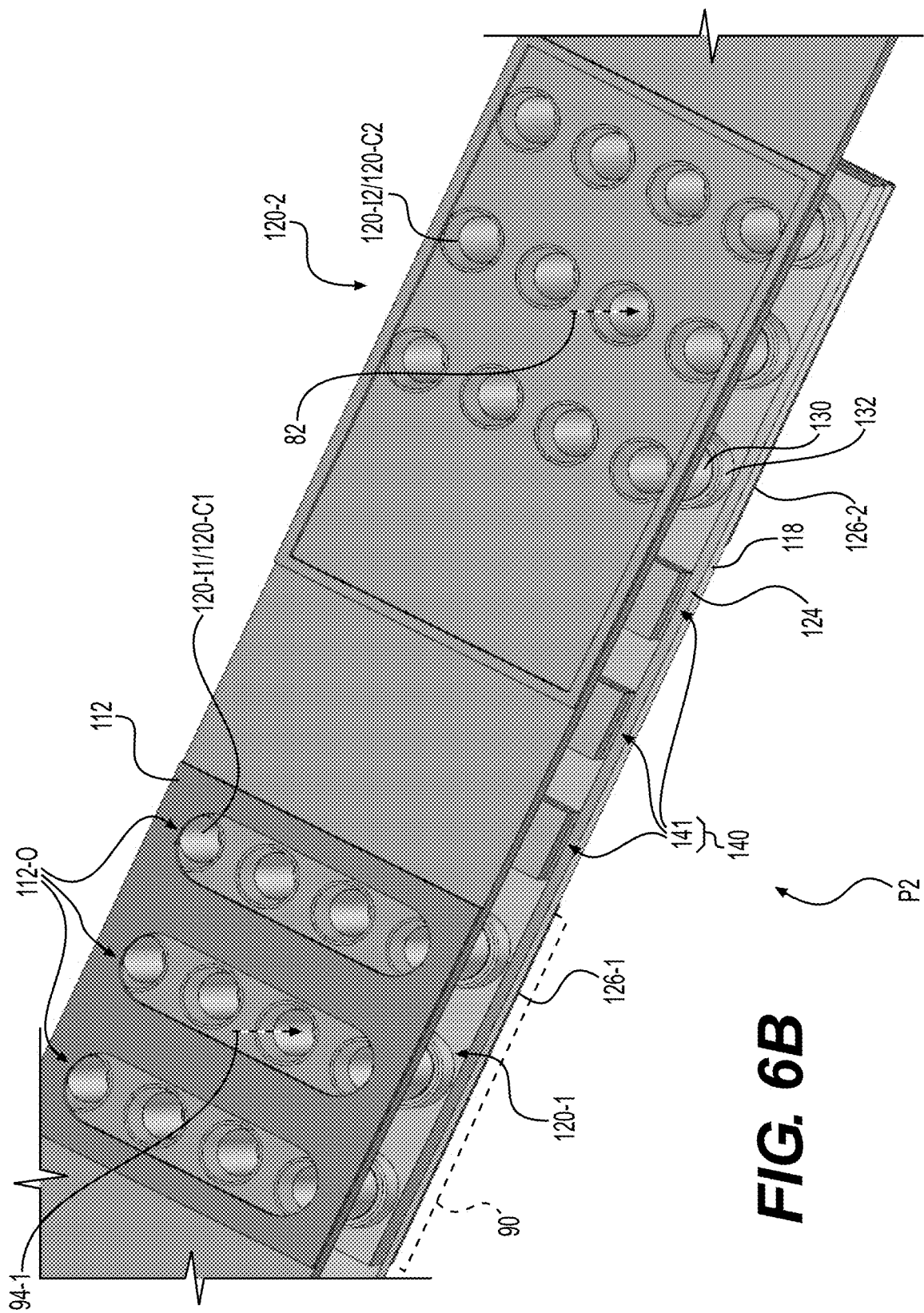
Figure 6C:
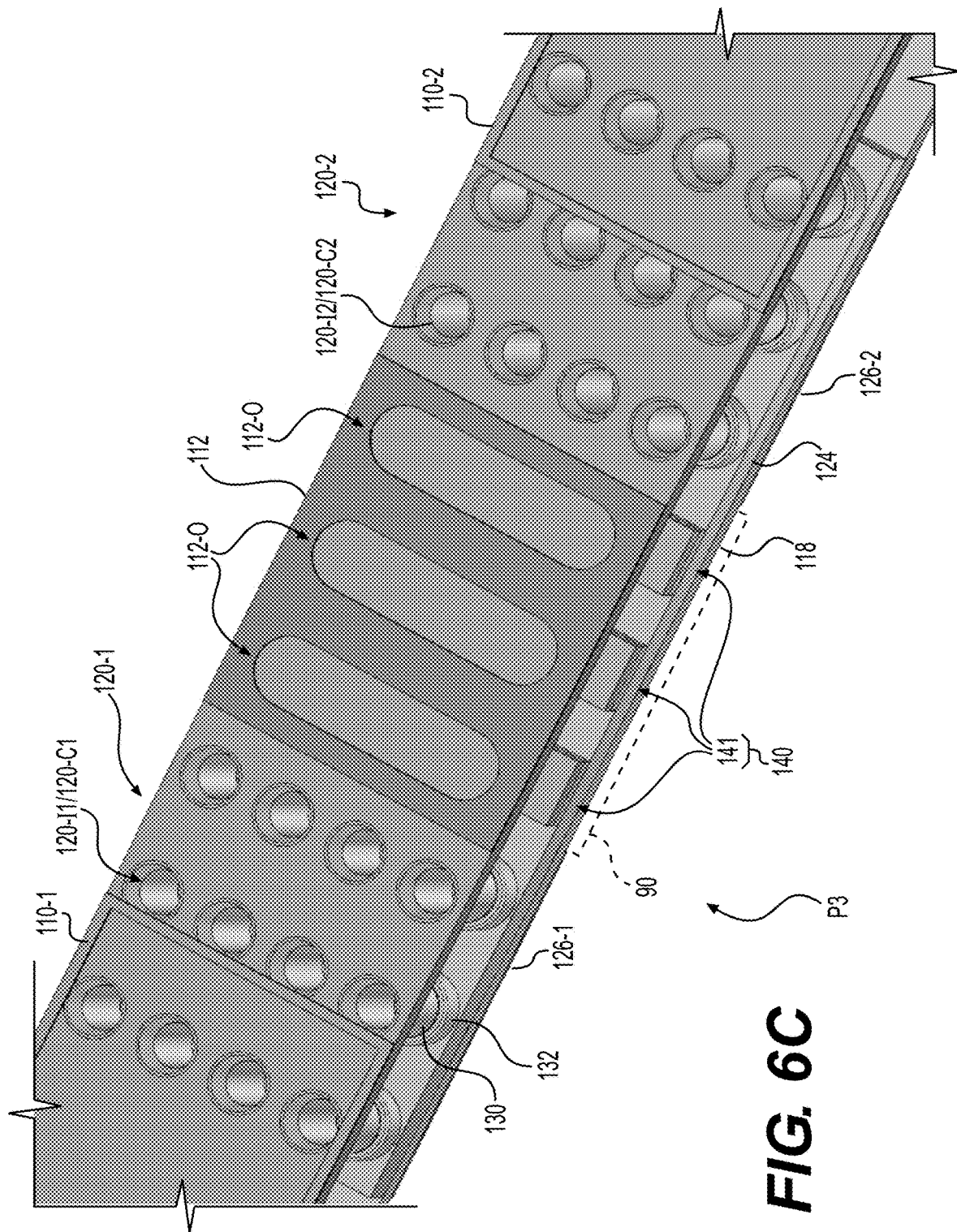
Figure 7A:
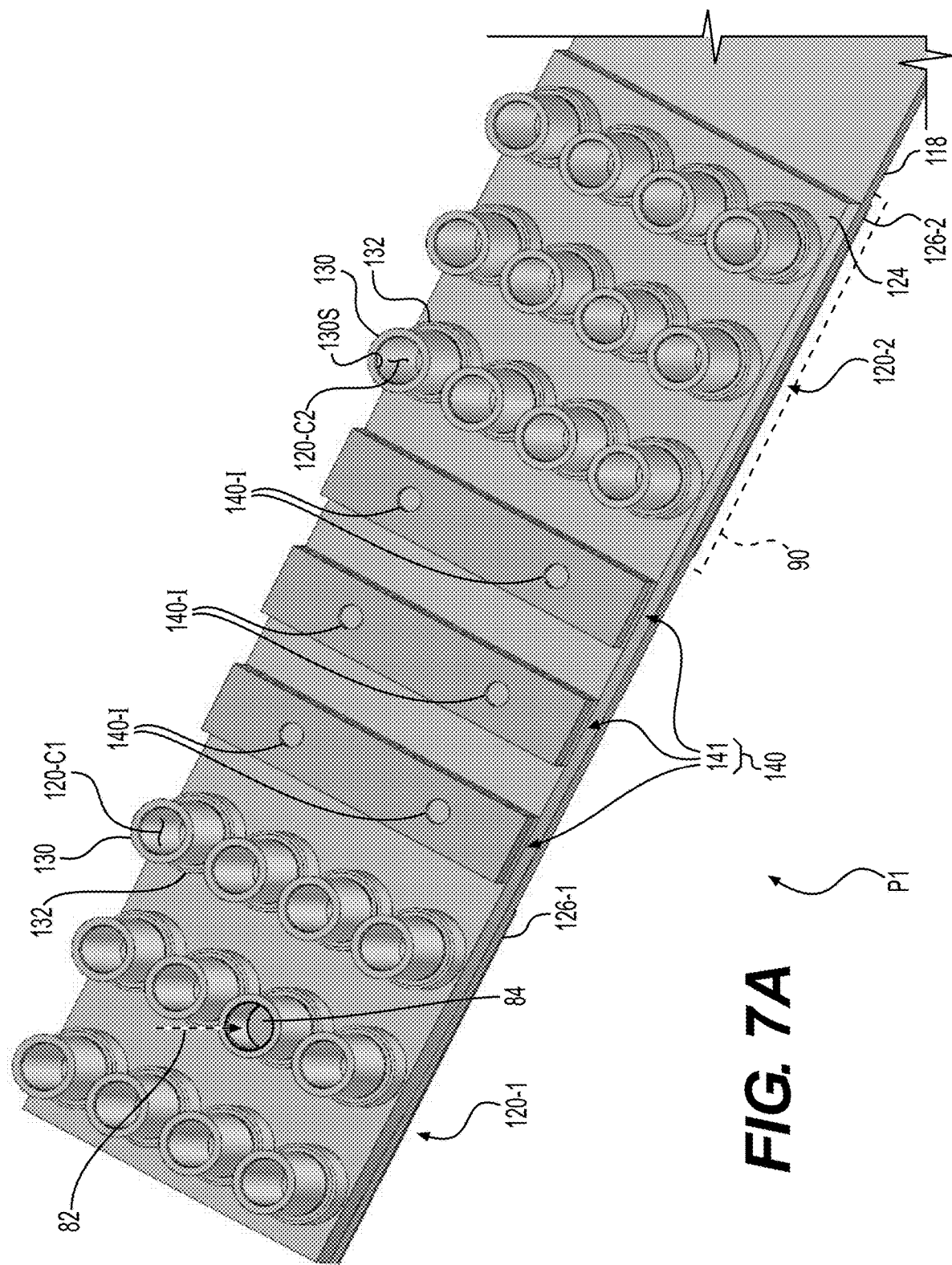
FIGS. 7A, 7B, and 7C are cross-sectional views along line III-III' of the apparatus of FIGS. 2A, 2B, and 2C, respectively, according to some example embodiments.
Figure 7B:
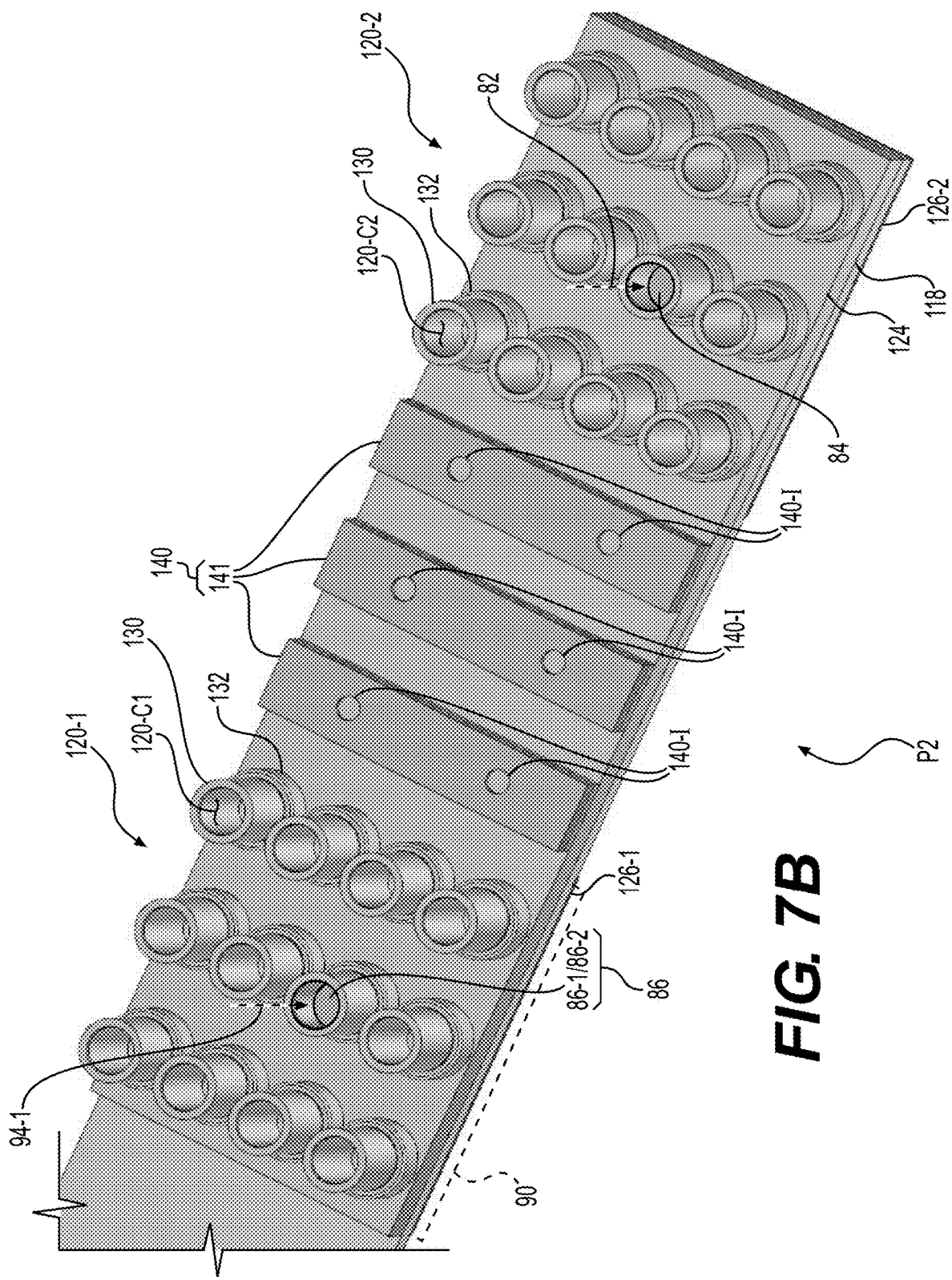
Figure 7C:
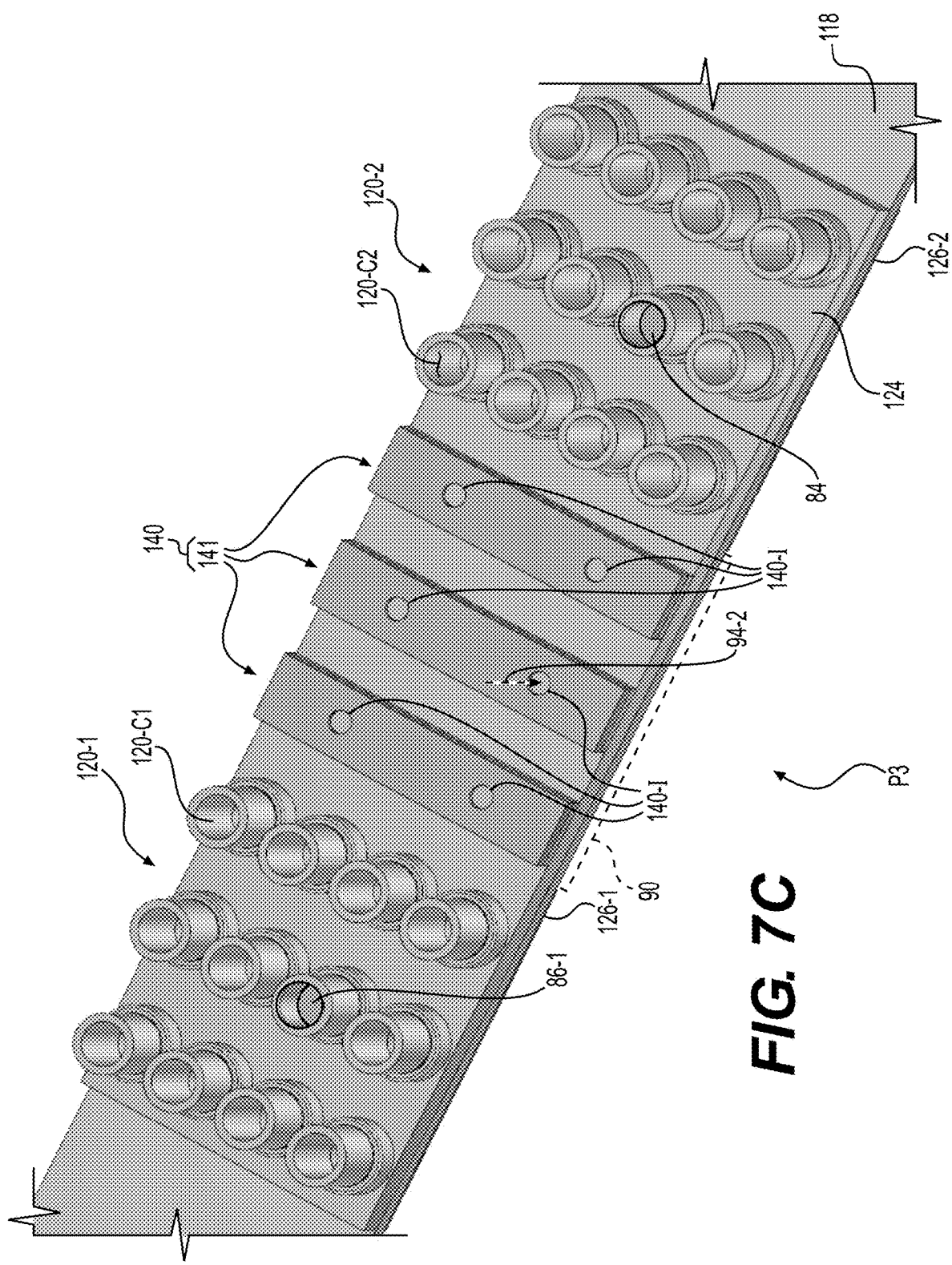
Figure 8A:
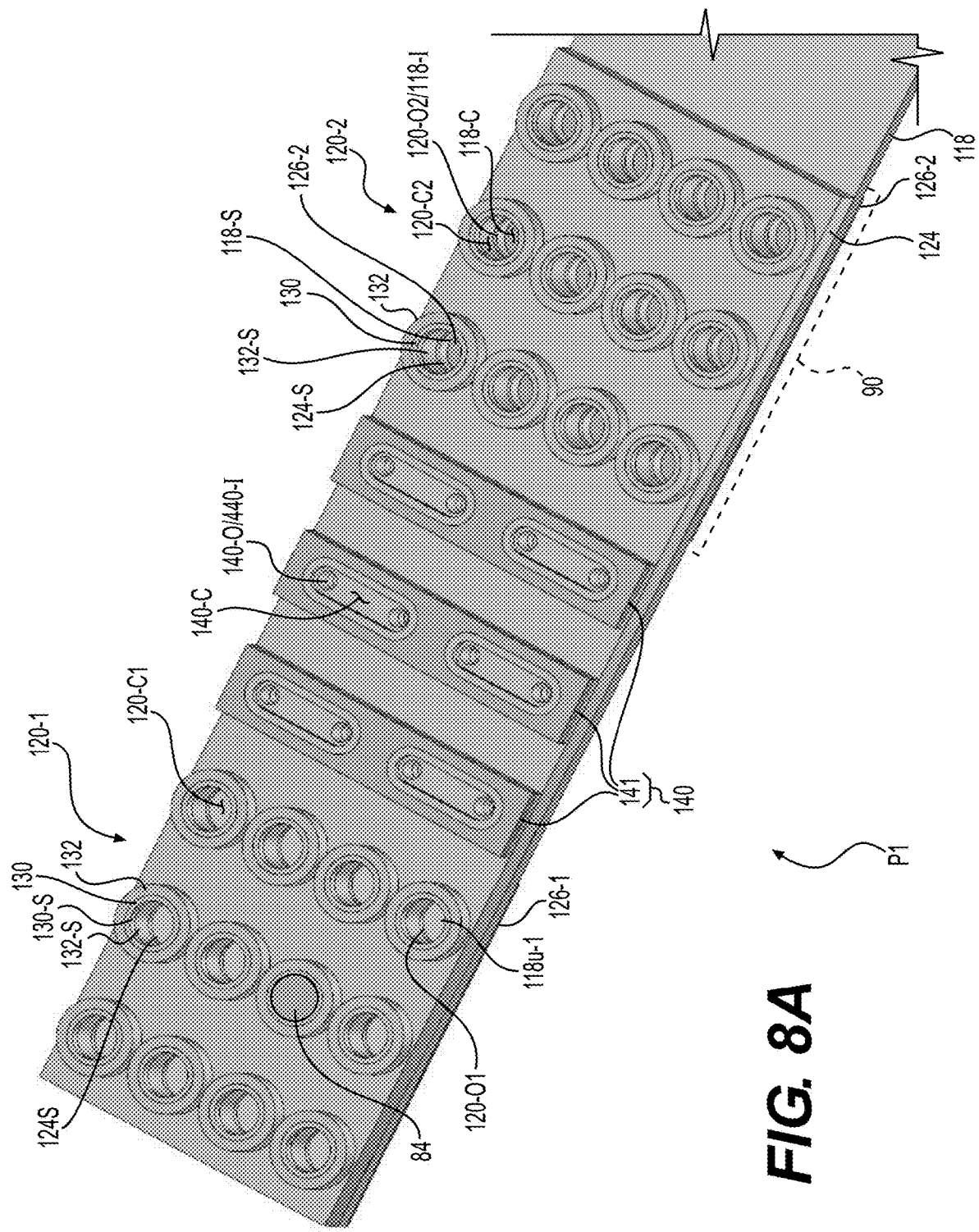
FIGS. 8A, 8B, and 8C are cross-sectional views along line IV-IV' of the apparatus of FIGS. 2A, 2B, and 2C, respectively, according to some example embodiments.
Figure 8B:
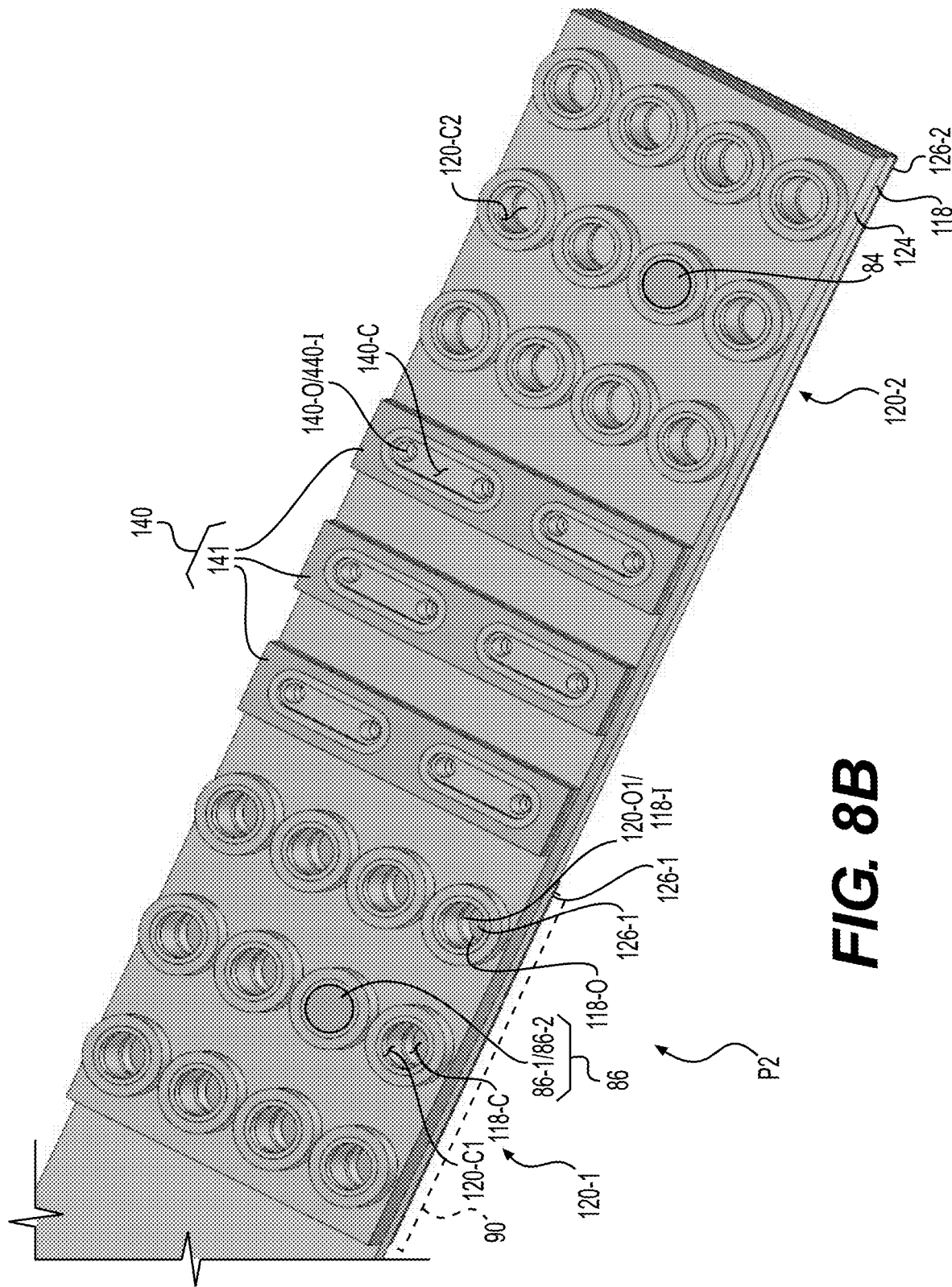
Figure 8C:
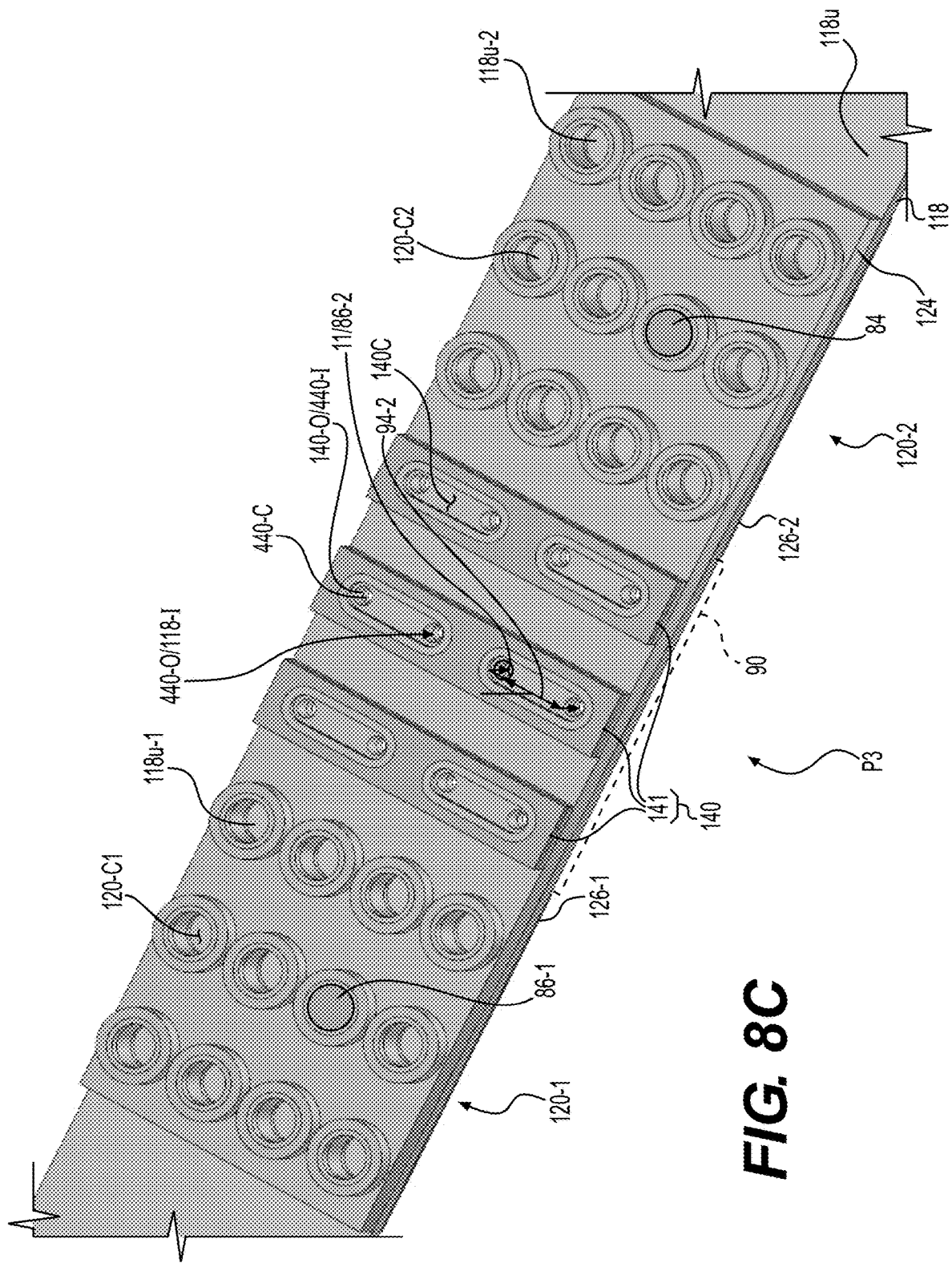
Figure 9A:
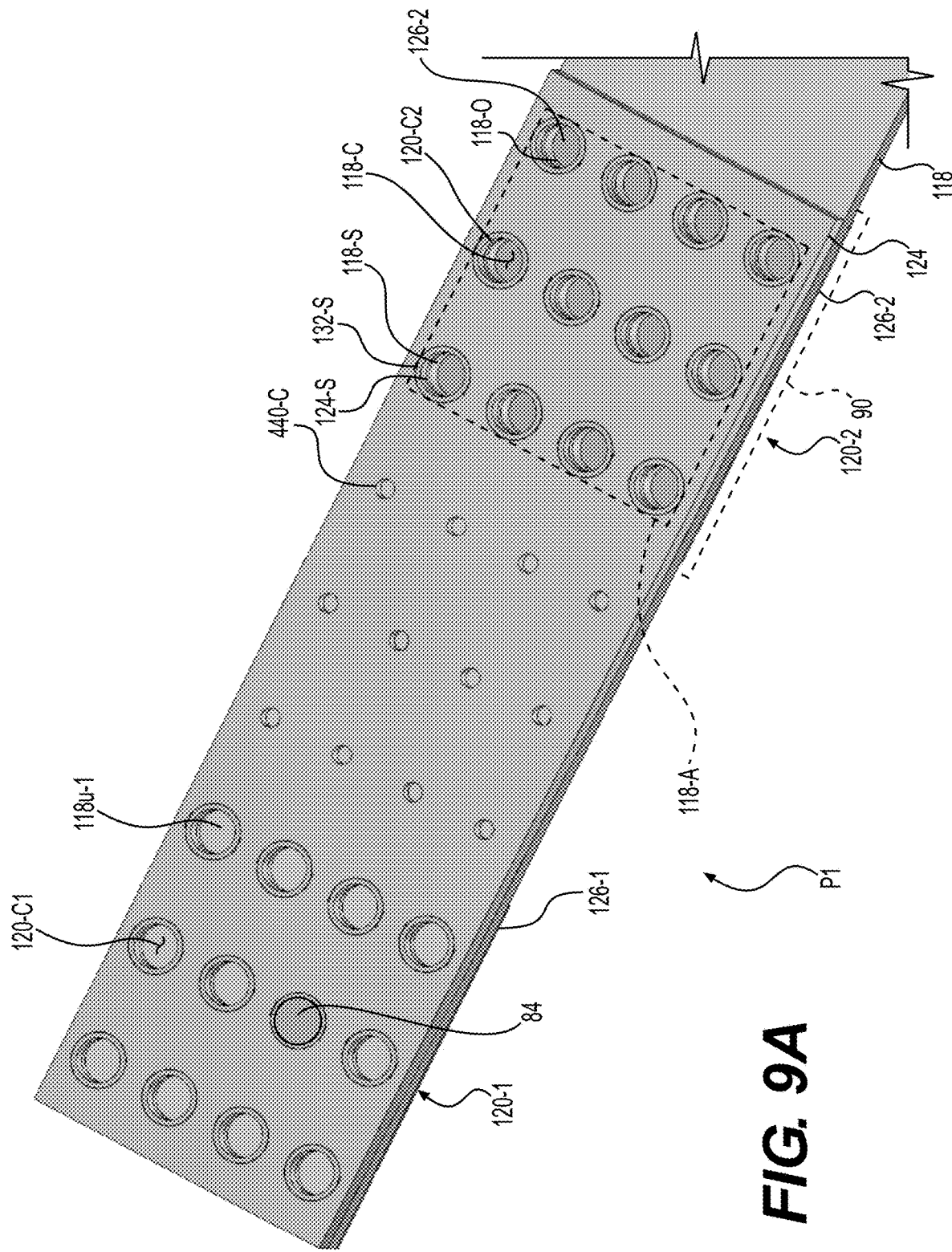
FIGS. 9A, 9B, and 9C are cross-sectional views along line V-V' of the apparatus of FIGS. 2A, 2B, and 2C, respectively, according to some example embodiments.
Figure 9B:
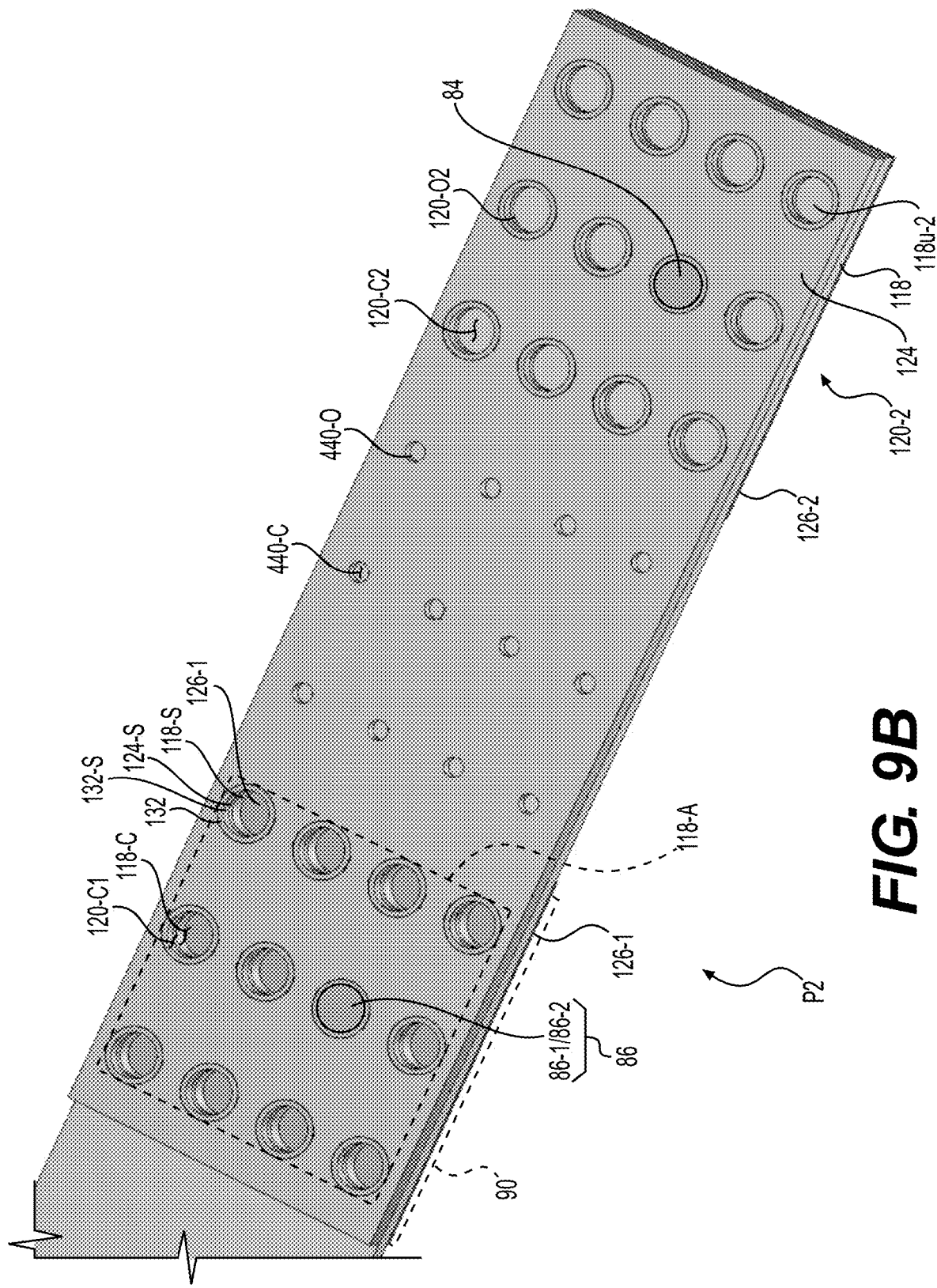
Figure 9C:
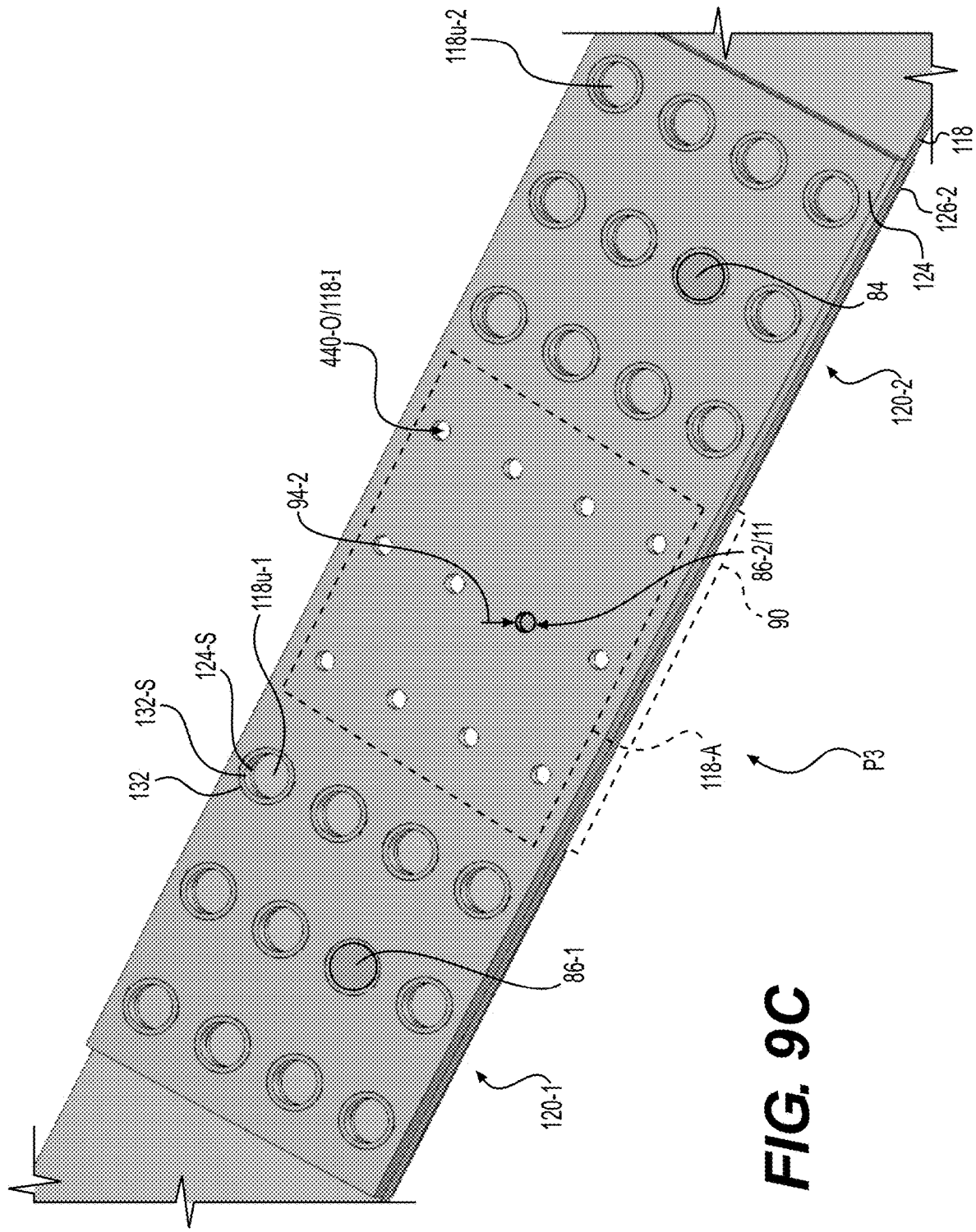
Figure 10C:
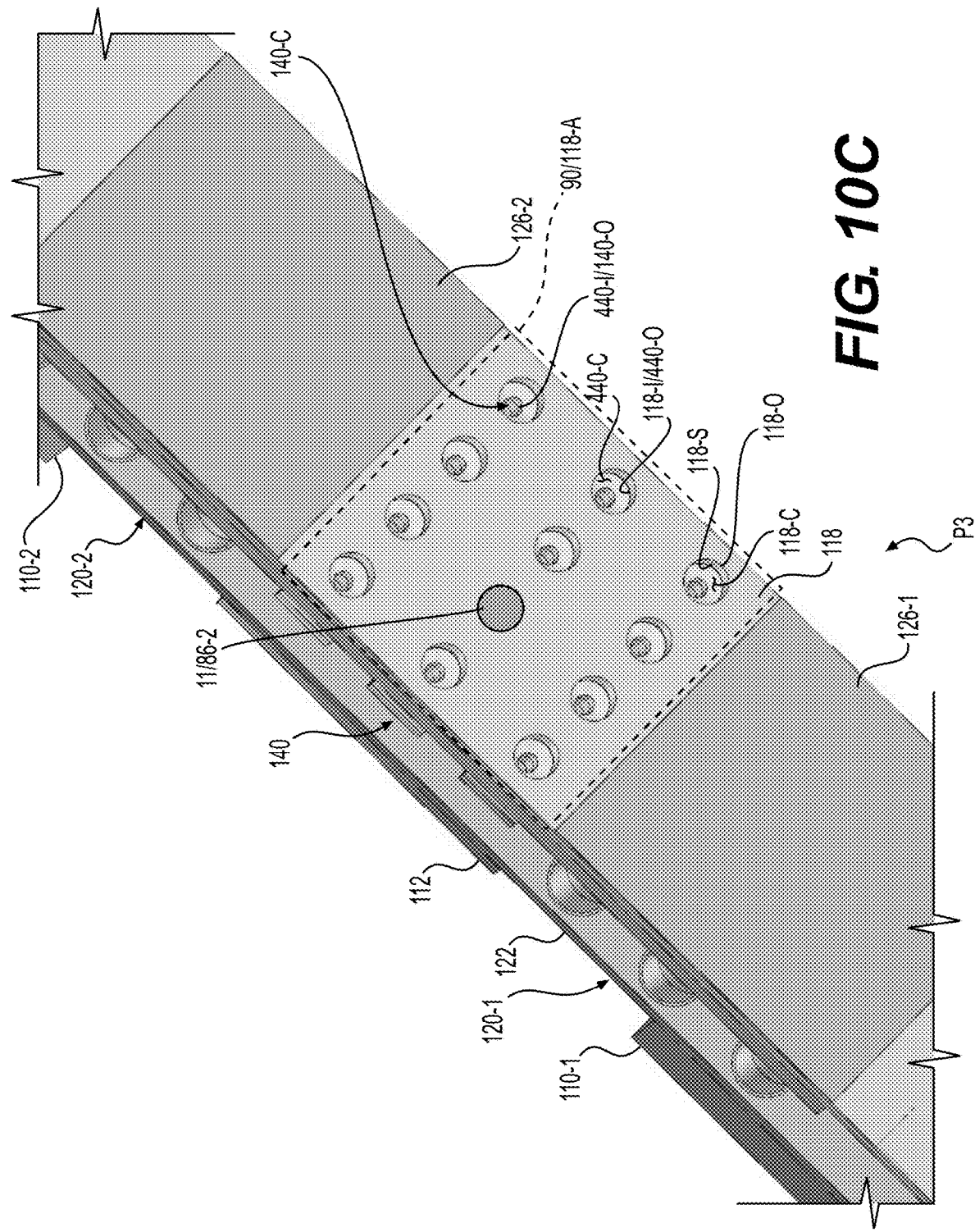

FIG. 2A is a perspective view of the apparatus including a fixed assembly and a reciprocating assembly at a first position in relation to the fixed assembly, according to some example embodiments. FIG. 2B is a perspective view of the apparatus including a fixed assembly and a reciprocating assembly at a second position in relation to the fixed assembly, according to some example embodiments. FIG. 2C is a perspective view of the apparatus including a fixed assembly and a reciprocating assembly at a third position in relation to the fixed assembly, according to some example embodiments. FIGS. 3A, 3B, and 3C are cross-sectional views along line I-I' of the apparatus of FIGS. 2A, 2B, and 2C, respectively, according to some example embodiments. FIGS. 4A, 4B, and 4C are expanded views of region A of FIGS. 3A, 3B, and 3C, respectively, according to some example embodiments. FIGS. 5A, 5B, and 5C are expanded views of region B of FIGS. 3A, 3B, and 3C, respectively, according to some example embodiments. FIGS. 6A, 6B, and 6C are cross-sectional views along line II-II' of the apparatus of FIGS. 2A, 2B, and 2C, respectively, according to some example embodiments. FIGS. 7A, 7B, and 7C are cross-sectional views along line III-III' of the apparatus of FIGS. 2A, 2B, and 2C, respectively, according to some example embodiments. FIGS. 8A, 8B, and 8C are cross-sectional views along line IV-IV' of the apparatus of FIGS. 2A, 2B, and 2C, respectively, according to some example embodiments. FIGS. 9A, 9B, and 9C are cross-sectional views along line V-V' of the apparatus of FIGS. 2A, 2B, and 2C, respectively, according to some example embodiments. FIGS. 10A, 10B, and 10C are perspective views of the apparatus, according to some example embodiments. FIG. 11 is an expanded view of region B of FIG. 3B, according to some example embodiments.

As shown in FIGS. 2A-11, the apparatus 100 may include a fixed assembly 102 (see FIG. 2A for example) that is configured to be fixed in place (e.g., fixed in place in relation to other assemblies 10, 20, 30, 40 of manufacturing system 1) and a reciprocating assembly 104 (see FIG. 2A for example) that is configured to move along a longitudinal axis L, in relation to the fixed assembly 102, between various separate positions (e.g., P1, P2, P3 as shown in at least FIGS. 2A-2C, respectively). As shown in FIG. 1, the apparatus 100 may be connected to a servomechanism 70. In some example embodiments the servomechanism 70 may be connected to the reciprocating assembly 104 and the servomechanism 70 may be configured to operate to cause the reciprocating assembly 104 to move along longitudinal axis L in relation to the fixed assembly 102 between various positions. It will be understood that the servomechanism 70 may be any well-known servomechanism.

As described herein and as shown in at least FIGS. 2A-2C, the reciprocating assembly 104 is configured to move along longitudinal axis L, in relation to the fixed assembly 102 (e.g., in sliding engagement with one or more portions of the fixed assembly 102), between separate positions in order to receive bulk compressible material 82 into channel conduits 120-C of the reciprocating assembly 104 to establish separate bulk instances 84 of compressible material in separate, respective channel conduits 120-C (see FIG. 3A for example). It will be understood that a "bulk instance" of compressible material may refer to a discrete, separate mass of bulk compressible material 82 within a separate channel conduit 120-C of the reciprocating assembly 104. The bulk instances 84 may include uncompressed bulk compressible material, partially compressed compressible material, compressed compressible material, any combination thereof, or the like.

The reciprocating assembly 104 is further configured to at least partially push the bulk instances 84 of compressible material from the channel conduits 120-C holding the bulk instances 84 into separate, respective dispensing conduits 118-C and compress the at least partially-pushed compressible material to establish compressed instances 86 of compressible material that are each at least partially in, and partially or completely fill the fixed-volume space of, a separate dispensing conduit 118-C (see FIG. 3B for example). The particular portions 86-2 of the compressed instances 86 of compressed material in separate, respective dispensing conduits 118-C are pieces 11 of compressed material that each have a particular volume defined by the respective fixed-volume space of the respective dispensing conduit 118-C and a particular density defined by the compression of the compressible material in the compressed instance 86 that is at least partially in the respective fixed-volume space.

The reciprocating assembly 104 is further configured to separate (e.g., sever, portion, isolate, etc.) the portions 86-2 (e.g., pieces 11) of compressed material in the dispensing conduits 118-C from the remainder portions 86-1 of the compressed instances 86 of compressed material (see FIG. 3C for example). The reciprocating assembly 104 is further configured to discharge the pieces 11 from the dispensing conduits 118-C via respective dispensing conduit outlets 118-O, for example into separate, respective cavities 18 of a plate 16 that is moved to position 90 to vertically overlap with the array 118-A of dispensing conduits 118-C, such that each cavity 18 of the plate 16 is vertically aligned with (e.g., vertically overlaps in the vertical direction V with) a separate dispensing conduit 118-C of the array 118-A (see FIG. 3C for example).

As a result, the apparatus 100 may be configured to provide pieces 11 of compressed material that have a more consistent volume and density (determined by the fixed volume of the fixed-volume spaces and the amount of compression of the compressible material in the fixed-volume spaces, respectively), thereby providing a more consistent product of compressed material for packaging to form the packaged pieces 99.

As shown in FIGS. 2A-11, the fixed assembly 102 may include first hopper 110-1 and second hopper 110-2 (see FIG. 2A for example) that are each exposed to the bulk material source and are each configured to receive and hold bulk compressible material 82 in a respective interior space defined by the outer wall structures of the first and second hoppers 110-1 and 110-2.

The fixed assembly 102 further includes a first gas manifold 112 (see FIG. 2A for example) that includes one or more first manifold conduits 114-C (see FIGS. 4B-4C for example), defined by one or more inner surfaces 114-S (see FIGS. 4B-4C for example) of the first gas manifold 112, that extend from one or more first manifold inlets 112-I (see FIGS. 4B-4C for example) to corresponding one or more first manifold outlets 112-O (see FIGS. 4B-4C for example).

As shown, the one or more first manifold inlets 112-I are coupled to the first gas conduit 91-1 (see FIG. 2A for example) and thus the first gas manifold 112 is configured to direct a first gas 94-1 from the first gas source 90-1 to one or more first manifold outlets 112-0 via one or more first manifold conduits 114-C (see FIG. 4B for example).

The fixed assembly 102 further includes a dispensing container that defines the array 118-A (see FIGS. 9A-9C, FIGS. 10A-10C, FIG. 11) of dispensing conduits 118-C (see FIG. 4B for example) that each extend between a dispensing conduit inlet 118-I (see FIG. 4B for example) and a dispensing conduit outlet 118-O (FIG. 4B for example), where the dispensing conduits 118-C each may at least partially vertically overlap (e.g., overlap in the vertical direction V) with one or more first manifold outlets 112-O (see FIGS. 3A-3C for example) based on the position of the reciprocating assembly 104. In FIGS. 2A-11, the dispensing container is a bottom plate 118 (see FIGS. 2A, 3A for example). In FIGS. 2A-11, the bottom plate 118 includes inner surfaces 118-S (see FIG. 4B for example) that define an array 118-A (see FIG. for example) of dispensing conduits 118-C, each separate dispensing conduit 118-C extending between a separate dispensing conduit inlet 118-I and a separate dispensing conduit outlet 118-O (see FIG. 10C for example). In FIGS. 2A-11, the array 118-A of dispensing conduits 118-C are configured to be vertically aligned with (e.g., to vertically overlap in vertical direction V with) position 90 of the manufacturing system 1 and thus to be vertically aligned with separate, respective cavities 18 of a plate 16 when the plate 16 is at position 90 (see FIGS. 3C, 9A-9C, 10A-10C for example), such that pieces 11 located with the dispensing conduits 118-C of the array 118-A may be discharged into separate, respective cavities 18 of a plate 16 that is at position 90 (see FIG. 3C, 5C for example).

As further shown, the bottom plate 118 has an upper surface 118u and an opposite bottom surface 118b (see FIG. 5A for example), and the dispensing conduits 118-C defined by the inner surfaces 118-S of the bottom plate 118 extend through the thickness 118T of the bottom plate 118 (see FIG. 4B for example) from respective dispensing conduit inlets 118-I at the upper surface 118u and respective dispensing conduit outlets 118-O at the bottom surface 118b (see FIG. 4B for example). It will be understood that example embodiments of the dispensing container are not limited to the bottom plate 118 and may include any other structures having one or more inner surfaces 118-S defining one or more dispensing conduits 118-C.

In FIGS. 2A-11, the bottom plate 118 defines an array 118-A of multiple dispensing conduits 118-C (e.g., a 4×3 array of twelve dispensing conduits 118-C for example), but example embodiments are not limited thereto, and in some example embodiments a dispensing container (e.g., bottom plate 118) of the fixed assembly 102 may define an array 118-A that is limited to a single, individual dispensing conduit 118-C.

It will be understood that each of the first hopper 110-1, the second hopper 110-2, the first gas manifold 112, and the dispensing container (e.g., bottom plate 118) are configured to be fixed in place in relation to a remainder of the manufacturing system 1 (e.g., in relation to the conveyer assembly 10, position 90, etc.) throughout the operation of the apparatus 100 to compress and portion bulk compressible material 82 into one or more pieces 11 of compressed material. It will be understood that, in some example embodiments, the fixed assembly 102 may omit one or more of the elements of the fixed assembly 102 shown in FIGS.

2A-11. For example, in some example embodiments, the fixed assembly 102 may not include the second hopper 110-2.

As shown in FIGS. 2A-11, the reciprocating assembly 104 may include first and second arrays 121-1 and 121-2 of channel assemblies 120 (see FIG. 2A for example), an upper plate 122 (see FIG. 2A for example), a lower plate 124 (see FIG. 2A for example), a second gas manifold 140 (see FIG. 2A for example), shield plates 126-1 and 126-2 (see FIG. 2A for example), and coupling structures 129 (see FIG. 2A for example) coupling the shield plates 126-1 and 126-2 to the lower plate 124. One or more structures of the reciprocating assembly 104 (e.g., the lower plate 124) may be connected to the servomechanism 70 (see FIG. 1), and the reciprocating assembly 104 may be configured to move in relation to the fixed assembly 102 along longitudinal axis L, for example based on operation of the servomechanism 70. It will be understood that, in some example embodiments, the reciprocating assembly 104 may omit one or more of the elements of the reciprocating assembly 104 shown in FIGS. 2A-11. For example, in some example embodiments, the reciprocating assembly 104 may omit the second array 121-2 of channel assemblies 120 and may omit the second shield plate 126-2.

As shown in FIGS. 2A-11, the channel assemblies 120 of the first array 121-1 may be referred to as first channel assemblies 120-1 (see FIG. 2A for example), and the channel assemblies of the second array 121-2 may be referred to as second channel assemblies 120-2 (see FIG. 2A for example). Arrays 121-1 and 121-2 are shown in FIGS. 2A-11 to each include a 4×3 array of twelve channel assemblies 120, but it will be understood that each array 121-1, 121-2 may include any quantity of channel assemblies 120, including a single, individual channel assembly 120. It will further be understood that in some example embodiments the second array 121-2 of second channel assemblies 120-2 is absent from apparatus 100.

In some example embodiments, each channel assembly 120 may be defined by one or more structures of the reciprocating assembly 104. Each channel assembly 120 may include one or more inner surfaces 120-S (see FIG. 4A for example) that define a channel conduit 120-C (see FIG. 4A for example) that extends between a channel conduit inlet 120-I and a channel conduit outlet 120-O (see FIG. 4A for example). It will be understood that a channel conduit 120-C of a first channel assembly 120-1 may be referred to as a "first channel conduit 120-C1" (see FIG. 3A for example), a channel conduit inlet 120-I of a channel conduit 120-C of a first channel assembly 120-1 may be referred to as a "first channel conduit inlet 120I4," (see FIG. 3A for example), and a channel conduit outlet 120-O of a channel conduit 120-C of a first channel assembly 120-1 may be referred to as a "first channel conduit outlet 120-O1" (see FIG. 3A for example). It will further be understood that a channel conduit 120-C of a second channel assembly 120-2 may be referred to as a "second channel conduit 120-C2," (see FIG. 3A for example) a channel conduit inlet 120-I of a channel conduit 120-C of a second channel assembly 120-2 may be referred to as a "second channel conduit inlet 120-I2" (see FIG. 3A for example), and a channel conduit outlet 120-O of a channel conduit 120-C of a second channel assembly 120-2 may be referred to as a "second channel conduit outlet 120-O2" (see FIG. 3A for example).

As shown in FIGS. 2A-11, the first and second arrays 121-1 and 121-2 of channel assemblies have the same arrangement and quantities of channel assemblies 120, and thus channel conduits 120-C, as the arrangement and quantity of dispensing conduits 118-C in the array 118-A and the arrangement and quantity of cavities 18 in each plate 16. As a result, and as shown in FIGS. 2A-11, the dispensing conduits 118-C may be configured to vertically align with, and thus be exposed to, separate, respective first channel conduits 120-C1 based on the reciprocating assembly 104 being at the second position P2 (see FIG. 9B for example). As further shown in FIGS. 2A-11, the dispensing conduits 118-C may be configured to vertically align with, and thus be exposed to, separate, respective second channel conduits 120-C2 based on the reciprocating assembly 104 being at the first position P1 (see FIG. 9A for example). As further shown in FIGS. 1-11, the dispensing conduits 118-C may be configured to vertically align with separate, respective cavities 18 of a plate 16 moved to position 90 to vertically overlap with the array 118-A of the apparatus 100 based on operation of the conveyer assembly 10 and based on the reciprocating assembly 104 being at the third position P3 (see FIGS. 9C, 3C for example).

As shown in FIGS. 2A-11, the reciprocating assembly 104 may include an upper plate 122 that is in sliding contact, at an upper surface 122$u$, with the hoppers 110-1 and 110-2 and the first gas manifold 112 (see FIG. 3A for example). As shown in FIGS. 2A-11, the reciprocating assembly 104 may include a lower plate 124 having a bottom surface 124$b$ in sliding contact with the upper surface 118$u$ of the bottom plate 118 (see FIG. 3A for example).

As shown in FIGS. 2A-11, the lower plate 124 includes one or more inner surfaces 124-S (see FIG. 4A for example) that define one or more lower conduits 124-C that each extend through a thickness 124T (see FIG. 4A for example) of the lower plate 124 between a top opening 124-I (see FIG. 4A for example) of the lower conduit 124-C and a bottom opening 124-O (see FIG. 4A for example) of the lower conduit 124-C. As shown in FIGS. 2A-11, the bottom opening 124-O of each lower conduit 124-C defines a channel conduit outlet 120-O (see FIG. 4A for example) of a separate, respective channel conduit 120-C of a separate, respective channel assembly 120 at the bottom surface 124$b$ of the lower plate 124 (see FIG. 4A for example).

As further shown in FIGS. 2A-11, each channel assembly 120 may include a cylindrical structure 420 (see FIG. 4A for example). Each cylindrical structure 420 may be coupled, at a top end, to the upper plate 122 and, at a bottom end, to the lower plate 124. The cylindrical structure 420 includes one or more inner surfaces defining an upper conduit 420-C (see FIG. 4A for example) extending through the cylindrical structure 420, between a top opening 420-I at the top end of the cylindrical structure 420 (see FIG. 4A for example) and a bottom opening 420-O at the bottom end of the cylindrical structure 420 (see FIG. 4A for example). As shown in FIGS. 2A-11, the bottom end of each cylindrical structure 420 may be coupled to the lower plate 124 such that the upper conduit 420-C of the cylindrical structure 420 is exposed, via the bottom opening 420-O thereof, to a separate lower conduit 124-C of the lower plate 124 via the top opening 124-I thereof (see FIG. 4A for example). Accordingly, in some example embodiments, each separate channel assembly 120 is defined by a separate cylindrical structure 420 and a separate portion of the lower plate 124 to which the separate cylindrical structure 420 is coupled (see FIG. 4A for example), such that the channel conduit 120-C of the channel assembly 120 is collectively defined by the upper conduit 420-C of a cylindrical structure 420 and a lower conduit 124-C to which the upper conduit 420-C is exposed based on the coupling of the cylindrical structure 420 to the lower plate 124 (see FIG. 4A for example). As a result, a top opening 420-I of a given upper conduit 420-C may define a channel conduit inlet 120-I of a separate channel conduit 120-C of a separate channel assembly 120 at the upper surface 122u of the upper plate 122 (see FIG. 4A for example), and a bottom opening 124-O of a lower conduit 124-C that is exposed to the given upper conduit 420-C may define a channel conduit outlet 120-O of the separate channel conduit 120-C of the separate channel assembly 120 at the bottom surface 124b of the lower plate 124 (see FIG. 4A for example).

As described herein, conduits and/or spaces that are "open" or "exposed" to each other will be understood to be "directly" or "indirectly" exposed to each other (e.g., without or with any intervening structure, conduits, and/or spaces, respectively), based on at least partially alignments of respective inlets and/or outlets of said conduits and or spaces with each other, such that a continuous conduit and/or space through which fluid (e.g., gas) flow is enabled is at least partially collectively defined by the conduits and/or spaces that are "open" or "exposed" to each other. It will be understood that the terms "open" and "exposed" may be used interchangeably with regard to conduits, inlets, and/or outlets being exposed to each other.

As further shown in FIGS. 2A-11, each given cylindrical structure 420 may include a cylinder 130 (see FIG. 4A for example) coupled, at a top end, to the upper plate 122 such that a top opening 130-I of the cylinder 130 defines the top opening 420-I of an upper conduit 420-C and thus a channel conduit inlet 120-I of a given channel conduit 120-C (see FIG. 4A for example). As further shown in FIGS. 2A-11, the given cylindrical structure 420 may further include a cylindrical sheath 132 (see FIG. 4A for example). The cylindrical sheath 132 may be in sliding engagement with a bottom end of the cylinder 130 at a top end of the cylindrical sheath 132, such that the bottom opening 130-O of the cylinder 130 is directly exposed to the top opening 132-I of the cylindrical sheath 132 (see FIG. 4A for example). The cylindrical sheath 132 may be in sliding engagement with the lower plate 124 at a bottom end of the cylindrical sheath 132, such that a bottom opening 132-O of the cylindrical sheath 132 defines the bottom opening 420-O of the upper conduit 420-C (see FIG. 4A for example). As shown in FIGS. 2A-11, a given cylinder 130 may have an inner surface 130-S that at least partially defines a cylinder conduit 130-C, and the cylindrical sheath 132 may have an inner surface 132-S that at least partially defines a sheath conduit 132-C that is exposed to the cylinder conduit 130-C via openings 130-O and 132-I that are exposed to each other, such that conduits 130-C and 132-C collectively define the upper conduit 420-C (see FIG. 4A for example).

In some example embodiments, each given cylindrical structure 420 may further include a spring 402 (see FIG. 4A for example) that extends vertically (e.g., along direction V) at least partially between the cylindrical sheath 132 and the upper plate 122 and is coupled to at least the cylindrical sheath 132 and is configured to apply a spring force to push the cylindrical sheath 132 downward in the vertical direction V toward the lower plate 124. In some example embodiments, the cylindrical sheath 132 may be configured to be pushed away from the lower plate 124 (e.g., upwards in the vertical direction V), e.g., along an annular track 404 (see FIG. 4A for example) defined by an outer surface of the cylinder 130, to open an annular conduit 133-C (see FIGS. 4A-4B for example) extending between an outer surface 132-OS of the cylindrical sheath 132 (see FIGS. 4A-4B for example) and an inner surface 124-IS of the lower plate 124 (see FIGS. 4A-4B for example).

Still referring to FIGS. 2A-11, the reciprocating assembly 104 includes a second gas manifold 140 that includes one or more second manifold conduits 140-C (see FIG. 5A for example), defined by one or more inner surfaces 140-S of the second gas manifold 140, that extend from one or more second manifold inlets 140-I to corresponding one or more second manifold outlets 140-O (see FIG. 5A for example). As shown, the one or more second manifold inlets 140-I are coupled to the second gas conduit 91-2 (see FIG. 2A for example) and thus the second gas manifold 140 is configured to direct a second gas 94-2 from the second gas source 90-2 to one or more second manifold outlets 140-O via one or more second manifold conduits 140-C (see FIGS. 5C, 7C, 8C, 9C, 11).

In the example embodiments shown in FIGS. 2A-11, the second gas manifold 140 is coupled to an upper surface 124u of the lower plate 124 (see FIG. 5A for example), and the lower plate 124 includes one or more inner surfaces 440-S (see FIG. 5A for example) that define manifold conduits 440-C (see FIG. 5A for example) extending through the thickness 124T of the lower plate 124 between separate, respective manifold conduit inlets 440-I (see FIG. 5A for example) at the upper surface 124u of the lower plate 124 and separate, respective manifold conduit outlets 440-O (see FIG. 5A for example) at the bottom surface 124b of the lower plate 124, where the one or more manifold conduits 440-C are exposed, via respective manifold conduit inlets 440-I, to one or more second manifold outlets 140-O (see FIG. 5A for example).

As shown in FIGS. 2A-11, manifold conduit outlets 440-O may be exposed to separate, respective dispensing conduit inlets 118-I (see FIG. 5C, 9C, 10C, 11), depending upon the relative position of the reciprocating assembly 104 in relation to the fixed assembly 102 (e.g., the third position P3 as shown in FIGS. 2A-11), such that the second manifold outlets 140-O may be exposed to the dispensing conduit inlets 118-I of the array 118-A of dispensing conduits 118-C through the manifold conduits 440-C. As shown in FIGS. 2A-11, each manifold conduit 440-C may have a variable cross-sectional diameter (see FIG. 5A for example) along the length of the manifold conduit 440-C between the manifold conduit inlet 440-I and the manifold conduit outlet 440-O, such that the diameter of the manifold conduit inlet 440-I is the same or substantially the same as the diameter of the second manifold outlet 140-O to which the manifold conduit inlet 440-I is exposed, and the diameter of the manifold conduit outlet 440-O is the same or substantially the same as the diameter of one or more dispensing conduit inlets 118-I to which the manifold conduit outlet 440-O is exposed. Accordingly, a gas (e.g., second gas 94-2) that may be directed through the manifold conduit 440-C from a second manifold outlet 140-O to a dispensing conduit 118-C may be caused to flow through a cross-sectional flow area that is the same or substantially the same as the dispensing conduit inlet 118-I, thereby enabling the gas (e.g., (second gas 94-2) to have a relatively uniform distribution of gas impingement on a piece 11 of compressed material held in the dispensing conduit 118-C (see FIG. 5C for example), thereby enabling a relatively uniform distribution of pressure on the piece 11 to enable gas-based pushing of the piece 11 out of the dispensing conduit 118-C with reduced risk of breakup of the piece due to uneven distribution of the gas (e.g., second gas 94-2) on an upper surface of the piece 11.

As shown in FIGS. 2A-11, the second gas manifold 140 may include multiple conduit substructures 141 (see FIG. 5A for example) that each include one or more second manifold inlets 140-I, second manifold conduits 140-C, and second manifold outlets 140-O, but example embodiments are not limited thereto, and in some example embodiments the second gas manifold 140 may include a single structure that includes one or more second manifold inlets 140-I, second manifold conduits 140-C, and second manifold outlets 140-O.

As shown in FIGS. 2A-11, the reciprocating assembly 104 includes first and second shield plates 126-1 and 126-2 (see FIG. 2A, FIGS. 10A-10C for example) that are each in sliding contact with a bottom surface 118b of the bottom plate 118 and each at least partially vertically overlap in vertical direction V with (e.g., are at least partially vertically aligned with) the first channel assemblies 120-1 and the second channel assemblies 120-2, respectively. As shown, the bottom plate 118 is between the first and second channel assemblies 120-1, 120-2 and the first and second shield plates 126-1, 126-2. As shown, the first and second shield plates 126-1 and 126-2 may be connected to a remainder of the reciprocating assembly 104 (e.g., the lower plate 124) via one or more coupling structures 129 (see FIG. 2A for example), so that the shield plates 126-1 and 126-2 are configured to remain vertically aligned with the first and second channel assemblies 120-1 and 120-2, respectively, as the reciprocating assembly 104 moves in relation to the fixed assembly 102 (e.g., in relation to the bottom plate 118), such that the first and second shield plates 126 and 126-2 move with the first and second channel assemblies 120-1 and 120-2 along longitudinal axis L.

As shown in FIGS. 2A-11, the reciprocating assembly 104 is configured to move along a longitudinal axis L, in relation to the fixed assembly 102, to and between various positions, to variously expose and isolate various portions of the fixed assembly 102 and reciprocating assembly 104 in relation to each other, and in relation to the first or second gas sources 90-1 or 90-2. Still referring to FIGS. 2A-11, the reciprocating assembly 104 is configured to be moved (e.g., by servomechanism 70 under the control of the controller device 92) along a longitudinal axis L, in relation to the fixed assembly 102, between each position of a first position P1, a second position P2, and a third position P3.

FIGS. 2A, 3A, 4A, 5A, 6A, 7A, 8A, 9A, and 10A show some or all of the apparatus 100 when the reciprocating assembly 104 is at the first position P1 in relation to the fixed assembly 102. As shown in FIGS. 2A, 3A, 4A, 5A, 6A, 7A, 8A, 9A, and 10A, based on the reciprocating assembly 104 being at the first position Pb, the first channel conduit inlets 120-I1 of the first channel assemblies 120-1 are exposed to the first hopper 110-1 (e.g., to the first hopper 110-1 interior) and the first channel conduit outlets 120-O1 of the first channel assemblies 120-1 are covered with at least a portion of the fixed assembly 102 (e.g., a first portion 118u-1 of an upper surface 118u of bottom plate 118) (see FIG. 3A for example). As a result, the first channel conduits 120-C1 of the first channel assemblies 120-1 may each be sealed at the first channel conduit outlets 120-O1 and exposed to the first hopper 110-1 at the first channel conduit inlets 120-I1 based on the reciprocating assembly 104 being at the first position P1, thereby enabling bulk compressible material 82 to be supplied from the first hopper 110-1 and into the first channel conduits 120-C1 to establish separate, respective bulk instances 84 of compressible material in the separate first channel conduits 120-C1 (see FIG. 3A, FIG. 4A for example). Thus, it will be understood that the reciprocating assembly 104 is configured to move, along longitudinal axis L and in relation to the fixed assembly 102, to the first position P1 to expose the first channel conduit inlets 120-I1 to the first hopper 110-1 and to cover the first channel conduit outlets 120-O1 with at least a first portion of the fixed assembly 102 (e.g., a portion of upper surface 118u), to enable at least partial filling of one or more of the first channel conduits 120-C1 of the first channel assemblies 120-1 with bulk compressible material 82 from the first hopper 110-1 to form separate, respective bulk instances 84 of compressible material in the separate first channel conduits 120-C1.

FIGS. 2B, 3B, 4B, 5B, 6B, 7B, 8B, 9B, and 10B show some or all of the apparatus 100 when the reciprocating assembly 104 is at the second position P2 in relation to the fixed assembly 102. As shown in FIGS. 2B, 3B, 4B, 5B, 6B, 7B, 8B, 9B, and 10B, based on the reciprocating assembly 104 being at the second position P2, the first channel conduit inlets 120-I1 of the first channel assemblies 120-1 are exposed to one or more first manifold outlets 112-0, the first channel conduit outlets 120-O1 of the first channel assemblies 120-1 are exposed to separate, respective dispensing conduit inlets 118-I of the array 118-A of dispensing conduits 118-C, and the dispensing conduit outlets 118-O of the dispensing conduits 118-C are covered by the first shield plate 126-1 (see FIGS. 3B, 4B for example). As a result, the dispensing conduits 118-C are exposed, at respective dispensing conduit inlets 118I, to separate, respective first channel conduits 120-C1 and thus may receive at least a portion of separate, respective bulk instances 84 of compressible material from the separate, respective first channel conduits 120-C1 while being sealed at the respective dispensing conduit outlets 118-O and thus able to prevent any received portion of a bulk instance 84 of compressible material from leaving the dispensing conduits 118-C (see FIGS. 3B, 4B for example). In FIGS. 2A-11, the dispensing conduit outlets 118-O are covered by the first shield plate 126-1 based on the reciprocating assembly 104 being at the second position P2, but example embodiments are not limited thereto, and the first shield plate 126-1 may be absent from apparatus 100 in some example embodiments.

As shown in FIGS. 2B, 3B, 4B, 5B, 6B, 7B, 8B, 9B, and 10B, based on the reciprocating assembly 104 being at the second position P2, the exposure of the first channel conduit outlets 120-O1 to separate, respective dispensing conduits 118-C enables at least a portion of the bulk instances 84 of compressible material held in the first channel conduits 120-C1 to move to the corresponding, respective dispensing conduits 118-C that are exposed to the respective first channel conduits 120-C1 (see FIGS. 3B, 4B for example).

As further shown in FIGS. 2B, 3B, 4B, 5B, 6B, 7B, 8B, 9B, and 10B, based on the reciprocating assembly 104 being at the second position P2, the first channel conduit inlets 120-I1 are exposed to one or more first manifold outlets 112-0. Thus, a supply of first gas 94-1 to the first channel conduits 120-C1 via the one or more first manifold outlets 112-O and the exposed first channel conduit inlets 120I1 is enabled based on the reciprocating assembly 104 being at the second position P2 (see FIGS. 3B, 4B for example). The first gas 94-1 may be supplied into the first channel conduits 120-C1, via the one or more first manifold outlets 112-O and the exposed first channel conduit inlets 120I1, to both 1) move at least a portion of the bulk instances 84 of compressible material in the first channel conduits 120-C1 to fill the corresponding exposed dispensing conduits 118-C and 2) compress the bulk instances 84 of compressible material to form compressed instances 86 of compressible material (see FIGS. 3B, 4B for example). As shown (see FIGS. 3B, 4B for example), each compressed instance 86 includes a first portion 86-1 that remains in a given first channel conduit 120-C1 and a second portion 86-2 that is located within the fixed-volume space of the dispensing conduit 118-C exposed to the given first channel conduit 120-C1 at the second position P2 and thus fills the exposed dispensing conduit 118-C. As shown (see FIGS. 3B, 4B for example), the first and second portions 86-1 and 86-2 are separate portions of a uniform, single-piece compressed instance 86 of compressible material. The second portions 86-2 of the compressed instances 86 of compressible material that at least partially extend from the dispensing conduits 118-C into separate, respective first channel conduits 120-C1 may be understood to be formed first pieces 11 of compressed material (see FIGS. 3B, 4B for example).

As further shown in FIGS. 2B, 3B, 4B, 5B, 6B, 7B, 8B, 9B, and 10B, based on the first gas 94-1 being supplied into the first channel conduits 120-C1 to move bulk instances 84 of compressible material from first channel conduits 120-C1 into separate, respective exposed dispensing conduits 118-C and compress said bulk instances 84 of compressible material to form compressed instances 86 that partially or completely fill the exposed dispensing conduits 118-C, the increased pressure of the first gas 94-1 in the first channel conduits 120-C1 may overcome the spring force of the springs 402 and push the cylindrical sheaths 132 of the cylindrical structures 420 upwards, away from the lower plate 124, to open annular conduits 133-C for each cylindrical structure 420 to enable the first gas 94-1 to escape the first channel conduits 120-C1, via respective annular conduits 133-C, after moving and compressing the compressible material held in the first channel conduits 120-C1 and exposed dispensing conduit 118-C (see FIG. 4B for example). Upon termination of the supply of the first gas 94-1 into the first channel conduits 120-C1 via the first channel conduit inlets 12041, the internal pressure in the first channel conduits 120-C1 may drop so that the respective springs 402 of the cylindrical structures 420 may push the cylindrical sheaths 132 of the cylindrical structures 420 downwards, towards the lower plate 124, to close the annular conduits 133-C.

In some example embodiments, because the volume of each of the dispensing conduits 118-C may be fixed, and the pressure of the supplied first gas 94-1 in the first channel conduits 120-C1 may be controlled (e.g., based on controller device 92 controlling the supply of the first gas 94-1 via control of a gas flow control valve of the first gas source 90-1), the second portion 86-2 of compressed material that is located in, and fills all of the volume space of each dispensing conduit 118-C may be caused to have a particular volume (defined by, e.g., matching, the volume of the dispensing conduit 118-C) and a particular density (at least partially defined by the pressure of the first gas 94-1 and thus the amount of compression of the portion 86-2 of compressible material in the dispensing conduit 118-C).

FIGS. 2C, 3C, 4C, 5C, 6C, 7C, 8C, 9C, 10C, and 11 show some or all of the apparatus 100 when the reciprocating assembly 104 is at the third position P3 in relation to the fixed assembly 102, and wherein a plate 16 is moved to position 90 that vertically overlaps the array 118-A of dispensing conduits 118-C, so that the cavities 18 of the plate 16 vertically overlap in the vertical direction V (e.g., vertically align) with separate, respective dispensing conduit outlets 118-O of the array 118-A of dispensing conduits 118-C (see FIGS. 3C, 4C, 5C for example). As shown in FIGS. 2C, 3C, 4C, 5C, 6C, 7C, 8C, 9C, 10C, and 11, based on the reciprocating assembly 104 being at the third position P3, the dispensing conduit inlets 118-I are exposed to one or more second manifold outlets 140-O and the dispensing conduit outlets 118-O are exposed to an exterior of the apparatus 100 (e.g., to separate, respective vertically aligned cavities 18 of a plate 16 that is moved to position 90 based on operation of the conveyer assembly 10) (see FIGS. 3C, 4C, 5C for example).

As shown in FIGS. 2B-2C, 3B-3C, 4B-4C, 5B-5C, 6B-6C, 7B-7C, 8B-8C, 9B-9C, and 11, based on the reciprocating assembly 104 holding compressed instances 86 of compressible material, where first portions 86-1 of the compressed instances 86 remain in respective first channel conduits 120-C1 while second portions 86-2 of the compressed instances 86 are in respective dispensing conduits 118-C, the movement of the reciprocating assembly 104 from the second position P2 to the third position P3 results in the second portions 86-2 that are located within the dispensing conduits 118-C being severed (e.g., "segmented," "isolated," "portioned," etc.) from the "remainder" first portions 86-1 of compressible material held in the first channel conduits 120-C1 that were exposed to the dispensing conduits 118-C when the reciprocating assembly 104 was at the second position P2 (see FIGS. 3C, 4C, 5C for example). Accordingly, it will be understood that the severing of the portions 86-2 held in the dispensing conduits 118-C from the portions 86-1 held in the first channel conduits 120-C1 is due to the motion of the reciprocating assembly 104 from the second position P2 to the third position P3 that isolates the first channel conduits 120-C1 from the dispensing conduits 118-C (see FIGS. 3C, 4C, 5C for example). The second portions 86-2 that are isolated from the first portions 86-1 based on such motion, and remain in the dispensing conduits 118-C, may be referred to as separate first pieces 11 of compressed material that are isolated based on the reciprocating assembly 104 moving from the second position P2 to the third position P3 (see FIGS. 3C, 4C, 5C for example).

As shown in FIGS. 2C, 3C, 4C, 5C, 6C, 7C, 8C, 9C, 10C, and 11, based on the reciprocating assembly 104 being at the third position P3, the dispensing conduit inlets 118-I are exposed to one or more second manifold outlets 140-O (see FIGS. 3C, 4C, 5C for example), and thus the supply of second gas 94-2 to the dispensing conduits 118-C via the one or more second manifold outlets 140-O and the dispensing conduit inlets 118-I exposed thereto is enabled. The second gas 94-2 may be supplied into the dispensing conduits 118-C, via the one or more second manifold outlets 140-O and the exposed dispensing conduit inlets 118-I, to cause the pieces 11 of compressed material (e.g., first pieces) held in the dispensing conduits 118-C to be pushed (e.g., discharged, supplied, provided, etc.) out of the dispensing conduit 118-C via the dispensing conduit outlet 118-O due to the supplied second gas 94-2 establishing a pressure gradient from the dispensing conduit inlets 118-I to the corresponding dispensing conduit outlets 118-O (see FIGS. 3C, 5C for example). In some example embodiments, where the second manifold outlets 140-O are exposed to the dispensing conduit inlets 118-I via separate, respective manifold conduits 440-C, the variable diameter of the manifold conduits 440-C may enable the second gas 94-2 to be applied uniformly to a top of each of the pieces 11 held in the dispensing conduits 118-C (see FIGS. 3C, 5C for example), based on the diameter of the manifold conduit outlets 440-O being the same or substantially the same (e.g., the same within manufacturing tolerances and/or material tolerances) as the diameters of the dispensing conduit inlets 118-I to which the manifold conduit outlets 440-O are respectively exposed based on the reciprocating assembly 104 being at the third position P3.

Referring generally to FIGS. 2A-11, the reciprocating assembly 104 may be moved along longitudinal axis L, from the first position P1, to the second position P2, and then to the third position P3, to compress and portion bulk compressible material 82 into one or more pieces 11 of compressed material (e.g., first and/or second pieces) that have a particular volume, density and/or mass, and to further discharge said one or more pieces 11 of compressed material from the dispensing conduits 118-C of the apparatus 100 (e.g., into separate, respective vertically aligned cavities 18 of a plate 16 that is at position 90 based on operation of the conveyer assembly 10). As shown, the reciprocating assembly 104 may first be moved to and/or may be at the first position P1, so that bulk instances 84 of compressible material may be established in the first channel conduits 120-C1. The reciprocating assembly 104 may next be moved from the first position P1 to the second position P2, so that the bulk instances 84 may be at least partially pushed into corresponding exposed dispensing conduits 118-C, and the bulk instances 84 may be compressed to form compressed instances 86 based on a first gas 94-1 being supplied into the first channel conduits 120-C1 via the first channel conduit inlets 12041 thereof. The reciprocating assembly 104 may next be moved from the second position P2 to the third position P3, so that the portions 86-2 of the compressed instances 86 located within, and thus filling, the fixed-volume spaces of the dispensing conduits 118-C are first pieces 11 of compressible material that may be severed (e.g., portioned, isolated, etc.) from respective remainder portions 86-1 of the compressed instances 86 so that the first pieces 11 may be discharged from the apparatus 100 (e.g., to the cavities 18 of the vertically-overlapping plate 16) based on a second gas 94-2 being supplied into the dispensing conduits 118-C via the dispensing conduit inlets 118-I thereof. The reciprocating assembly 104 may then move from the third position P3 to the first position P1 to refill the bulk instances 84 in the first channel conduits 120-C1, and the movement of the reciprocating assembly 104 from the first to second to third positions P1, P2, P3 may be repeated. Such a process may be performed iteratively.

It will be understood that the conveyer assembly 10 may be operated, while the reciprocating assembly 104 is moved between positions, so that a plate 16 having cavities 18 that have received pieces 11 of compressed material when the reciprocating assembly 104 is at the third position P3 may be moved out away from position 90, and a new plate having cavities 18 that do not have pieces 11 therein may be moved to position 90 before the reciprocating assembly 104 returns to the third position P3 based on the reciprocating motion of the reciprocating assembly 104.

As shown in FIGS. 2A-11, the third position P3 may be between the first and second positions P1 and P2 along the longitudinal axis L, such that the reciprocating assembly 104 may be configured to 1) enable the pushing and compression of the compressible material, to form the compressed instances 86, based on the reciprocating assembly 104 moving in a first direction D1 along the longitudinal axis L from the first position P1 to the second position P2, 2) sever the portions 86-2 of compressed material (e.g., first pieces 11) held in the dispensing conduits 118-C from remainder portions 86-1 of compressed material in the first channel conduits 120-C1, and enable the pushing of the first pieces 11 of compressed material out of the dispensing conduits 118-C, based on the reciprocating assembly 104 moving in an opposite, second direction D2 along the longitudinal axis L from the second position P2 to the third position P3, and 3) enable at least partial re-filling of the first channel conduits 120-C1 with bulk compressible material 82 from the first hopper 110-1 subsequently to the pushing of the first pieces 11 of compressed material out of the dispensing conduits 118-C based on the reciprocating assembly 104 moving in the second direction D2 from the third position P3 to the first position P1. However, it will be understood that example embodiments are not limited thereto, and in some example embodiments the second position P2 may be between the first and third positions P1 and P3 along the longitudinal axis L, such that the motion of the reciprocating assembly 103 from the first position P1 to the second position P2 and from the second position P2 to the third position P3 is in a single direction (e.g., D1) along the longitudinal axis L.

Referring back to FIG. 1, the apparatus 100 may include a servomechanism 70 configured to move the reciprocating assembly 104 along the longitudinal axis L between the first, second, and third positions P1, P2, and P3 in relation to the fixed assembly 102. The apparatus 100 may further include processing circuitry (e.g., the controller device 92) configured to control the servomechanism 70 (e.g., based on generating control signals to control the operation of the servomechanism 70 via well-known methods for controlling servomechanism operations via processing circuitry control) to move the reciprocating assembly 104 between the first, second, and third positions P1, P2, and P3. The processing circuitry may be configured to control the first gas source 90-1, for example based on generating control signals to control the operation of one or more gas flow control valves of the first gas source 90-1 via well-known methods for controlling gas flow control valve operations via processing circuitry control. The processing circuitry may thus be configured to cause the first gas 94-1 to be selectively supplied to the first gas manifold 112 in response to the reciprocating assembly 104 being at the second position P2. The determination at the processing circuitry that the reciprocating assembly 104 is at the second position P2 may be based on the servomechanism 70 having been controlled to move the reciprocating assembly 104 to the second position and/or based on processing signals received from the servomechanism 70 and/or one or more position sensor devices to determine that the reciprocating assembly 104 is at the second position P2. The processing circuitry may be configured to control the second gas source 90-2, for example based on generating control signals to control the operation of one or more gas flow control valves of the second gas source via well-known methods for controlling gas flow control valve operations via processing circuitry control. The processing circuitry may thus be configured to cause the second gas 94-2 to be selectively supplied to the second gas manifold 140 in response to the reciprocating assembly 104 being at the third position P3. The determination at the processing circuitry that the reciprocating assembly 104 is at the third position P3 may be based on the servomechanism 70 having been controlled to move the reciprocating assembly 104 to the third position and/or based on processing signals received from the servomechanism 70 and/or one or more position sensor devices to determine that the reciprocating assembly 104 is at the third position P3. In some example embodiments, the controller device 92 may cause the supply of the first gas 94-1 and the second gas 94-2 to the apparatus 100 to be continuous throughout operation of the apparatus 100, independently of the relative position of the reciprocating assembly 104 in relation to the fixed assembly 102.

As shown in FIGS. 2A-11, the first gas manifold 112 may include multiple first manifold inlets 112-I (see FIG. 3A for example) that are connected to separate, respective sets of one or more first manifold outlets 112-O (see FIG. 3A for example) via separate, respective first manifold conduits 112-C (see FIG. 3A for example), where each first manifold outlet 112-O is configured to be exposed to a separate set of one or more first channel conduit inlets 120-I1 when the reciprocating assembly 104 is at the second position P2 (see FIG. 6B for example). But, example embodiments are not limited thereto. For example, in some example embodiments, the first gas manifold 112 may include a single first manifold inlet 112-I that is connected to a single first manifold outlet 112-O via a single first manifold conduit 112-C. In some example embodiments, the first gas manifold 112 may include one or more first manifold inlets 112-I that are each connected to multiple first manifold outlets 112-O via multiple first manifold conduits 112-C connected in parallel to a given first manifold inlet 112-I, where the multiple first manifold outlets 112-O are configured to be exposed to separate, respective sets of one or more first channel conduit inlets 120-I1 in response to the reciprocating assembly 104 being at the second position P2.

As shown in FIGS. 2A-11, the second gas manifold 140 may include multiple second manifold inlets 140-I (see FIG. 7A for example) that are connected to separate, respective second manifold outlets 140-O via separate, respective second manifold conduits 140-C (see FIG. 8A for example), where each second manifold outlet 140-O is configured to be exposed to a separate set of one or more dispensing conduit inlets 118-I when the reciprocating assembly 104 is at the third position P3 (see FIG. 8C for example). But, example embodiments are not limited thereto. For example, in some example embodiments, the second gas manifold 140 may include a single second manifold inlet 140-I that is connected to a single second manifold outlet 140-O via a single second manifold conduit 140-C. In some example embodiments, the second gas manifold 140 may include one or more second manifold inlets 140-I that are each connected to multiple second manifold outlets 140-O via multiple conduits 140-C and/or 440-C connected in parallel to a given second manifold inlet 140-I, where the multiple second manifold outlets 140-O are configured to be exposed to separate, respective sets of one or more dispensing conduit inlets 118-I in response to the reciprocating assembly 104 being at the third position P3.

It will be understood that, in some example embodiments, the manifold conduits 440-C may be absent from the apparatus 100, and the second gas manifold 140 may be configured such that the one or more second manifold outlets 140-O are directly exposed, i.e., without any intervening conduits, to one or more dispensing conduit inlets 118-I in response to the reciprocating assembly 104 being in the third position P3.

Still referring to FIGS. 2A-11, the apparatus 100 includes a second array 121-2 of second channel assemblies 120-2 (see FIG. 2A for example). The second channel assemblies 120-2, which include separate, respective second channel conduits 120-C2 having second channel conduit inlets 120-I2 and second channel conduit outlets 120-O2 (see FIG. 3A for example), may be structurally identical to the first channel assemblies 120-1 and may have similar to identical structural features, and so a detailed description of the similar structural features of the second channel assemblies 120-2 is not repeated, and it will be understood that the description of the structural features of the first channel assemblies 120-1 may apply to the structural features of the second channel assemblies 120-2.

As shown in FIGS. 2A-11, the fixed assembly 102 may include a second hopper 110-2 that is configured to hold additional bulk compressible material 82 (see FIG. 3B for example), in relation to the bulk compressible material 82 held in the first hopper 110-1. In some example embodiments, the first and second hoppers 110-1 and 110-2 are configured to receive bulk compressible material 82 from a same bulk material source 80. In some example embodiments, the first and second hoppers 110-1 and 110-2 are configured to receive bulk compressible material from different bulk material sources 80. The second array 121-2 is shown in FIGS. 2A-11 to include an array of twelve (12) second channel assemblies 120-2, but example embodiments are not limited thereto, and in example embodiments where the apparatus 100 includes a second array 121-2 of second channel assemblies 120-2, the second array 121-2 may include only a single second channel assembly 120-2 or any quantity of second channel assemblies 120-2.

As shown, the second channel assemblies 120-2 are adjacent to the second gas manifold 140 along the longitudinal axis L in the reciprocating assembly 104 (see FIG. 2A for example), such that the second gas manifold 140 is between the first and second channel assemblies 120-1 and 120-2 along the longitudinal axis L see FIG. 2A for example). However, example embodiments are not limited thereto. For example, in some example embodiments, the second array 121-2 of second channel assemblies 120-2 may be between the first array 121-1 of first channel assemblies 120-1 and the second gas manifold 140 along the longitudinal axis L.

Referring now to operation of an apparatus 100 that includes both first and second channel assemblies 120-1 and 120-2, in addition to first and second hoppers 110-1 and 110-2, as shown in FIGS. 2A-11, the reciprocating assembly 104 may be configured to provide first and second pieces 11 of compressible material based on compressing and portioning bulk instances 84 of compressible material held in the first and second channel assemblies 120-1 and 120-2 in an alternating sequence (e.g., alternately forming first and second pieces 11 based on compression of bulk instances 84 held in the first channel assemblies 120-1 or the second channel assemblies 120-2) as the reciprocating assembly 104 moves in a reciprocating motion between the first, second, and third positions P1, P2, and P3 (e.g., where the third position P3 is between the first and second positions P1 and P2).

As shown in FIGS. 2B, 3B, 4B, 5B, 6B, 7B, 8B, 9B, and 10B, the reciprocating assembly 104 that includes both first and second channel assemblies 120-1 and 120-2 is configured to, based on being at the second position P2, expose the second channel conduit inlets 120-I2 to the second hopper 110-2 and to cover the second channel conduit outlets 120-O2 with at least a second portion of the fixed assembly 102 (e.g., a second portion 118$u$-2 of the upper surface 118$u$ of the bottom plates 118 as shown in FIGS. 2A-11), to enable at least partial filling of the second channel conduits 120-C2 of the second channel assemblies 120-2 with additional bulk compressible material 82 from the second hopper 110-2 (see FIG. 3B for example). Thus the second channel conduits 120-C2 may be filled with bulk compressible material 82, to form respective bulk instances 84 of bulk compressible material therein, concurrently with the first channel conduit inlets 120-I1 of the first channel assemblies 120-1 being exposed to the first manifold outlets 112-O to enable pushing and compression of the bulk instances 84 held in the first channel conduit 120-C1 to form compressed instances 86 of compressible material that are partially within the dispensing conduits 118-C exposed to the first channel conduits 120-C1, as described above (see FIG. 3B for example).

As shown in FIGS. 2C, 3C, 4C, 5C, 6C, 7C, 8C, 9C, 10C, and 11, the reciprocating assembly 104 that includes both first and second channel assemblies 120-1 and 120-2 is configured to, based on having moved in the second direction D2 from the second position P2 to the third position P3, portion (e.g., sever) the compressible material portions 86-2 (e.g., first pieces 11) held in the dispensing conduits 118-C from the portions 86-1 held in the first channel conduits 120-C1 to isolate pieces 11 in the dispensing conduits 118-C and further expose the dispensing conduit inlets 118-I to the second manifold outlets 140-O, so that second gas 94-2 may be supplied via the second manifold outlets 140-O to discharge the formed and isolated pieces 11 from the dispensing conduits 118-C. Concurrently with the severing of the first pieces 11 of compressed material in the dispensing conduits 118-C, based on the reciprocating assembly 104 having moved in the second direction D2 from the second position P2 to the third position P3, the second channel assemblies 120-2 may maintain the bulk instances 84 of compressible material within the second channel conduits 120-C2 thereof (see FIG. 3C for example). Based on the reciprocating assembly 104 moving to the third position P3 from the second position P2, the first pieces 11 that are formed and isolated in the dispensing conduits 118-C based on portioning of compressed material initially held in the first channel assemblies 120-1 may be discharged from the dispensing conduits 118-C based on a supply of second gas 94-2 to the dispensing conduit inlets 118-I via the second manifold outlets 140-O, such that the dispensing conduits 118-C are emptied of compressible material and are thus ready to receive additional compressible material.

As shown in FIGS. 2A, 3A, 4A, 5A, 6A, 7A, 8A, 9A, and 10A, the reciprocating assembly 104 that includes both first and second channel assemblies 120-1 and 120-2 is configured to, based on having moved in the second direction D2 from the third position P3 to the first position P1, expose the second channel conduit inlets 120-I2 to the first manifold outlets 112-0, expose the second channel conduit outlets 120-O2 to separate, respective dispensing conduit inlets 118-I (which were emptied of compressible material based on the reciprocating assembly 104 having previously been at the third position P3), and cover the dispensing conduit outlets 118-O (e.g., with the second shield plate 126-2) (see FIG. 3A for example), to enable the first gas manifold 112 to direct the first gas 94-1 through the second channel conduit inlets 120-I2, concurrently with the reciprocating assembly 104 being at the first position P1, to push at least some compressible material of the bulk instances 84 held in the second channel conduits 120-C2 (e.g., said bulk instances 84 as shown in FIGS. 3B-3C, 7B-7C, 8B-8C, 9B-9C for example) into separate, respective dispensing conduits 118-C and to compress said pushed bulk instances 84 of compressible material that extend continuously between the dispensing conduits 118-C and corresponding second channel conduits 120-C2 to form separate compressed instances 86 of compressible material, where the portions 86-2 of said compressed instances that are within the fixed-volume spaces of the dispensing conduits 118-C are newly-formed second pieces 11 of compressed material (e.g., as similarly shown in FIGS. 3B and 4B with regard to supplying first gas 94-1 and forming compressed instances 86 of compressible material formed based on compressing pushed bulk instances 84 of compressible material that extend continuously between the dispensing conduits 118-C and corresponding first channel conduits 120-C1, except that such compressing is occurring concurrently with the reciprocating assembly 104 being at the first position P1, where second channel conduits 120-C2, instead of first channel conduits 120-C1, are aligned with separate, respective dispensing conduits 118-C and thus the compressed instances 86 of compressible material are formed concurrently with the reciprocating assembly 104 being at the first position P1 based on compressing pushed bulk instances 84 of compressible material that extend continuously between the dispensing conduits 118-C and corresponding second channel conduits 120-C2). Thus, new, second pieces 11 of compressed material may be formed in the dispensing conduits 118-C concurrently with the first channel conduit inlets 120-I1 of the first channel assemblies 120-1 being exposed to the first hopper 110-1 (see FIG. 3A for example) to enable at least partial refilling of the bulk instances 84 of compressible material in the first channel conduits 120-C1, based on the reciprocating assembly 104 being at the first position P1, as described above.

Restated, the reciprocating assembly may move from the third position P3 shown in at least FIG. 3C to the first position P1 shown in at least FIG. 3A, so that the second channel conduits 120-C2 may be aligned with separate, respective dispensing conduits 118-C and bulk instances 84 of compressible material held in said second channel conduits 120-C2 may be pushed into the separate, respective dispensing conduits 118-C and compressed (e.g., based on first gas 94-1 being supplied via the first gas manifold 112 and through the second channel conduit inlets 120-I2) to form compressed instances 86 of bulk material concurrently with the first channel conduits 120-C1 receiving additional bulk compressible material 82 via the first hopper 110-1 to form new bulk instances 84 of compressible material held in the first channel conduits 120-C1.

In some example embodiments, the reciprocating assembly 104 that includes both first and second channel assemblies 120-1 and 120-2 is configured to, based on having moved in the first direction D1 from the first position P1 to the third position P3, subsequently to forming the compressed instances 86 of compressible material that extend continuously between the dispensing conduits 118-C and respective second channel conduits 120-C2 and concurrently at least partially refilling the bulk instances 84 of compressible material in the first channel conduits 120-C1, based on the reciprocating assembly 104 being at the first position P1, expose the second manifold outlets 140-O to the dispensing conduit inlets 118-I and expose the dispensing conduit outlets 118-O to an exterior of the apparatus 100 (e.g., to separate, respective cavities 18 of a plate 16 that is at position 90), to sever the second pieces 11 of compressed material in the dispensing conduits 118-C from remainder compressible material 86-1 in the second channel conduits 120-C2 and to enable the second gas manifold 140 to direct the second gas 94-2 through the dispensing conduit inlets 118-I to push (e.g., discharge) the second pieces 11 of compressed material out of the dispensing conduits 118-C via the dispensing conduit outlets 118-O, such that the dispensing conduits 118-C are emptied of compressible material and are thus ready to receive additional compressible material, while the bulk instances 84 of compressible material are maintained in the first channel conduits 120-C1 (e.g., similarly to the severing and second gas 94-2 directing shown in at least FIG. 3C, except the second channel conduits 120-C2 would hold remainder compressible material 86-1 instead of bulk instances 84 of compressible material and the first channel conduits 120-C1 would hold bulk instances 84 of compressible material instead of remainder compressible material 86-1).

Referring back to FIGS. 2B, 3B, 4B, 5B, 6B, 7B, 8B, 9B, and 10B, the reciprocating assembly 104 that includes both first and second channel assemblies 120-1 and 120-2 is configured to, based on having moved in the first direction D1 from the third position P3 to the second position P2, subsequently to the second pieces 11 being discharged from the dispensing conduits 118-C in response to the reciprocating assembly having been at the third position P3, enable at least partial re-filling of the second channel conduits 120-C2 with bulk compressible material 82 from the second hopper 110-2, thereby enabling the process of forming and discharging second pieces 11 of compressible material using the second channel assemblies 120-2 to be repeated, along with repeating the process of forming and discharging first pieces 11 of compressible material using the first channel assemblies 120-1, based on the reciprocating motion of the reciprocating assembly 104.

FIGS. 2A-11 illustrate a single first channel conduit 120-C1, a single second channel conduit 120-C2, and a single dispensing conduit 118-C as being filled with compressible material, but it will be understood that this is for illustration only: in some example embodiments, all first channel conduits 120-C1 may be filled with bulk compressible material 82 from the first hopper 110-1 based on the reciprocating assembly 104 being at the first position P1, all second channel conduits 120-C2 may be filled with bulk compressible material 82 from the second hopper 110-2 based on the reciprocating assembly 104 being at the second position P2, and all dispensing conduits 118-C may be filled with compressible material from either a first channel conduit 120-C1 or a second channel conduit 120-C2 to form a first or second piece 11 of compressed material therein.

FIG. 12 is a flowchart showing a method according to some example embodiments. The method may be performed by any of the example embodiments of apparatus 100. The method may be performed based on a controller device 92 according to any example embodiments controlling the operation of any example embodiment of apparatus 100, for example based on controlling a servomechanism 70 and one or more gas sources 90-1, 90-2, and may further be based on the controller device controlling the operation of some or all of manufacturing system 1 according to any example embodiments.

As shown in FIG. 12, the method may be an iterative process, wherein operations in a given iteration may be affected by operations in a previous iteration.

At S1202, the reciprocating assembly 104 is caused to move along the longitudinal axis L (e.g., a particular motion of the reciprocating assembly 104 along the longitudinal axis L is caused), and in relation to the fixed assembly 102, to the first position P1 (see FIG. 3A for example), to expose the first channel conduit inlets 120I1 of the first channel conduits 120-C1 of the first channel assemblies 120-1 to the first hopper 110-1 and to cover the first channel conduit outlets 120-O1 of the first channel conduits 120-C1 with at least a first portion of the fixed assembly (e.g., a first portion 118u-1 of the upper surface 118u of the bottom plate 118).

At S1204-1, based on the reciprocating assembly 104 being moved to, and thus at, the first position P1, such that the first channel conduit inlets 120I1 are exposed to the first hopper 110-1, bulk compressible material 82 may be fed (e.g., based on gravity) from the first hopper 110-1 into the first channel conduits 120-C1 to enable at least partial filling of the first channel conduits 120-C1 with bulk compressible material 82 from the first hopper 110-1 to establish a separate bulk instance 84 of compressible material in each first channel conduit 120-C1 (see FIG. 3A for example). In some example embodiments, the first iteration of the method shown in FIG. 12 may start with the reciprocating assembly 104 moving to the first portion P1 from a start position, which may be any position in relation to the fixed assembly 102, including the first position P1 itself. The movement of the reciprocating assembly 104 may be caused based on operation of a servomechanism 70 connected to the reciprocating assembly 104, where said operation may be controlled by controller device 92.

As shown in FIG. 12, in some example embodiments the reciprocating assembly 104 includes one or more second channel assemblies 120-2, defining one or more second channel conduits 120-C2, where the first gas manifold 112 is between the first and second channel assemblies 120-1 and 120-2 along the longitudinal axis L. Accordingly, in some example embodiments, moving the reciprocating assembly 104 to the first position P1 at S1202, such that the reciprocating assembly 104 is at the first position P1, may expose the second channel conduit inlets 120-I2 of the second channel conduits 120-C2 to the first manifold outlets 112-O of the first gas manifold 112, expose the second channel conduit outlets 120-O2 of the second channel conduits 120-C2 to separate, respective dispensing conduit inlets 118-I of the dispensing conduits 118-C, and cover the dispensing conduit outlets 118-O of the dispensing conduits 118-C (e.g., covered by second shield plate 126-2), to enable the first gas manifold 112 to direct the first gas 94-1 through the second channel conduit inlets 120-I2 of the second channel conduits 120-C2 (S1204-2) (see FIG. 3A for example, with the addition that the second channel conduits 120-C2 shown in FIG. 3A may hold bulk instances 84 of compressible material that are pushed and compressed, based on first gas 94-1 being supplied concurrently with the reciprocating assembly 104 being at the first position P1, to form compressed instances 86 of compressible material extending between the dispensing conduits 118-C and separate, respective second channel conduits 120-C2, similarly to the compressed instances 86 shown in at least FIG. 3B except with the reciprocating assembly 104 being at the first position P1 instead of the second position P2 and the compressed instances 86 extending into separate, respective second channel conduits 120-C2 instead of separate, respective first channel conduits 120-C1). Operation S1204-2 may include the first gas source 90-1 being controlled (e.g., by a controller device 92) to cause the first gas 94-1 to be supplied from the first gas source 90-1 to the first gas manifold 112, to at least partially push any bulk instances 84 of compressible material from the second channel conduits 120-C2 into separate, respective dispensing conduits 118-C and to compress the pushed bulk instances 84 in the dispensing conduits 118-C to form compressed instances 86 of compressible material that are each at least partially within a separate dispensing conduit 118-C and fill said the fixed-volume space of said dispensing conduit 118-C, the portions 86-2 within the fixed-volume space of the dispensing conduits 118-C being understood to be second pieces 11 of compressed material within the dispensing conduits 118-C. Such control may include controlling a gas flow control valve of the first gas source 90-1. It will be understood that operations S1204-1 and S1204-2 may occur simultaneously or nearly simultaneously based on the reciprocating assembly 104 being at the first position P1 in relation to the fixed assembly 102.

At S1206, the reciprocating assembly 104 is caused to move along the longitudinal axis L (e.g., a particular motion of the reciprocating assembly 104 along the longitudinal axis L is caused), and in relation to the fixed assembly 102, from the first position P1 to the third position P3 (e.g., in the first direction D1) (see FIG. 3C for example). The movement of the reciprocating assembly 104 may be caused based on operation of a servomechanism 70 connected to the reciprocating assembly 104, where said operation may be controlled by controller device 92.

Moving the reciprocating assembly 104 in the first direction D1 from the first position P1 to the third position P3, at S1206, causes the second manifold outlet 140-O to be exposed to the dispensing conduit inlets 118-I (e.g., directly or via one or more manifold conduits 440-C) and further causes the dispensing conduit outlets 118-O to be exposed to an exterior of the apparatus 100 (e.g., based on movement of the first and/or second shield plates 126-1 or 126-2). In example embodiments where the reciprocating assembly 104 includes second channel assemblies 120-2 having second channel conduits 120-C2 that are exposed to dispensing conduits 118-C based on the reciprocating assembly 104 being at the first position P1, such movement in the first direction D1 from the first position P1 to the third position P3, at S1206, may further sever the second pieces 11 of compressed material in the dispensing conduits 118-C from remainder compressible material (e.g., portion 86-1) that is in the second channel conduits 120-C2 that were exposed to the dispensing conduits 118-C when the reciprocating assembly 104 was at the first position P1 at S1204-2.

At S1208, based on the reciprocating assembly 104 being moved to, and thus at, the third position P3, the dispensing conduit inlets 118-I are exposed to one or more second manifold outlets 140-O and the dispensing conduit outlets 118-O are exposed to an exterior of the apparatus 100 (e.g., based on movement of the first and/or second shield plates 126-1 or 126-2 to expose the dispensing conduit outlets 118-O) (see FIG. 3C for example). Thus, the reciprocating assembly 104 may be configured to enable the second gas manifold 140 to direct the second gas 94-2 through the dispensing conduit inlets 118-I exposed to the second manifold outlets 140-O to push (e.g., discharge) the second pieces 11 of compressed material out of the exposed dispensing conduits 118-C, based on the reciprocating assembly 104 being at the third position P3, thereby emptying the dispensing conduits 118-C of compressed material. Operation S1208 may include the second gas source 90-2 being controlled (e.g., by a controller device 92) to cause the second gas 94-2 to be supplied from the second gas source 90-2 to the second gas manifold 140. Such control may include controlling a gas flow control valve of the second gas source 90-2.

At S1210, the reciprocating assembly 104 is caused to move along the longitudinal axis L (e.g., a particular motion of the reciprocating assembly 104 along the longitudinal axis L is caused), and in relation to the fixed assembly 102, from the third position P3 to the second position P2 (e.g., in the first direction D1) (see FIG. 3B for example). The movement of the reciprocating assembly 104 may be caused based on operation of a servomechanism 70 connected to the reciprocating assembly 104, where said operation may be controlled by controller device 92. Moving the reciprocating assembly 104 from the third position P3 to the second position P2 causes the first channel conduit inlets 12041 of the first channel assemblies 120-1 to be exposed to one or more first manifold outlets 112-0, the first channel conduit outlets 120-O1 of the first channel assemblies 120-1 to be exposed to separate, respective dispensing conduit inlets 118-I of the dispensing conduits 118-C, and cover the dispensing conduit outlets 118-O of the dispensing conduits 118-C (e.g., by the first shield plate 126-1).

At S1212-1, based on the reciprocating assembly 104 being moved to, and thus at, the second position P2, the first gas source 90-1 may be controlled to supply first gas 94-1 to the first gas manifold 112, to cause the first gas manifold 112 to direct the first gas 94-1 through the first channel conduit inlets 120-I1 to 1) at least partially push the bulk instances 84 of compressible material held in the first channel conduits 120-C1 at least partially from the first channel conduits 120-C1 into the separate, respective dispensing conduits 118-C that are exposed to the first channel conduits 120-C1 and 2) compress the pushed bulk instances 84 in the dispensing conduits 118-C to form compressed instances 86 of compressible material that are each at least partially within a separate dispensing conduit 118-C and fill (e.g., entirely fill) the fixed-volume space of the separate dispensing conduit 118-C (see FIG. 3B for example). The portions 86-2 of the compressed instances 86 that are within the dispensing conduits 118-C will be understood to be first pieces 11 of compressed material within the dispensing conduits 118-C. Such control of the first gas source 90-1 may include controlling a gas flow control valve of the first gas source 90-1.

As shown in FIG. 12, in some example embodiments where the reciprocating assembly 104 includes one or more second channel assemblies 120-2, defining one or more second channel conduits 120-C2, where the first gas manifold 112 is between the first and second channel assemblies 120-1 and 120-2 along the longitudinal axis L, moving the reciprocating assembly 104 to the second position P2 at S1210, such that the reciprocating assembly 104 is at the second position P2, may cause the second channel conduit inlets 120-I2 of the second channel assemblies 120-2 to be exposed to the second hopper 110-2 and may further cause the second channel conduit outlets 120-O2 of the second channel assemblies 120-2 to be covered with at least a second portion of the fixed assembly 102 (e.g., a second portion 118u-2 of the upper surface 118u of the bottom plate 118) (see FIG. 3B for example). As a result, at S1212-2, in response to the reciprocating assembly 104 being moved to, and thus at, the second position P2, bulk compressible material 82 may be fed (e.g., based on gravity) from the second hopper 110-2 into the second channel conduits 120-C2 to enable at least partial filling of the second channel conduits 120-C2 with bulk compressible material 82 from the second hopper 110-2 to establish a separate bulk instance 84 of compressible material in each second channel conduit 120-C2 (see FIG. 3B for example). It will be understood that operations S1212-1 and S1212-2 may occur simultaneously or nearly simultaneously based on the reciprocating assembly 104 being at the second position P2 in relation to the fixed assembly 102.

At S1214, the reciprocating assembly 104 is caused to move along the longitudinal axis L (e.g., a particular motion of the reciprocating assembly 104 along the longitudinal axis L is caused), and in relation to the fixed assembly 102, from the second position P2 to the third position P3 (e.g., in a second direction D2 that is opposite to the first direction D1) (see FIG. 3C for example). The movement of the reciprocating assembly 104 may be caused based on operation of a servomechanism 70 connected to the reciprocating assembly 104, where said operation may be controlled by controller device 92. It will be understood that the motions of the reciprocating assembly 104 described herein in relation to the method shown in FIG. 12 may be based on operation of a same servomechanism 70 or separate servomechanisms 70 that cause separate, respective motions of the reciprocating assembly 104.

Moving the reciprocating assembly 104 in the second direction D2 from the second position P2 to the third position P3, at S1214, causes the second manifold outlet 140-O to be exposed to the dispensing conduit inlets 118-I (e.g., directly or via one or more manifold conduits 440-C) and further causes the dispensing conduit outlets 118-O to be exposed to an exterior of the apparatus 100 (e.g., based on movement of the first and/or second shield plates 126-1 or 126-2) (see FIG. 3C for example). Such movement in the second direction D2 from the second position P2 to the third position P3, at S1214, may further sever the first pieces 11 of compressed material in the dispensing conduits 118-C from remainder compressible material (e.g., portion 86-1) that is in the first channel conduits 120-C1 that were exposed to the dispensing conduits 118-C when the reciprocating assembly 104 was at the second position P2 at S1212-1 (see FIG. 3C for example).

At S1216, based on the reciprocating assembly 104 being moved in the second direction D2 from the second position P2 to the third position P3, and thus at the third position P3, the dispensing conduit inlets 118-I are open ("exposed") to one or more second manifold outlets 140-O and the dispensing conduit outlets 118-O are exposed to an exterior of the apparatus 100 (e.g., based on movement of the first and/or second shield plates 126-1 or 126-2 to expose the dispensing conduit outlets 118-O. Thus, the reciprocating assembly 104 may be configured to enable the second gas manifold 140 to direct the second gas 94-2 through the dispensing conduit inlets 118-I exposed to the second manifold outlets 140-O to push the first pieces 11 of compressed material out of the exposed dispensing conduits 118-C, thereby emptying the dispensing conduits 118-C of compressed material, based on the reciprocating assembly 104 being at the third position P3 (see FIG. 3C for example). Operation S1216 may include the second gas source 90-2 being controlled (e.g., by a controller device 92) to cause the second gas 94-2 to be supplied from the second gas source 90-2 to the second gas manifold 140. Such control may include controlling a gas flow control valve of the second gas source 90-2.

As shown in FIG. 12, the method may include causing the reciprocating assembly 104 to move along the longitudinal axis L, and in relation to the fixed assembly 102, from the third position P3 to the first position P1 in the second direction D2, to expose the first channel conduit inlets 12041 to the first hopper 110-1 and to cover the first channel conduit outlets 120-O1 with at least a first portion of the fixed assembly (e.g., a first portion 118u-1 of the upper surface 118u of the bottom plate 118), to enable at least partial re-filling of the first channel conduits 120-C1 with bulk compressible material 82 from the first hopper 110-1 to at least re-establish bulk instances 84 of compressible material in the first channel conduits 120-C1 (S1204-1) (see FIG. 3A for example).

Subsequently, the operations of FIG. 12 may be operated iteratively in one or more process loops (e.g., iterative loops), to provide first and second pieces 11 of compressed material at operations S1216 and S1208, respectively, of each iterative loop.

In some example embodiments, the reciprocating assembly 104 may not include any second channel assemblies 120-2, such that operations S1204-2 and S1212-2 may be omitted.

In some example embodiments, the second position P2 is between the first position P1 and the third position P3. In some example embodiments, at least operations S1206 and S1208 may be omitted, operation S1210 may include causing the reciprocating assembly 104 to move, in the first direction D1, from the first position P1 to the second position P2 without stopping at the third position P3 (e.g., in example embodiments where the third position P3 is not between the first and second positions P1 and P2). Operation S1202 may include causing the reciprocating assembly 104 to move in the second direction D2 from the third position P3 to the first position P1 with or without stopping for any period of time at the second position P2 (e.g., in example embodiments where the second position P2 is between the first and third position P1 and P3). In some example embodiments, the method shown in FIG. 12 may be a single-pass process from S1202 to S1216, such that no return to S1202 from S1216 occurs.

In some example embodiments, one or more elements of the apparatus 100 may be omitted. For example, the shield plates 126-1 and/or 126-2, and/or the coupling structures 129, may be omitted from the apparatus 100. In another example, some or all of the second channel assemblies 120-2 may be omitted from apparatus 100, and the second hopper 110-2 may be omitted where all of the second channel assemblies 120-2 are omitted. In another example, the apparatus 100 may include only a single channel assembly 120. It will be understood that the example embodiments where one or more elements of the apparatus 100 are omitted will not be limited to the examples provided above.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

We claim:

1. An apparatus, comprising:
a fixed assembly including a first gas manifold and a dispensing container, the first gas manifold including a first manifold outlet, the dispensing container defining a dispensing conduit extending between a dispensing conduit inlet and a dispensing conduit outlet; and
a reciprocating assembly including a first channel assembly and a second gas manifold, the first channel assembly defining a first channel conduit extending between a first channel conduit inlet and a first channel conduit outlet, the second gas manifold including a second manifold outlet,
wherein the reciprocating assembly movable along a longitudinal axis, in relation to the fixed assembly, between each position of
a first position to expose the first channel conduit inlet and to cover the first channel conduit outlet with at least a first portion of the fixed assembly,
a second position to expose the first channel conduit inlet to the first manifold outlet, expose the first channel conduit outlet to the dispensing conduit inlet, and cover the dispensing conduit outlet, and
a third position to expose the second manifold outlet to the dispensing conduit inlet and expose the dispensing conduit outlet to an exterior of the apparatus.

2. The apparatus of claim 1, wherein the third position is between the first position and the second position along the longitudinal axis.

3. The apparatus of claim 2, wherein
the reciprocating assembly includes a second channel assembly that defines a second channel conduit extending between a second channel conduit inlet and a second channel conduit outlet, the second channel assembly adjacent to the second gas manifold along the longitudinal axis such that the second gas manifold is between the first and second channel assemblies along the longitudinal axis, and the reciprocating assembly is configured to expose the second channel conduit inlet and to cover the second channel conduit outlet with at least a second portion of the fixed assembly based on the reciprocating assembly being at the second position, expose the second channel conduit inlet to the first manifold outlet, expose the second channel conduit outlet to the dispensing conduit inlet, and cover the dispensing conduit outlet based on the reciprocating assembly being at the first position, and expose the second manifold outlet to the dispensing conduit inlet and expose the dispensing conduit outlet to the exterior of the apparatus based on the reciprocating assembly being at the third position.

4. The apparatus of claim 3, wherein the reciprocating assembly includes an array of first channel assemblies that each define a separate first channel conduit of an array of first channel conduits, each separate first channel conduit extending between a separate first channel conduit inlet of an array of first channel conduit inlets and a separate first channel conduit outlet of an array of first channel conduit outlets, the array of first channel assemblies including the first channel assembly, the reciprocating assembly includes an array of second channel assemblies that each define a separate second channel conduit of an array of second channel conduits, each separate second channel conduit extending between a separate second channel conduit inlet of an array of second channel conduit inlets and a separate second channel conduit outlet of an array of second channel conduit outlets, the array of second channel assemblies including the second channel assembly, the dispensing container defines an array of dispensing conduits extending between separate, respective dispensing conduit inlets of an array of dispensing conduit inlets and separate, respective dispensing conduit outlets of an array of dispensing conduit outlets, the array of dispensing conduits including the dispensing conduit, the reciprocating assembly is configured to move to the first position to expose the array of first channel conduit inlets and to cover the array of first channel conduit outlets with at least the first portion of the fixed assembly, and expose the array of second channel conduit outlets to the array of dispensing conduit inlets and to expose the array of second channel conduit inlets to one or more first manifold outlets of the first gas manifold, the reciprocating assembly is configured to move to the second position to expose the array of first channel conduit outlets to the array of dispensing conduit inlets and to expose the array of first channel conduit inlets to the one or more first manifold outlets of the first gas manifold, and expose the array of second channel conduit inlets and to cover the array of second channel conduit outlets with at least the second portion of the fixed assembly, and the reciprocating assembly is configured to move to the third position to expose the array of dispensing conduit inlets to one or more second manifold outlets of the second gas manifold and to expose the array of dispensing conduit outlets to the exterior of the apparatus.

5. The apparatus of claim 4, wherein the first gas manifold includes a plurality of first manifold conduits that extend to separate, respective first manifold outlets of a plurality of first manifold outlets, the plurality of first manifold outlets including the one or more first manifold outlets, and the second gas manifold includes a plurality of second manifold conduits that extend to separate, respective second manifold outlets of a plurality of second manifold outlets, the plurality of second manifold outlets including the one or more second manifold outlets.

6. The apparatus of claim 3, further comprising:

a servomechanism configured to move the reciprocating assembly reversibly along the longitudinal axis between the first, second, and third positions, and processing circuitry configured to control the servomechanism to move the reciprocating assembly between the first, second, and third positions, control a first gas source to cause a first gas to be selectively supplied to the first gas manifold in response to the reciprocating assembly being at the first position, control the first gas source to cause the first gas to be selectively supplied to the first gas manifold in response to the reciprocating assembly being at the second position, and control a second gas source to cause a second gas to be selectively supplied to the second gas manifold in response to the reciprocating assembly being at the third position.

7. The apparatus of claim 1, wherein the dispensing container is a bottom plate, such that the dispensing conduit extends through a thickness of the bottom plate between the dispensing conduit inlet at an upper surface of the bottom plate and the dispensing conduit outlet at a bottom surface of the bottom plate; and the reciprocating assembly includes an upper plate, an upper surface of the upper plate in sliding contact with the first gas manifold, a lower plate, a bottom surface of the lower plate in sliding contact with the upper surface of the bottom plate, the lower plate defining a lower conduit extending through a thickness of the lower plate between a top opening of the lower conduit and a bottom opening of the lower conduit, the bottom opening of the lower conduit defining the first channel conduit outlet at the bottom surface of the lower plate, and a cylindrical structure coupled between the upper plate and the lower plate and defining an upper conduit extending through the cylindrical structure, a top opening of the upper conduit defining the first channel conduit inlet at the upper surface of the upper plate, a bottom opening of the upper conduit exposed to the top opening of the lower conduit such that the upper conduit and the lower conduit collectively define the first channel conduit.

8. The apparatus of claim 7, wherein the second gas manifold is coupled to an upper surface of the lower plate, the lower plate defines a manifold conduit extending through the thickness of the lower plate between a manifold conduit inlet at the upper surface of the lower plate and a manifold conduit outlet at the bottom surface of the lower plate, the manifold conduit inlet exposed to the second manifold outlet, and the reciprocating assembly is configured to expose the manifold conduit outlet to the dispensing conduit inlet, such that the second manifold outlet is exposed to the dispensing conduit inlet through the manifold conduit, based on the reciprocating assembly being at the third position.

9. The apparatus of claim 7, wherein the cylindrical structure includes
a cylinder coupled, at a top end of the cylinder, to the upper plate such that a top opening of the cylinder defines the top opening of the upper conduit,
a cylindrical sheath in sliding engagement with a bottom end of the cylinder at the top end of the cylindrical sheath and in sliding engagement with the lower plate at a bottom end of the cylindrical sheath, such that a bottom opening of the cylindrical sheath defines the bottom opening of the upper conduit, and
a spring configured to apply a spring force to push the cylindrical sheath against the lower plate, wherein the cylindrical sheath is configured to be pushed away from the lower plate and against the spring force to open a conduit extending between the cylindrical sheath and the lower plate.

10. The apparatus of claim 1, wherein
the dispensing container is a bottom plate, such that the dispensing conduit extends through a thickness of the bottom plate between the dispensing conduit inlet at an upper surface of the bottom plate and the dispensing conduit outlet at a bottom surface of the bottom plate;
the reciprocating assembly includes a first shield plate at least partially vertically overlapping the first channel assembly;
the bottom plate is between the first channel assembly and the first shield plate;
the first portion of the fixed assembly includes a portion of the bottom plate; and
the first shield plate is configured to cover the dispensing conduit outlet based on the reciprocating assembly being at the second position.

11. The apparatus of claim 1, further comprising:
a servomechanism configured to move the reciprocating assembly along the longitudinal axis between the first, second, and third positions, and
processing circuitry configured to
control the servomechanism to move the reciprocating assembly between the first, second, and third positions,
control a first gas source to cause a first gas to be selectively supplied to the first gas manifold in response to the reciprocating assembly being at the second position, and
control a second gas source to cause a second gas to be selectively supplied to the second gas manifold in response to the reciprocating assembly being at the third position.

12. A manufacturing system, comprising:
a conveyer belt, the conveyer belt including a loop of plates, each plate including a cavity;
the apparatus of claim 1, the apparatus on a section of the conveyer belt such that the conveyer belt is configured to move to cause the cavity of each plate of the conveyer belt to be moved to be vertically aligned with the dispensing conduit outlet concurrently with the reciprocating assembly being at the third position, to enable the second gas manifold to direct a gas through the dispensing conduit inlet to push a material out of the dispensing conduit and into the cavity; and
a packaging assembly configured to seal the material in the cavity in a package,
wherein the conveyer belt is configured to discharge the package from the cavity based on movement of the conveyer belt.

13. A method of operating the apparatus of claim 1, the method comprising:
causing the reciprocating assembly to move along the longitudinal axis, in relation to the fixed assembly, to the first position to expose the first channel conduit inlet of the first channel conduit and to cover the first channel conduit outlet of the first channel conduit with at least the first portion of the fixed assembly;
causing the reciprocating assembly to move along the longitudinal axis, in relation to the fixed assembly, from the first position to the second position to expose the first channel conduit inlet to the first manifold outlet of the first gas manifold, expose the first channel conduit outlet to the dispensing conduit inlet of the dispensing conduit, and cover the dispensing conduit outlet of the dispensing conduit;
controlling a first gas source to supply a first gas to the first gas manifold in response to the reciprocating assembly being moved to the second position, to cause the first gas manifold to direct the first gas through the first channel conduit inlet;
causing the reciprocating assembly to move along the longitudinal axis, in relation to the fixed assembly, from the second position to the third position to expose the second gas manifold to the dispensing conduit inlet and expose the dispensing conduit outlet to the exterior of the apparatus; and
controlling a second gas source to supply a second gas in response to the reciprocating assembly being moved to the third position, to cause the second gas manifold to direct the second gas through the dispensing conduit inlet.

14. The method of claim 13, wherein the third position is between the first position and the second position along the longitudinal axis, such that
causing the reciprocating assembly to move to the first position includes causing the reciprocating assembly to move in a first direction along the longitudinal axis from the first position to the second position via the third position,
causing the reciprocating assembly to move to the second position includes causing the reciprocating assembly to move in an opposite, second direction along the longitudinal axis from the third position to the first position, and
causing the reciprocating assembly to move to the third position includes causing the reciprocating assembly to move in the second direction from the second position to the third position.

15. The method of claim 14, wherein
causing the reciprocating assembly to move to the first position includes controlling a servomechanism coupled to the reciprocating assembly to cause the servomechanism to move the reciprocating assembly along the longitudinal axis to the first position, causing the reciprocating assembly to move to the second position includes controlling the servomechanism to cause the servomechanism to move the reciprocating assembly in the first direction along the longitudinal axis to the second position, and causing the reciprocating assembly to move to the third position includes controlling the servomechanism coupled to the reciprocating assembly to cause the servomechanism to move the reciprocating assembly in the second direction along the longitudinal axis to the third position.

16. The method of claim 14, wherein the reciprocating assembly includes a second channel assembly that defines a second channel conduit, the second channel assembly adjacent to the second gas manifold along the longitudinal axis such that the second gas manifold is between the first and second channel assemblies along the longitudinal axis, moving the reciprocating assembly to the second position causes a second channel conduit inlet of the second channel conduit to be exposed, the method further includes causing the reciprocating assembly to move from the second position to the first position to cause the second channel conduit inlet to be exposed to the dispensing conduit inlet and further causes a second channel conduit outlet of the second channel conduit to be exposed to the first manifold outlet, the method further includes controlling the first gas source to supply the first gas in response to the reciprocating assembly being moved from the second position to the first position, and the method further includes moving the reciprocating assembly from the first position to the third position, and controlling the second gas source to supply the second gas in response to the reciprocating assembly being at the third position.

17. The method of claim 13, wherein the first gas source and the second gas source are a same gas source, such that the first gas and the second gas are a same type of gas and the controlling the first and second gas sources controls the same gas source.

* * * * *